US011631015B2

(12) United States Patent
Matlick et al.

(10) Patent No.: US 11,631,015 B2
(45) Date of Patent: Apr. 18, 2023

(54) MACHINE LEARNING TECHNIQUES FOR INTERNET PROTOCOL ADDRESS TO DOMAIN NAME RESOLUTION SYSTEMS

(71) Applicant: Bombora, Inc., New York, NY (US)

(72) Inventors: Erik G. Matlick, Miami Beach, FL (US); Nicholaus Eugene Halecky, Reno, NV (US); Benny Lin, New York, NY (US)

(73) Assignee: Bombora, Inc., New York, NY (US)

( * ) Notice: Subject to any disclaimer, the term of this patent is extended or adjusted under 35 U.S.C. 154(b) by 258 days.

(21) Appl. No.: 17/017,425

(22) Filed: Sep. 10, 2020

(65) Prior Publication Data

US 2021/0073661 A1 Mar. 11, 2021

Related U.S. Application Data

(60) Provisional application No. 62/898,462, filed on Sep. 10, 2019.

(51) Int. Cl.
| | | |
|---|---|---|
| G06N 5/04 | (2006.01) | |
| G06N 20/00 | (2019.01) | |
| H04L 61/10 | (2022.01) | |
| H04L 61/5007 | (2022.01) | |
| H04L 61/3015 | (2022.01) | |

(52) U.S. Cl.
CPC ............ G06N 5/04 (2013.01); G06N 20/00 (2019.01); H04L 61/10 (2013.01); H04L 61/3025 (2013.01); H04L 61/5007 (2022.05)

(58) Field of Classification Search
CPC ...... G06N 5/04; G06N 20/00; H04L 61/5007; H04L 61/10
See application file for complete search history.

(56) References Cited

U.S. PATENT DOCUMENTS

| | | |
|---|---|---|
| 7,185,065 B1 | 2/2007 | Holtzman |
| 7,949,646 B1 | 5/2011 | Bangalore |
| 8,392,252 B2 | 3/2013 | Kaufman |
| 8,392,543 B1 | 3/2013 | Singh |
| 8,494,897 B1 | 7/2013 | Dawson |
| 8,566,152 B1 | 10/2013 | Shaw |
| 8,613,089 B1 | 12/2013 | Holloway |
| 8,725,712 B2 | 5/2014 | Arrasvuori |
| 8,745,647 B1 | 6/2014 | Shin |
| 9,092,829 B2 | 7/2015 | Fleischman |
| 9,152,970 B1 | 10/2015 | Trahan |
| 9,177,142 B2 | 11/2015 | Montoro |
| 9,514,368 B2 | 12/2016 | Pitt |
| 9,514,461 B2 | 12/2016 | George |
| 9,521,157 B1 | 12/2016 | D'Aveta |
| 9,560,423 B1 | 1/2017 | Chang |
| 9,667,733 B2 | 5/2017 | Dhawan |
| 9,706,008 B2 | 7/2017 | Rajan |
| 9,753,923 B2 | 9/2017 | Fleischman |
| 9,779,144 B1 | 10/2017 | Hampson |
| 9,940,634 B1 | 4/2018 | Livhits |
| 10,430,806 B2 | 10/2019 | Chang |
| 10,810,604 B2 | 10/2020 | Livhits |
| 2002/0173971 A1 | 11/2002 | Stirpe |
| 2003/0154398 A1 | 8/2003 | Eaton |
| 2004/0267723 A1 | 12/2004 | Bharat |
| 2006/0064411 A1 | 3/2006 | Gross |
| 2007/0124202 A1 | 5/2007 | Simons |
| 2007/0156392 A1 | 7/2007 | Balchandran |
| 2008/0126178 A1 | 5/2008 | Moore |
| 2009/0216741 A1 | 8/2009 | Thrall |
| 2010/0100537 A1 | 4/2010 | Druzgalski |
| 2010/0161613 A1 | 6/2010 | Rao |
| 2010/0250341 A1 | 9/2010 | Hauser |
| 2010/0293057 A1 | 11/2010 | Haveliwala |
| 2011/0227699 A1 | 9/2011 | Seth |
| 2011/0252427 A1 | 10/2011 | Olston |
| 2011/0320715 A1 | 12/2011 | Ickman |
| 2012/0158693 A1 | 6/2012 | Papadimitriou |
| 2012/0209795 A1 | 8/2012 | Glickman |
| 2012/0215640 A1 | 8/2012 | Ramer |
| 2013/0066677 A1 | 3/2013 | Killoh |
| 2013/0067070 A1 | 3/2013 | Rowe |
| 2013/0073473 A1 | 3/2013 | Heath |
| 2013/0124193 A1 | 5/2013 | Holmberg |
| 2013/0132339 A1 | 5/2013 | Mirus |
| 2013/0151687 A1 | 6/2013 | Mooneyham |

(Continued)

FOREIGN PATENT DOCUMENTS

| | | |
|---|---|---|
| WO | 2014/054052 A2 | 4/2014 |
| WO | 2017/116493 A1 | 7/2017 |

OTHER PUBLICATIONS

Burby, et al. "Web Analytics Definitions" Web Analytics Association; version 4.0; Aug. 23, 2007; XP055505869; retrieved from the Internet on Sep. 10, 2018 at: <https://www.digitalanalyticsassociation.org/Files/PDF_standards/WebAnalyticsDefinitionsVol1.pdf>.

Extended European Search Report for EP App. No. 16882214.6 dated Jul. 4, 2019; 9 pages.

Extended European Search Report for EP App. No. 18190771.8 dated Oct. 22, 2018; 8 pages.

Hamilton, et al., "Inductive Representation Learning on Large Graphs" 31st Conference on Neural Information Processing Systems (NIPS 2017), Long Beach, CA, USA; available on the Internet at <https://cs.stanford.edu/people/jure/pubs/graphsage-nips17.pdf> 19 pages.

(Continued)

Primary Examiner — Brian Whipple
(74) Attorney, Agent, or Firm — Schwabe, Williamson & Wyatt, PC

(57) ABSTRACT

An IP-to-Domain (IP2D) resolution system predicts which domain is most likely associated with an IP address. The resolution system generates unique source vote features (FSV) from (IP, domain, source) data. The FSV features are used to train a computer learning model that predicts which domain is most likely associated with an IP address. The domain predictions can then be used to more efficiently process events, more accurately calculate consumption scores, and more accurately detect associated company surges.

20 Claims, 34 Drawing Sheets

(56) References Cited

U.S. PATENT DOCUMENTS

| | | |
|---|---|---|
| 2013/0159505 A1 | 6/2013 | Mason |
| 2013/0204663 A1 | 8/2013 | Kahlow |
| 2013/0216134 A1 | 8/2013 | Yu |
| 2013/0297338 A1 | 11/2013 | Urmann |
| 2014/0067831 A1 | 3/2014 | Swamidas |
| 2014/0095966 A1 | 4/2014 | Burkard |
| 2014/0096035 A1 | 4/2014 | Hall |
| 2014/0156681 A1 | 6/2014 | Lee |
| 2014/0201061 A1 | 7/2014 | Sivacki |
| 2014/0201240 A1 | 7/2014 | Andavarapu |
| 2014/0229164 A1 | 8/2014 | Martens |
| 2014/0236669 A1 | 8/2014 | Milton |
| 2014/0278308 A1 | 8/2014 | Liu |
| 2014/0278916 A1 | 9/2014 | Nukala |
| 2014/0278959 A1 | 9/2014 | Nukala |
| 2014/0280549 A1 | 9/2014 | Rajan |
| 2014/0280890 A1 | 9/2014 | Yi |
| 2014/0325030 A1 | 10/2014 | Maharajh |
| 2015/0074131 A1 | 3/2015 | Fernandez |
| 2015/0309965 A1 | 10/2015 | Brav |
| 2016/0048880 A1 | 2/2016 | Linden |
| 2016/0132906 A1 | 5/2016 | Khavronin |
| 2016/0371725 A1 | 12/2016 | Nguyen |
| 2017/0031907 A1 | 2/2017 | Juang |
| 2017/0364931 A1 | 12/2017 | Khavronin |
| 2018/0101860 A1 | 4/2018 | Fleming |
| 2018/0174163 A1 | 6/2018 | Livhits |
| 2018/0365710 A1 | 12/2018 | Halecky |
| 2019/0050874 A1 | 2/2019 | Matlick |
| 2019/0294642 A1 | 9/2019 | Matlick |

OTHER PUBLICATIONS

Mccallum, et al., "A Comparison of Event Models for Naive Bayes Text Classification"; Learning for Text Categorization: Papers from the 1998 AAAI Workshop; 8 pages.

Mikolov, et al., "Efficient Estimation of Word Representations in Vector Space", arXiv:1301.3781v3 [cs.CL] (2013) 12 pages.

Patent Cooperation Treaty: International Search Report and Written Opinion of the International Searching Authority for International Application No. PCT/US16/35186, dated Nov. 4, 2016; 23 pages.

Perozzi, et al., "DeepWalk: Online Learning of Social Representations" KDD'14 Aug. 24-27, 2014, New York, NY, ACM 978-1-4503-2956-9/14/08; DOI 10.1145/2623330.2623732; 10 pages.

Snoek, et al., "Practical Bayesian Optimization of Machine Learning Algorithms"; dated Aug. 29, 2012; 12 pages.

Tang, et al., "LINE: Large-scale Information Network Embedding" WWW 2015, May 18-22, 2015, Florence, Italy. ACM 978-1-4503-3469-3/15/05. DOI 10-1145/2736277.2741093; 11 pages.

Withers, "What is Buyer Intent Data? A Guide for 2020"; dated Apr. 1, 2020; retrieved from the Internet at <https://blog.zoominfo.com/how-to-use-internet-data/>; 6 pages.

ZoomInfo Launches Intent Solution for Marketing and Sales, dated Apr. 9, 2020; retrieved from the Internet at <https://destinationcrm.com/...News/CRM-Across-the-Wire/ZoomInfo-Launches-Intent-Solution-for-Marketing-and-Sales-140221.aspx>; 2 pages.

ZoomInfo Launches 'Intent' Solution to Help B2B Companies Identify, Prioritize and Engage Sales Leads Based on Buying Signals dated Apr. 9, 2020; retrieved from the Internet at <https://www.businesswire.com/news/home/20200409005418/en/ZoomInfo-Launches-'Intent'-Solution_B2B_Comapnies-Identify>; 2 pages.

| $F_{ORG}$ ORGANIZATION CHARACTERISTICS OF IP ADDRESS | | | | | | | |
|---|---|---|---|---|---|---|---|
| IS-BIZ | IS-SMB | RES | HOTL | AIRP | MNO | B&P | SHUB |
| 0.9 | 0.7 | 0.02 | 0.63 | 0.21 | 0.01 | 0.03 | 0.02 |

FIGURE 29

VOTE MATRIX 870 WITH LABELED TRAINING DATA 874

| 878 | L | S2 | | | | S3 | | | | ... |
|---|---|---|---|---|---|---|---|---|---|---|
| | | $D_c$ | $P_c$ | C | BHR | $D_c$ | $P_c$ | C | BHR | |
| A1,D1 | 1 | 1 | 1 | 0.81 | 0 | 0 | 0 | - | - | |
| A1,D3 | 0 | 3 | 1 | 0.81 | 0.66 | 1 | 1 | 0 | 0 | |
| A2,D4 | | | | | | | | | | |
| A2,D7 | | | | | | | | | | |
| ... | | | | | | | | | | |

MACHINE LEARNING TECHNIQUES FOR INTERNET PROTOCOL ADDRESS TO DOMAIN NAME RESOLUTION SYSTEMS

RELATED APPLICATIONS

The present application claims priority to U.S. Provisional App. No. 62/898,462 titled "ASSOCIATING IP ADDRESSES WITH DOMAIN NAMES" filed on Sep. 10, 2019 (5782-0021P), the contents of which is hereby incorporated by reference in their entirety.

TECHNICAL FIELD

Embodiments described herein generally relate to Machine Learning (ML) and artificial intelligence (AI), and in particular, ML/AI techniques for Domain and Internet Protocol (IP) intelligence and IP-to-Domain (IP2D) resolution.

BACKGROUND

Web content publishers are interested to know who are the audiences that consume their content. Failure to do so could mean losing a competitive edge, missing growth opportunities, being unable to provide customer satisfaction, and lacking cost-effective processes. Most web content publishers use conventional business intelligence techniques to identify users that consumer the published content. However, Internet Protocol (IP) address approaches are becoming more prevalent.

Outside of profile-based approaches, which leverage 3rd-party cookies or other agent-level identification techniques, Internet Protocol (IP) addresses serve as a unique identifier for the audiences and organizational entities that consume their content. As there are 2^32 (~4.3 billion) IPv4 addresses in the world, knowledge of which IP addresses or ranges of IP addresses are used by specific organizations is crucial to understanding consuming audiences.

Domains, typically referencing the public facing websites of organizations, often serve as the primary key to an organizational entity in a firmographic dataset. Different domain mapping sources may map domain names, used by organizations, to the IP addresses that support their networks or office locations. Services that provide such a relationship are referred to as IP to Domain (IP2D). Other services may use IP2D source data to generate analytics for businesses associated with the domain names. For example, a business intelligence company may use the analytics to target different types of advertising to different companies. However, domain mapping sources may incorrectly map multiple different domain names to the same IP address. Analytic data derived from incorrect IP2D source data may not accurately identify the interests of specific organizations.

BRIEF DESCRIPTION OF THE DRAWINGS

FIG. 29 depicts example organization characteristics ($F_{ORG}$) generated by the IP classification system.
FIG. 32 depicts example $F_{SV}$ labeled training data.

DETAILED DESCRIPTION

Figure 1:
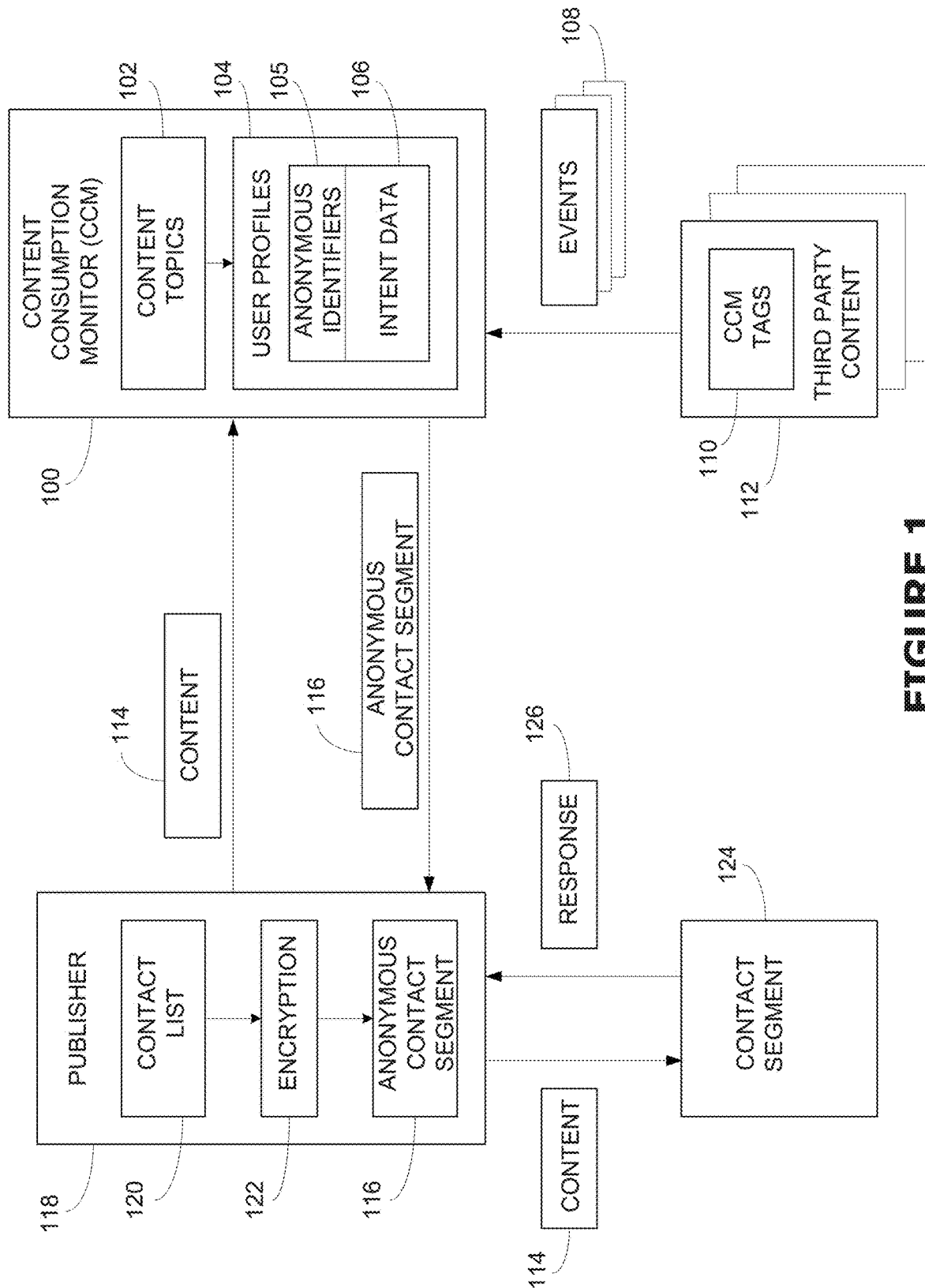
FIG. 1 depicts an example content consumption monitor (CCM).

Machine learning (ML) involves programming computing systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Although the term "ML algorithm" refers to different concepts than the term "ML model," these terms may be used interchangeably for the purposes of the present disclosure.

ML techniques generally fall into two broad categories: supervised learning and unsupervised learning. Supervised learning algorithms build models from a set of data that contains both the inputs and the desired outputs. For example, supervised learning may involve learning a function (model) that maps an input to an output based on example input-output pairs or some other form of labeled training data including a set of training examples. Each input-output pair includes an input object (e.g., a vector) and a desired output object or value (referred to as a "supervisory signal"). Unsupervised learning algorithms build models from a set of data that contains only inputs and no desired output labels. Unsupervised learning algorithms are used to find structure in the data, like grouping or clustering of data points. Semi-supervised learning algorithms develop ML models from incomplete training data, where a portion of the sample input does not include labels.

Supervised learning algorithms include, inter alia, classification algorithms Classification involves determining the classes to which various data points belong. Here, "classes" are categories, and are sometimes called "targets" or "labels." ML algorithms for classification may be referred to as a "classifier." Examples of classifiers include linear classifiers, k-nearest neighbor (kNN), logistic regression, decision trees, random forests, support vector machines (SVMs), Bayesian classifiers, convolutional neural networks (CNNs), among many others (note that some of these algorithms can be used for other ML tasks as well).

Classification is used when the outputs are restricted to a limited set of quantifiable properties. These quantifiable properties are referred to as "features." In the context of ML, a feature is an individual measureable property or characteristic of a phenomenon being observed. Features are usually represented using numbers/numerals (e.g., integers), strings, variables, ordinals, real-values, categories, and/or the like. A set of features may be referred to as a "feature vector." A vector is a tuple of one or more values called scalars, and a feature vector may include a tuple of one or more features. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples.

Another ML technique includes ensemble learning, which uses multiple learning algorithms to obtain better predictive performance than could be obtained from any of the constituent learning algorithms alone. An ML ensemble usually includes a concrete finite set of alternative models, but typically allows for much more flexible structure to exist among those alternatives. As alluded to previously, supervised learning involves searching through a hypothesis space to find a suitable hypothesis that will make good predictions with a particular problem. Ensembles combine multiple hypotheses to form a potentially better hypothesis. The term "ensemble" is usually reserved for methods that generate multiple hypotheses using the same base learner, whereas the term "multiple classifier" or "multiclass classification" systems also covers hybridization of hypotheses that are not induced by the same base learner. Outputs of individual models that are used as inputs of ensemble models are referred to as "base learners" or "base models". A base learner is usually generated from training data by a base learning algorithm which can be decision tree, neural network or other kinds of machine learning algorithms Each base model can be created using different sets of the same training dataset and the same algorithms, using the same dataset with different ML algorithms, or any other method or combination thereof.

One example of an ensemble model is the Random Forest algorithm, which combines multiple decision trees and aggregates their predictions using a majority vote in case of a classification problem or by taking the average for regression tasks. Another example is the voting ensemble, which estimates multiple base models and uses voting to combine the individual predictions to arrive at the final prediction(s). The multiple base models can be different from one another, for example, a decision tree model and a logistic regression model can be trained separately, and then the voting ensemble can be used to combine the results. Majority voting involves each base model makes a prediction (e.g., "votes") for each test instance and the final output prediction is the one that receives more than half of the votes and receives the most votes. Plurality voting can be used, where the prediction that receives the most votes is used even if that prediction does not receive more than 50% of the votes. In majority voting, each model has the same voting weight. In weighted voting, the importance of one or more of the base models can be increased or decreased using one or more weight factors. The weight factors may be selected based on design choice, using an optimization algorithm, or the like.

Another type of ensemble learning includes Bayes optimal classifier, which is a classification technique and an ensemble of all the hypotheses in the hypothesis space. Each hypothesis is given a vote proportional to the likelihood that the training dataset would be sampled from a system if that hypothesis were true. To facilitate training data of finite size, the vote of each hypothesis is also multiplied by the prior probability of that hypothesis. Another type of ensemble learning is bootstrap aggregating (also referred to as "bagging"), which involves having each model in the ensemble vote with equal weight. In order to promote model variance, bagging trains each model in the ensemble using a randomly drawn subset of the training set. In one example, a random forest algorithm can be used to combine random decision trees with bagging to achieve very high classification accuracy. Ensemble techniques may also be used for unsupervised learning such as, for example, in consensus clustering.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used. ML algorithms accept parameters and/or hyperparameters (collectively referred to herein as "training parameters," "model parameters," or simply "parameters" herein) that can be used to control certain properties of the training process and the resulting model. Parameters are characteristics or properties of the training process that are learnt during training. Model parameters may differ for individual experiments and may depend on the type of data and ML tasks being performed. Hyperparameters are characteristics, properties, or parameters for a training process that cannot be learnt during the training process and are set before training takes place. The particular values selected for the parameters and/or hyperparameters affect the training speed, training resource consumption, and the quality of the learning process. As examples for topic classification and/or natural language processing (NLP) tasks, model parameters may include word frequency, sentence length, noun or verb distribution per sentence, the number of specific character n-grams per word, lexical diversity, constraints, weights, and the like. Examples of hyperparameters may include model size (e.g., in terms of memory space or bytes), whether (and how much) to shuffle the training data, the number of evaluation instances or epochs (e.g., a number of iterations or passes over the training data), learning rate (e.g., the speed at which the algorithm reaches (converges to) the optimal weights), learning rate decay (or weight decay), the number and size of the hidden layers, weight initialization scheme, dropout and gradient clipping thresholds, and the like. In embodiments, the parameters and/or hyperparameters may additionally or alternatively include vector size and/or word vector size.

Embodiments disclosed herein include IP and Domain intelligence services. Domain intelligence (or "DNS intelligence") refers to the interpretation and analysis of domain information (e.g., current and prior domain registrants, date of registration and expiration, contact details, and/or other information that may come from the DNS system) and/or user interactions with a particular domain. IP intelligence refers to interpretation and analysis of information associated with individual IP addresses.

In various embodiments, an IP-to-Domain (IP2D) resolution system predicts a domain is most likely associated with an IP address. The IP2D resolution system generates unique features (e.g., ML features) such as, for example, IP-level, domain-level, and source vote features ($F_{SV}$) from (IP, domain, source) data. The $F_{SV}$ features are used to train an ML model (also referred to as a "computer learning model" or the like) that predicts which domain is most likely associated with an IP address. The domain predictions can then be used to more efficiently process events, more accurately calculate consumption scores, and more accurately detect associated company surges. The IP2D resolution system can also be used for other use cases such as, for example, network troubleshooting, anti-spam technologies (e.g., for email systems and the like), cybersecurity threat detection and tracking, system/network monitoring and logging, and/or the like. The IP2D resolution embodiments also provide more accurate IP-to-Domain mappings than existing approaches while using less computing and/or network resources than existing approaches. This amounts to an improvement in the technological fields of machine learning, reverse domain name system lookup/resolution (rDNS), and also amounts to an improvement in the functioning of computing systems and computing networks themselves. Other embodiments may be described and/or claimed.

1. Content Consumption Monitor Embodiments

FIG. 1 depicts a content consumption monitor (CCM) 100. CCM 100 includes one or more physical and/or virtualized systems that communicates with a publisher 118 and monitors user accesses to third party content 112. The physical and/or virtualized systems include one or more logically or physically connected servers and/or data storage devices distributed locally or across one or more geographic locations. In some implementations, the CCM 100 may be provided by (or operated by) a cloud computing service and/or a cluster of machines in a datacenter. In some implementations, the CCM 100 may be a distributed application provided by (or operated by) various servers of a content delivery network (CDN) or edge computing network. Other implementations are possible in other embodiments.

Publisher 118 comprises one or more physical and/or virtualized computing systems owned and/or operated by a company, enterprise, and/or individual that wants to send content 114 to an interested group of users. This group of users is alternatively referred to as contact segment 124. The physical and/or virtualized systems include one or more logically or physically connected servers and/or data storage devices distributed locally or across one or more geographic locations. Generally, the publisher 118 uses IP/network resources to provide information objects such as webpages, forms, applications (e.g., web apps), data, services, and/or media content to different user/client devices. As examples, the publisher 118 may provide search engine services; social networking, microblogging, and/or message board services; content (media) streaming services; e-commerce services; blockchain services; communication services such as Voice-over-Internet Protocol (VoIP) sessions, text messaging, group communication sessions, and the like; immersive gaming experiences; and/or other like services. The user/client devices that utilize services provided by publisher 118 may be referred to as "subscribers" or the like. Although FIG. 1 shows only a single publisher 118, the publisher 118 may represent multiple publishers 118, each of which may have their own subscribing users.

In one example, publisher 118 may be a company that sells electric cars. Publisher 118 may have a contact list 120 of email addresses for customers that have attended prior seminars or have registered on the publisher website. Contact list 120 also may be generated by CCM tags 110 that are described in more detail below. Publisher 118 also may generate contact list 120 from lead lists provided by third parties lead services, retail outlets, and/or other promotions or points of sale, or the like or any combination thereof. Publisher 118 may want to send email announcements for an upcoming electric car seminar Publisher 118 would like to increase the number of attendees at the seminar.

Third party content 112 comprises any information on any subject accessed by any user. The third party content 112 may include any type of information object (or collection of information objects). Information objects 112 may include electronic documents, database objects, electronic files, resources, and/or any data structure that includes one or more data items, each of which may include one or more data values. The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., mark-up language elements/tags, etc.). The terms "data item" or "information item" as used herein may also refer to data elements and/or content items, although these terms may refer to difference concepts. A data element (or simply "element") is a logical component of an information object (or electronic document) that begins with a start tag (e.g., "<element>") and ends with a matching end tag (e.g., "</element>"), or only an empty element tag (e.g., "<element/>"). Any characters between the start tag and end tag, if any, are the element's content (referred to herein as "content items" or the like). Content items may include text content (e.g., "<element>content item</element>"), attributes (e.g., "<element attribute="attributeValue">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

In some implementations, the third party content 112 may include webpages provided on (or served) by one or more webservers operated by different service provides, businesses, and/or individuals. For example, third party content 112 may come from different websites operated by on-line retailers and wholesalers, on-line newspapers, universities, blogs, municipalities, social media sites, or any other entity that supplies content. Third party content 112 also may include information not accessed directly from websites. For example, users may access registration information at seminars, retail stores, and other events. Third party content 112 also may include content provided by publisher 118.

Computers and/or servers associated with publisher 118, content segment 124, CCM 100 and third party content 112 may communicate over the Internet or any other wired or wireless network including local area networks (LANs), wide area networks (WANs), wireless networks, cellular networks, WiFi networks, Personal Area Networks (e.g., Bluetooth® or the like), Digital Subscriber Line (DSL) and/or cable networks, and/or the like, and/or any combination thereof.

Some of third party content 112 may contain CCM tags 110 that capture and send network session events 108 (or simply "events 108") to CCM 100. For example, CCM tags 110 may comprise JavaScript added to webpages of a website (or individual components of a web app or the like). The website downloads the webpages, along with CCM tags 110, to user computers. User computers may include any communication and/or processing device including but not limited to laptop computers, personal computers, smart phones, terminals, tablet computers, or the like, or any combination thereof. CCM tags 110 monitor web sessions send some captured web session events 108 to CCM 100.

Events 108 may identify third party content 112 and identify the user accessing third party content 112. For example, event 108 may include a universal resource locator (URL) link to third party content 112 and may include a hashed user email address or cookie identifier associated with the user that accessed third party content 112. Events 108 also may identify an access activity associated with third party content 112. For example, event 108 may indicate the user viewed a webpage, downloaded an electronic document, or registered for a seminar.

CCM 100 builds user profiles 104 from events 108. User profiles 104 may include anonymous identifiers 105 that associate third party content 112 with particular users. User profiles 104 also may include intent data 106 that identifies topics in third party content 112 accessed by the users. For example, intent data 106 may comprise a user intent vector that identifies the topics and identifies levels of user interest in the topics.

As mentioned above, publisher 118 may want to send an email announcing an electric car seminar to a particular contact segment 124 of users interested in electric cars. Publisher 118 may send the email as content 114 to CCM 100. CCM 100 identifies topics 102 in content 114.

CCM 100 compares content topics 102 with intent data 106. CCM 100 identifies the user profiles 104 that indicate an interest in content 114. CCM 100 sends anonymous identifiers 105 for the identified user profiles 104 to publisher 118 as anonymous contact segment 116.

Contact list 120 may include user identifiers, such as email addresses, names, phone numbers, or the like, or any combination thereof. The identifiers in contact list 120 are hashed or otherwise de-identified by an algorithm 122. Publisher 118 compares the hashed identifiers from contact list 120 with the anonymous identifiers 105 in anonymous contact segment 116.

Any matching identifiers are identified as contact segment 124. Publisher 118 identifies the unencrypted email addresses in contact list 120 associated with contact segment 124. Publisher 118 sends content 114 to the email addresses identified for contact segment 124. For example, publisher 118 sends email announcing the electric car seminar to contact segment 124.

Sending content 114 to contact segment 124 may generate a substantial lift in the number of positive responses 126. For example, assume publisher 118 wants to send emails announcing early bird specials for the upcoming seminar. The seminar may include ten different tracks, such as electric cars, environmental issues, renewable energy, etc. In the past, publisher 118 may have sent ten different emails for each separate track to everyone in contact list 120.

Publisher 118 may now only send the email regarding the electric car track to contacts identified in contact segment 124. The number of positive responses 126 registering for the electric car track of the seminar may substantially increase since content 114 is now directed to users interested in electric cars.

In another example, CCM 100 may provide local ad campaign or email segmentation. For example, CCM 100 may provide a "yes" or "no" as to whether a particular advertisement should be shown to a particular user. In this example, CCM 100 may use the hashed data without re-identification of users and the "yes/no" action recommendation may key off of a de-identified hash value.

CCM 100 may revitalize cold contacts in publisher contact list 120. CCM 100 can identify the users in contact list 120 that are currently accessing other third party content 112 and identify the topics associated with third party content 112. By monitoring accesses to third party content 112, CCM 100 may identify current user interests even though those interests may not align with the content currently provided by publisher 118. Publisher 118 might reengage the cold contacts by providing content 114 more aligned with the most relevant topics identified in third party content 112.

Figure 2:
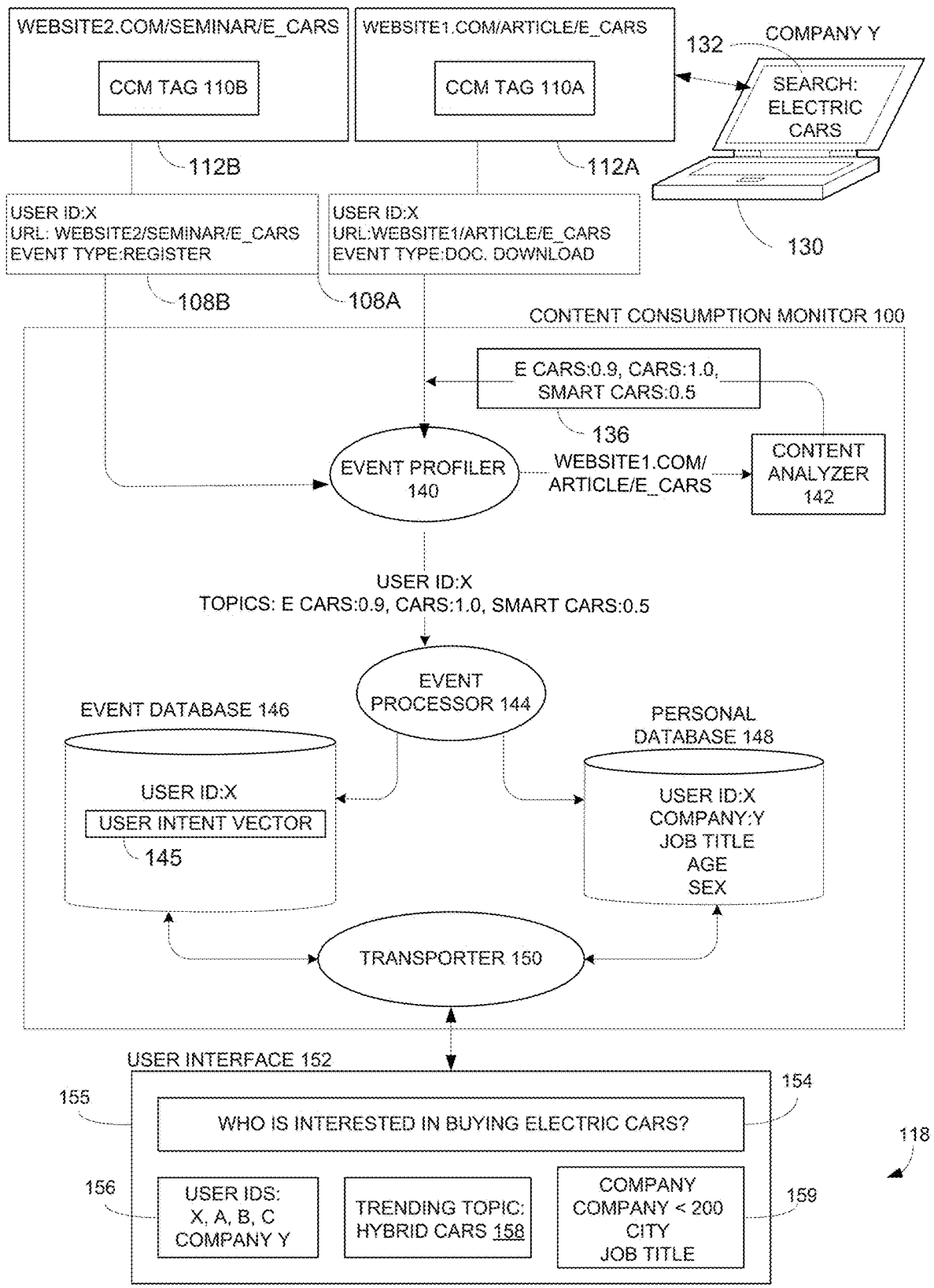
FIG. 2 depicts an example of the CCM in more detail.

FIG. 2 is a diagram explaining the content consumption manager in more detail. A user may enter a search query 132 into a computer 130 via a search engine. The user may work for a company Y. For example, the user may have an associated email address USER @COMPANY_Y.com.

In response to search query 132, the search engine may display links to content 112A and 112B on website1 and website2, respectively. The user may click on the link to website1. Website 1 may download a webpage to computer 130 that includes a link to a white paper. Website1 may include one or more webpages with CCM tags 110A that capture different events during the web session between website1 and computer 130. Website1 or another website may have downloaded a cookie onto a web browser operating on computer 130. The cookie may comprise an identifier X, such as a unique alphanumeric set of characters associated with the web browser on computer 130.

During the web session with website1, the user of computer 130 may click on a link to white paper 112A. In response to the mouse click, CCM tag 110A may download an event 108A to CCM 100. Event 108A may identify the cookie identifier X loaded on the web browser of computer 130. In addition, or alternatively, CCM tag 110A may capture a user name and/or email address entered into one or more webpage fields during the web session. CCM tag 110 hashes the email address and includes the hashed email address in event 108A. Any identifier associated with the user is referred to generally as user X or user ID.

CCM tag 110A also may include a link in event 108A to the white paper downloaded from website1 to computer 130. For example, CCM tag 110A may capture the universal resource locator (URL) for white paper 112A. CCM tag 110A also may include an event type identifier in event 108A that identifies an action or activity associated with content 112A. For example, CCM tag 110A may insert an event type identifier into event 108A that indicates the user downloaded an electric document.

CCM tag 110A also may identify the launching platform for accessing content 112B. For example, CCM tag 110B may identify a link www.searchengine.com to the search engine used for accessing website1.

An event profiler 140 in CCM 100 forwards the URL identified in event 108A to a content analyzer 142. Content analyzer 142 generates a set of topics 136 associated with or suggested by white paper 112A. For example, topics 136 may include electric cars, cars, smart cars, electric batteries, etc. Each topic 136 may have an associated relevancy score indicating the relevancy of the topic in white paper 112A. Content analyzers that identify topics in documents are known to those skilled in the art and are therefore not described in further detail.

Event profiler 140 forwards the user ID, topics 136, event type, and any other data from event 108A to event processor 144. Event processor 144 may store personal information captured in event 108A in a personal database 148. For example, during the web session with website1, the user may have entered an employer company name into a webpage form field. CCM tag 110A may copy the employer company name into event 108A. Alternatively, CCM 100 may identify the company name from a domain name of the user email address.

Event processor 144 may store other demographic information from event 108A in personal database 148, such as user job title, age, sex, geographic location (postal address), etc. In one example, some of the information in personal database 148 is hashed, such as the user ID and or any other personally identifiable information. Other information in personal database 148 may be anonymous to any specific user, such as company name and job title.

Event processor 144 builds a user intent vector 145 from topic vectors 136. Event processor 144 continuously updates user intent vector 145 based on other received events 108. For example, the search engine may display a second link to website2 in response to search query 132. User X may click on the second link and website2 may download a webpage to computer 130 announcing the seminar on electric cars.

The webpage downloaded by website2 also may include a CCM tag 110B. User X may register for the seminar during the web session with website2. CCM tag 110B may generate a second event 108B that includes the user ID: X, a URL link to the webpage announcing the seminar, and an event type indicating the user registered for the electric car seminar advertised on the webpage.

CCM tag 110B sends event 108B to CCM 100. Content analyzer 142 generates a second set of topics 136. Event 108B may contain additional personal information associated with user X. Event processor 144 may add the additional personal information to personal database 148.

Event processor 144 updates user intent vector 145 based on the second set of topics 136 identified for event 108B. Event processor 144 may add new topics to user intent vector 145 or may change the relevancy scores for existing topics. For example, topics identified in both event 108A and 108B may be assigned higher relevancy scores. Event processor 144 also may adjust relevancy scores based on the associated event type identified in events 108.

Publisher 118 may submit a search query 154 to CCM 100 via a user interface 152 on a computer 155. For example, search query 154 may ask WHO IS INTERESTED IN BUYING ELECTRIC CARS? A transporter 150 in CCM 100 searches user intent vectors 145 for electric car topics with high relevancy scores. Transporter 150 may identify user intent vector 145 for user X. Transporter 150 identifies user X and other users A, B, and C interested in electric cars in search results 156.

As mentioned above, the user IDs may be hashed and CCM 100 may not know the actual identities of users X, A, B, and C. CCM 100 may provide a segment of hashed user IDs X, A, B, and C to publisher 118 in response to query 154.

Publisher 118 may have a contact list 120 of users (FIG. 1). Publisher 118 may hash email addresses in contact list 120 and compare the hashed identifiers with the encrypted or hashed user IDs X, A, B, and C. Publisher 118 identifies the unencrypted email address for matching user identifiers. Publisher 118 then sends information related to electric cars to the email addresses of the identified user segment. For example, publisher 118 may send emails containing white papers, advertisements, articles, announcements, seminar notifications, or the like, or any combination thereof.

CCM 100 may provide other information in response to search query 154. For example, event processor 144 may aggregate user intent vectors 145 for users employed by the same company Y into a company intent vector. The company intent vector for company Y may indicate a strong interest in electric cars. Accordingly, CCM 100 may identify company Y in search results 156. By aggregating user intent vectors 145, CCM 100 can identify the intent of a company or other category without disclosing any specific user personal information, e.g., without regarding a user's online browsing activity.

CCM 100 continuously receives events 108 for different third party content. Event processor 144 may aggregate events 108 for a particular time period, such as for a current day, for the past week, or for the past 30 days. Event processor 144 then may identify trending topics 158 within that particular time period. For example, event processor 144 may identify the topics with the highest average relevancy values over the last 30 days.

Different filters 159 may be applied to the intent data stored in event database 146. For example, filters 159 may direct event processor 144 to identify users in a particular company Y that are interested in electric cars. In another example, filters 159 may direct event processor 144 to identify companies with less than 200 employees that are interested in electric cars.

Filters 159 also may direct event processor 144 to identify users with a particular job title that are interested in electric cars or identify users in a particular city that are interested in electric cars. CCM 100 may use any demographic information in personal database 148 for filtering query 154.

CCM 100 monitors content accessed from multiple different third party websites. This allows CCM 100 to better identify the current intent for a wider variety of users, companies, or any other demographics. CCM 100 may use hashed and/or other anonymous identifiers to maintain user privacy. CCM 100 further maintains user anonymity by identifying the intent of generic user segments, such as companies, marketing groups, geographic locations, or any other user demographics.

Figure 3:
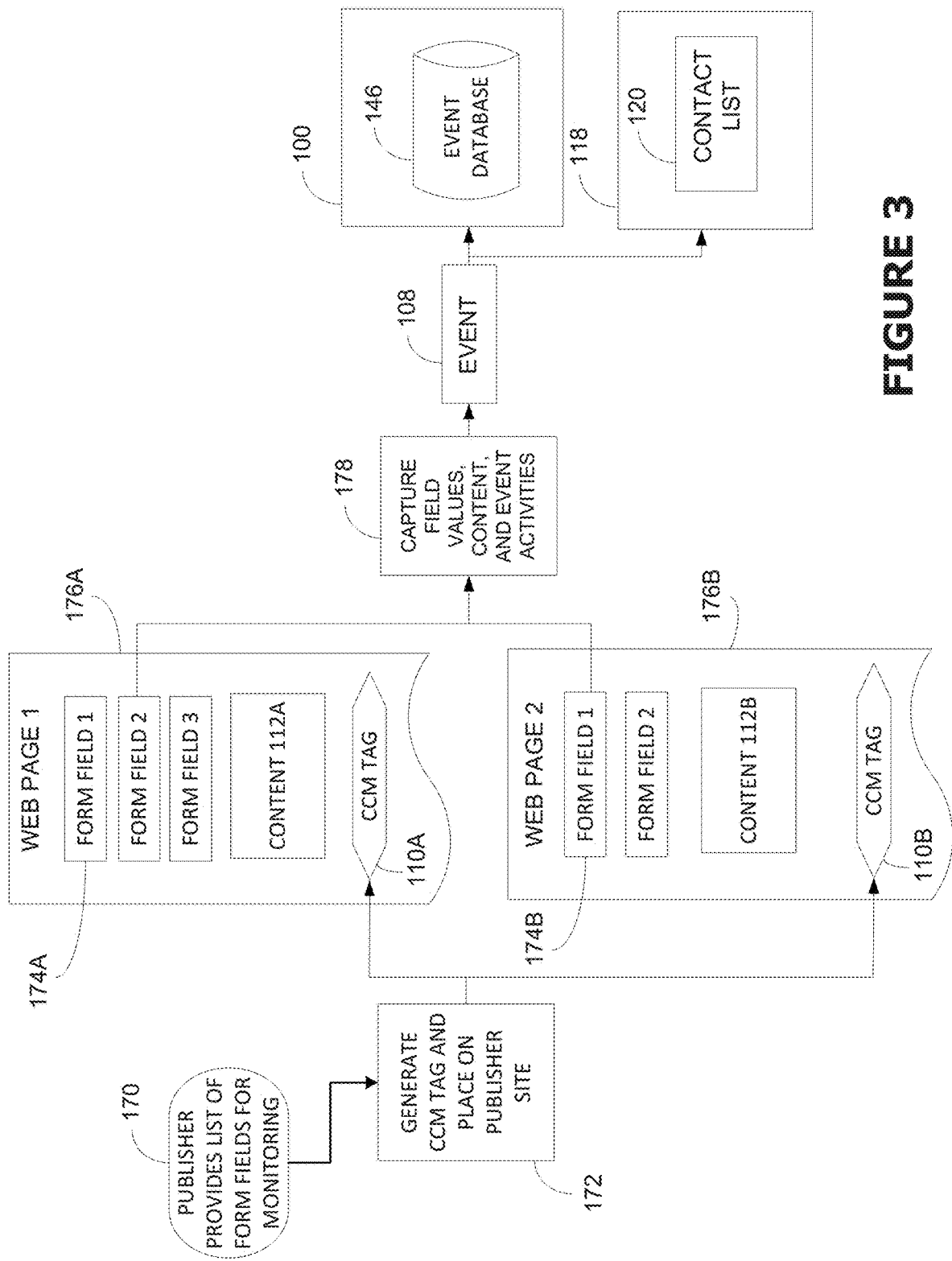
FIG. 3 depicts an example operation of a CCM tag.

FIG. 3 depicts example operations performed by CCM tags. In operation 170, a publisher provides a list of form fields 174 for monitoring on webpages 176. In operation 172, CCM tags 110 are generated and loaded in webpages 176 on the publisher website. For example, CCM tag 110A is loaded onto a first webpage 176A of the publisher website and a CCM tag 110B is loaded onto a second webpage 176B of the publisher website. In one example, CCM tags 110 comprise JavaScript loaded into the webpage document object model (DOM).

The publisher may download webpages 176, along with CCM tags 110, to user computers during web sessions. CCM tag 110A captures the data entered into some of form fields 174A and CCM tag 110B captures data entered into some of form fields 174B.

A user enters information into form fields 174A and 174B during the web session. For example, the user may enter an email address into one of form fields 174A during a user registration process. CCM tags 110 may capture the email address in operation 178, validate and hash the email address, and then send the hashed email address to CCM 100 in event 108.

CCM tags 100 may first confirm the email address includes a valid domain syntax and then use a hash algorithm to encode the valid email address string. CCM tags 110 also may capture other anonymous user identifiers, such as a cookie identifier. If no identifiers exist, CCM tag 110 may create a unique identifier.

CCM tags 110 may capture any information entered into fields 174. For example, CCM tags 110 also may capture user demographic data, such as company name, age, sex, postal address, etc. In one example, CCM tags 110 capture some the information for publisher contact list 120.

CCM tags 110 also may identify content 112 and associated event activities in operation 178. For example, CCM tag 110A may detect a user downloading a white paper 112A or registering for a seminar. CCM tag 110A captures the URL for white paper 112A and generates an event type identifier that identifies the event as a document download.

Depending on the application, CCM tag 110 in operation 178 sends the captured web session information in event 108 to publisher 118 or to CCM 100. For example, event 108 is sent to publisher 118 when CCM tag 110 is used for generating publisher contact list 120. Event 108 is sent to CCM 100 when CCM tag 110 is used for generating intent data.

CCM tags 110 may capture the web session information in response to the user leaving webpage 176, existing one of form fields 174, selecting a submit icon, mousing out of one of form fields 174, mouse clicks, an off focus, or any other user action. Note again that CCM 100 might never receive personally identifiable information (PII) since any PII data in event 108 is hashed by CCM tag 110.

Figure 4:
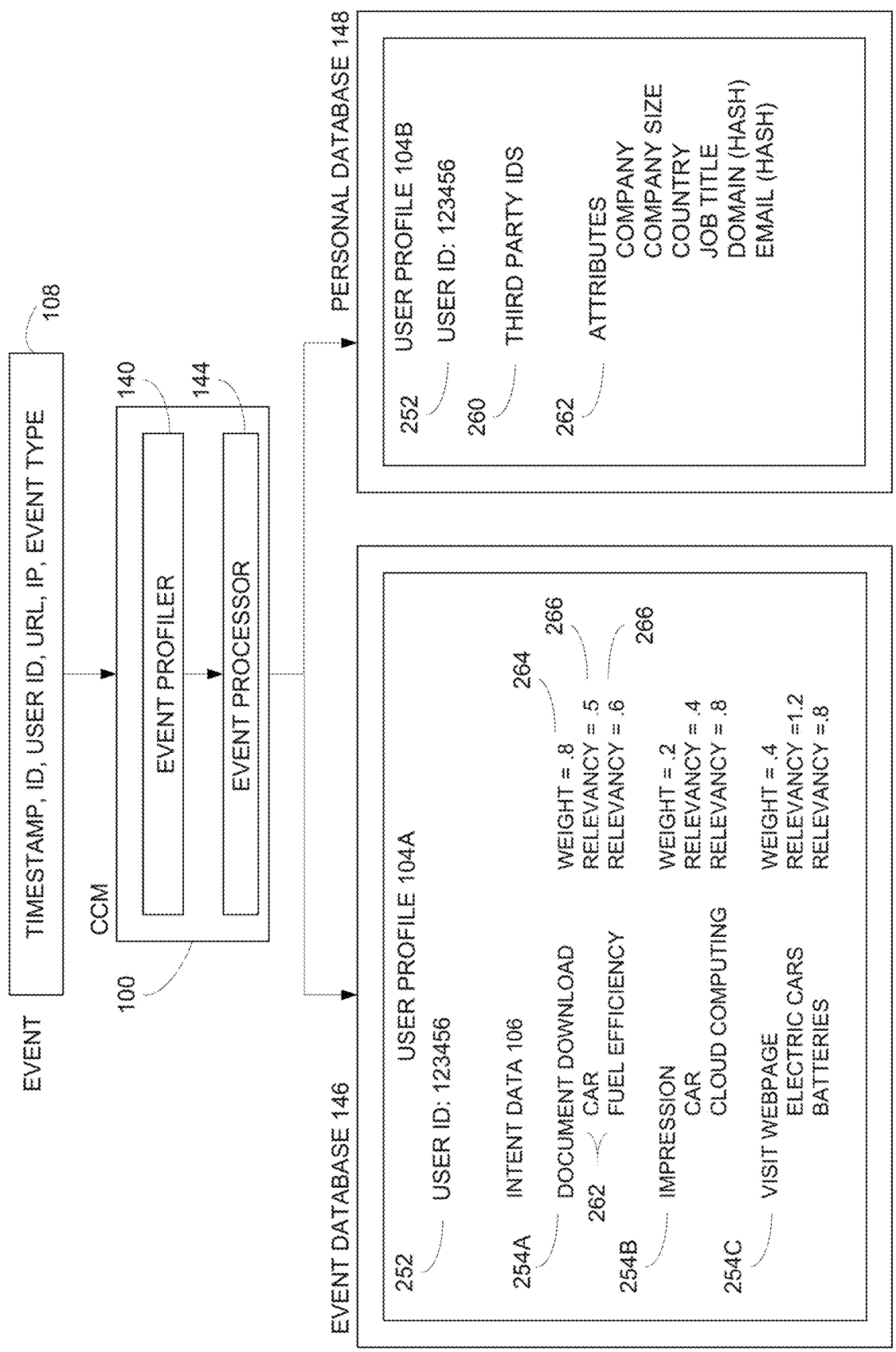
FIG. 4 depicts example events processed by the CCM.

FIG. 4 is a diagram showing how the CCM generates intent data. A CCM tag may send a captured raw event 108 to CCM 100. For example, the CCM tag may send event 108 to CCM 100 in response to a user downloading a white paper. Event 108 may include a timestamp indicating when the white paper was downloaded, an identifier (ID) for event 108, a user ID associated with the user that downloaded the white paper, a URL for the downloaded white paper, and an IP address for the launching platform for the content. Event 108 also may include an event type indicating the user downloaded an electronic document.

Event profiler 140 and event processor 144 may generate intent data 106 from one or more events 108. Intent data 106 may be stored in a structured query language (SQL) database or non-SQL database. In one example, intent data 106 is stored in user profile 104A and includes a user ID 252 and associated event data 254.

Event data 254A is associated with a user downloading a white paper. Event profiler 140 identifies a car topic 262 and a fuel efficiency topic 262 in the white paper. Event profiler 140 may assign a 0.5 relevancy value to the car topic and assign a 0.6 relevancy value to the fuel efficiency topic.

Event processor 144 may assign a weight value 264 to event data 254A. Event processor 144 may assign larger a weight value 264 to more assertive events, such as downloading the white paper. Event processor 144 may assign a smaller weight value 264 to less assertive events, such as viewing a webpage. Event processor 144 may assign other weight values 264 for viewing or downloading different types of media, such as downloading a text, video, audio, electronic books, on-line magazines and newspapers, etc.

CCM 100 may receive a second event 108 for a second piece of content accessed by the same user. CCM 100 generates and stores event data 254B for the second event 108 in user profile 104A. Event profiler 140 may identify a first car topic with a relevancy value of 0.4 and identify a second cloud computing topic with a relevancy value of 0.8 for the content associated with event data 254B. Event processor 144 may assign a weight value of 0.2 to event data 254B.

CCM 100 may receive a third event 108 for a third piece of content accessed by the same user. CCM 100 generates and stores event data 254C for the third event 108 in user profile 104A. Event profiler 140 identifies a first topic associated with electric cars with a relevancy value of 1.2 and identifies a second topic associated with batteries with a relevancy value of 0.8. Event processor 144 may assign a weight value of 0.4 to event data 254C.

Event data 254 and associated weighting values 264 may provide a better indicator of user interests/intent. For example, a user may complete forms on a publisher website indicating an interest in cloud computing. However, CCM 100 may receive events 108 for third party content accessed by the same user. Events 108 may indicate the user downloaded a whitepaper discussing electric cars and registered for a seminar related to electric cars.

CCM 100 generates intent data 106 based on received events 108. Relevancy values 266 in combination with weighting values 264 may indicate the user is highly interested in electric cars. Even though the user indicated an interest in cloud computing on the publisher website, CCM 100 determined from the third party content that the user was actually more interested in electric cars.

CCM 100 may store other personal user information from events 108 in user profile 104B. For example, event processor 144 may store third party identifiers 260 and attributes 262 associated with user ID 252. Third party identifiers 260 may include user names or any other identifiers used by third parties for identifying user 252. Attributes 262 may include an employer company name, company size, country, job title, hashed domain name, and/or hashed email addresses associated with user ID 252. Attributes 262 may be combined from different events 108 received from different websites accessed by the user. CCM 100 also may obtain different demographic data in user profile 104 from third party data sources (whether sourced online or offline).

An aggregator may use user profile 104 to update and/or aggregate intent data for different segments, such as publisher contact lists, companies, job titles, etc. The aggregator also may create snapshots of intent data 106 for selected time periods.

Event processor 144 may generate intent data 106 for both known and unknown users. For example, the user may access a webpage and enter an email address into a form field in the webpage. A CCM tag captures and hashes the email address and associates the hashed email address with user ID 252.

The user may not enter an email address into a form field. Alternatively, the CCM tag may capture an anonymous cookie ID in event 108. Event processor 144 then associates the cookie ID with user identifier 252. The user may clear the cookie or access data on a different computer. Event processor 144 may generate a different user identifier 252 and new intent data 106 for the same user.

The cookie ID may be used to create a de-identified cookie data set. The de-identified cookie data set then may be integrated with ad platforms or used for identifying destinations for target advertising.

CCM 100 may separately analyze intent data 106 for the different anonymous user IDs. If the user ever fills out a form providing an email address, event processor then may re-associate the different intent data 106 with the same user identifier 252.

Figure 5:
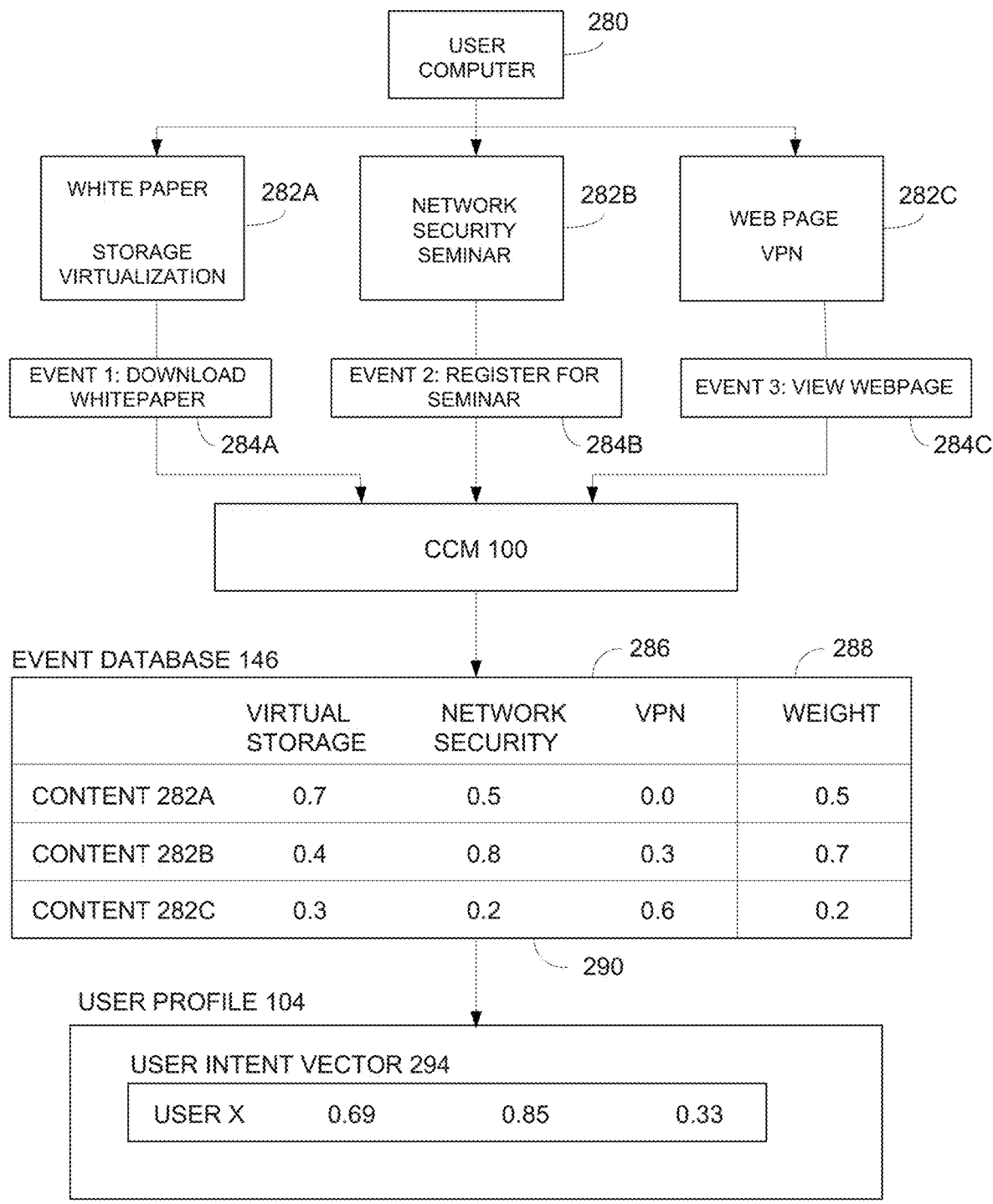
FIG. 5 depicts an example user intent vector.

FIG. 5 depicts an example of how the CCM generates a user intent vector from the event data described above in FIG. 4. A user may use computer 280 to access different content 282. For example, the user may download a white paper 282A associated with storage virtualization, register for a network security seminar on a webpage 282B, and view a webpage article 282C related to virtual private networks (VPNs). Content 282A, 282B, and 282C may come from the same website or come from different websites.

The CCM tags discussed above capture three events 284A, 284B, and 284C associated with content 282A, 282B, and 282C, respectively. CCM 100 identifies topics 286 in content 282A, 282B, and/or 282C. Topics 286 include virtual storage, network security, and VPNs. CCM 100 assigns relevancy values 290 to topics 286 based on known algorithms. For example, relevancy values 290 may be assigned based on the number of times different associated keywords are identified in content 282.

CCM 100 assigns weight values 288 to content 282 based on the associated event activity. For example, CCM 100 assigns a relatively high weight value of 0.7 to a more assertive off-line activity, such as registering for the network security seminar CCM 100 assigns a relatively low weight value of 0.2 to a more passive on-line activity, such as viewing the VPN webpage.

CCM 100 generates a user intent vector 294 in user profile 104 based on the relevancy values 290. For example, CCM 100 may multiply relevancy values 290 by the associated weight values 288. CCM 100 then may sum together the weighted relevancy values for the same topics to generate user intent vector 294.

CCM 100 uses intent vector 294 to represent a user, represent content accessed by the user, represent user access activities associated with the content, and effectively represent the intent/interests of the user. In another embodiment, CCM 100 may assign each topic in user intent vector 294 a binary score of 1 or 0. CCM 100 may use other techniques for deriving user intent vector 294. For example, CCM 100 may weigh the relevancy values based on timestamps.

Figure 6:
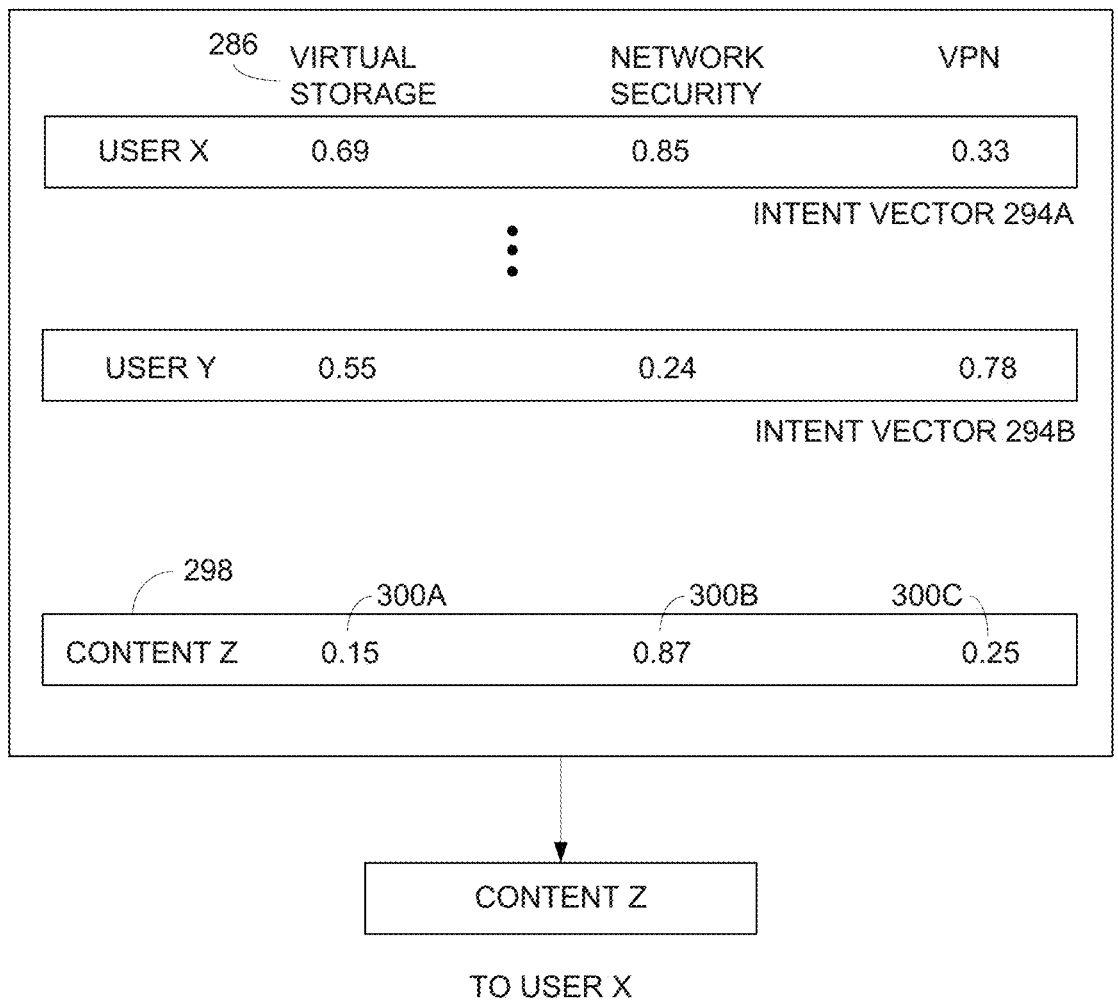
FIG. 6 depicts an example process for segmenting users.

FIG. 6 depicts an example of how the CCM segments users. CCM 100 may generate user intent vectors 294A and 294B for two different users. A publisher may want to email content 298 to a segment of interested users. The publisher submits content 298 to CCM 100. CCM 100 identifies topics 286 and associated relevancy values 300 for content 298.

CCM 100 may use any variety of different algorithms to identify a segment of user intent vectors 294 associated with content 298. For example, relevancy value 300B indicates content 298 is primarily related to network security. CCM 100 may identify any user intent vectors 294 that include a network security topic with a relevancy value above a given threshold value.

In this example, assume the relevancy value threshold for the network security topic is 0.5. CCM 100 identifies user intent vector 294A as part of the segment of users satisfying the threshold value. Accordingly, CCM 100 sends the publisher of content 298 a contact segment that includes the user ID associated with user intent vector 294A. As mentioned above, the user ID may be a hashed email address, cookie ID, or some other encrypted or unencrypted identifier associated with the user.

In another example, CCM 100 calculates vector cross products between user intent vectors 294 and content 298. Any user intent vectors 294 that generate a cross product value above a given threshold value are identified by CCM 100 and sent to the publisher.

Figure 7:
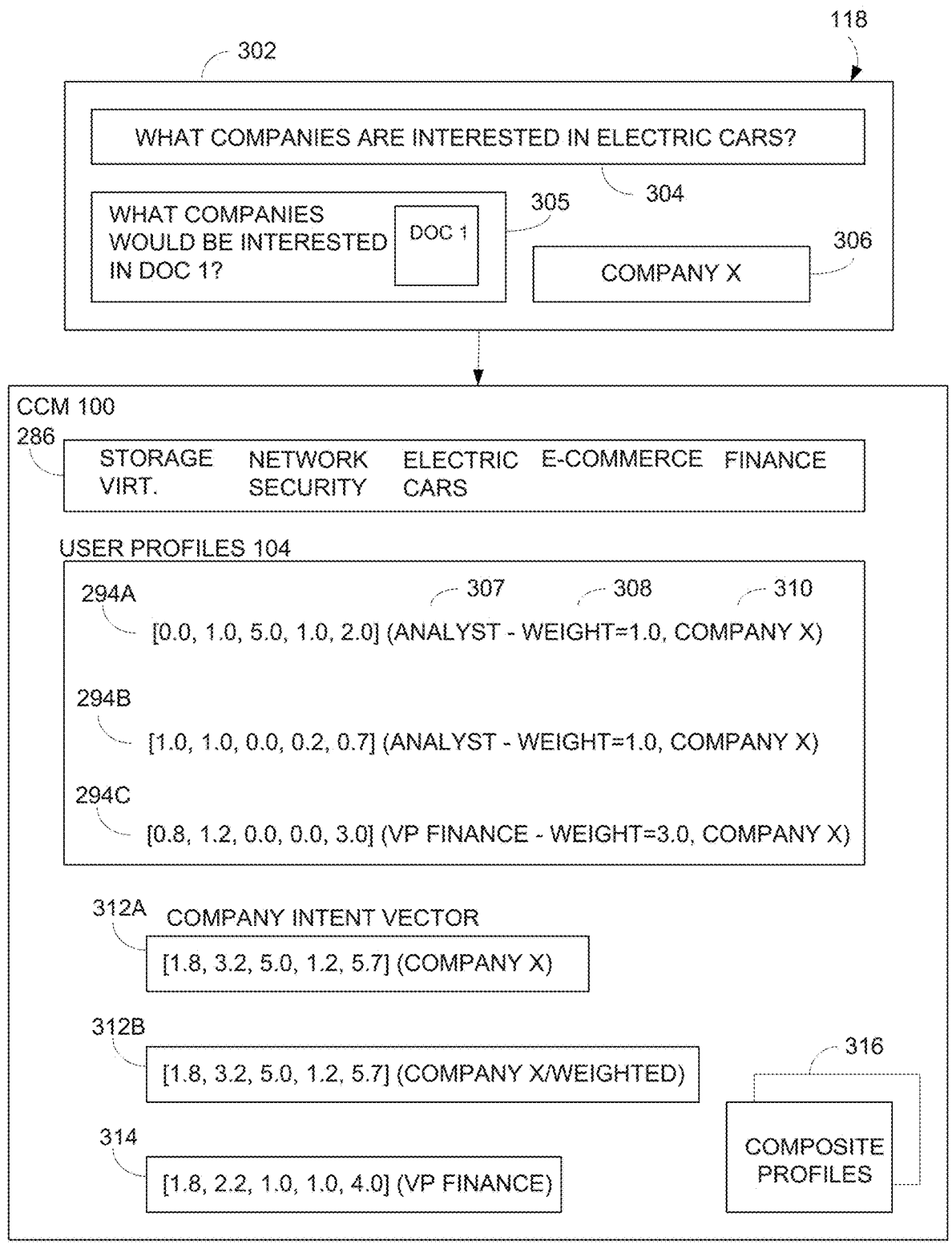
FIG. 7 depicts an example process for generating company intent vectors.

FIG. 7 depicts examples of how the CCM aggregates intent data. In this example, a publisher operating a computer 302 submits a search query 304 to CCM 100 asking what companies are interested in electric cars. In this example, CCM 100 associates five different topics 286 with user profiles 104. Topics 286 include storage virtualization, network security, electric cars, e-commerce, and finance.

CCM 100 generates user intent vectors 294 as described above in FIG. 6. User intent vectors 294 have associated personal information, such as a job title 307 and an employer company name 310. As explained above, users may provide personal information, such as employer name and job title in form fields when accessing a publisher or third party website.

The CCM tags described above capture and send the job title and employer name information to CCM 100. CCM 100 stores the job title and employer information in the associated user profile 104.

CCM 100 searches user profiles 104 and identifies three user intent vectors 294A, 294B, and 294C associated with the same employer name 310. CCM 100 determines that user intent vectors 294A and 294B are associated with a same job title of analyst and user intent vector 294C is associated with a job title of VP of finance.

In response to, or prior to, search query 304, CCM 100 generates a company intent vector 312A for company X. CCM 100 may generate company intent vector 312A by summing up the topic relevancy values for all of the user intent vectors 294 associated with company X.

In response to search query 304, CCM 100 identifies any company intent vectors 312 that include an electric car topic 286 with a relevancy value greater than a given threshold. For example, CCM 100 may identify any companies with relevancy values greater than 4.0. In this example, CCM 100 identifies company X in search results 306.

In one example, intent is identified for a company at a particular zip code, such as zip code 11201. CCM 100 may take customer supplied offline data, such as from a Customer Relationship Management (CRM) database, and identify the users that match the company and zip code 11201 to create a segment.

In another example, publisher 118 may enter a query 305 asking which companies are interested in a document (DOC 1) related to electric cars. Computer 302 submits query 305 and DOC 1 to CCM 100. CCM 100 generates a topic vector for DOC 1 and compares the DOC 1 topic vector with all known company intent vectors 312A.

CCM 100 may identify an electric car topic in the DOC 1 with high relevancy value and identify company intent vectors 312 with an electric car relevancy value above a given threshold. In another example, CCM 100 may perform a vector cross product between the DOC 1 topics and different company intent vectors 312. CCM 100 may identify the names of any companies with vector cross product values above a given threshold value and display the identified company names in search results 306.

CCM 100 may assign weight values 308 for different job titles. For example, an analyst may be assigned a weight value of 1.0 and a vice president (VP) may be assigned a weight value of 3.0. Weight values 308 may reflect purchasing authority associated with job titles 307. For example, a VP of finance may have higher authority for purchasing electric cars than an analyst. Weight values 308 may vary based on the relevance of the job title to the particular topic. For example, CCM 100 may assign an analyst a higher weight value 308 for research topics.

CCM 100 may generate a weighted company intent vector 312B based on weighting values 308. For example, CCM 100 may multiply the relevancy values for user intent vectors 294A and 294B by weighting value 1.0 and multiply the relevancy values for user intent vector 294C by weighting value 3.0. The weighted topic relevancy values for user intent vectors 294A, 294B, and 294C are then summed together to generate weighted company intent vector 312B.

CCM 100 may aggregate together intent vectors for other categories, such as job title. For example, CCM 100 may aggregate together all the user intent vectors 294 with VP of finance job titles into a VP of finance intent vector 314. Intent vector 314 identifies the topics of interest to VPs of finance.

CCM 100 also may perform searches based on job title or any other category. For example, publisher 118 may enter a query LIST VPs OF FINANCE INTERESTED IN ELECTRIC CARS? The CCM 100 identifies all of the user intent vectors 294 with associated VP finance job titles 307. CCM 100 then segments the group of user intent vectors 294 with electric car topic relevancy values above a given threshold value.

CCM 100 may generate composite profiles 316. Composite profiles 316 may contain specific information provided by a particular publisher or entity. For example, a first publisher may identify a user as VP of finance and a second publisher may identify the same user as VP of engineering. Composite profiles 316 may include other publisher provided information, such as company size, company location, company domain.

CCM 100 may use a first composite profile 316 when providing user segmentation for the first publisher. The first composite profile 316 may identify the user job title as VP of finance. CCM 100 may use a second composite profile 316 when providing user segmentation for the second publisher. The second composite profile 316 may identify the job title for the same user as VP of engineering. Composite profiles 316 are used in conjunction with user profiles 104 derived from other third party content.

In yet another example, CCM 100 may segment users based on event type. For example, CCM 100 may identify all the users that downloaded a particular article, or identify all of the users from a particular company that registered for a particular seminar.

2. Consumption Scoring Embodiments

Figure 8:
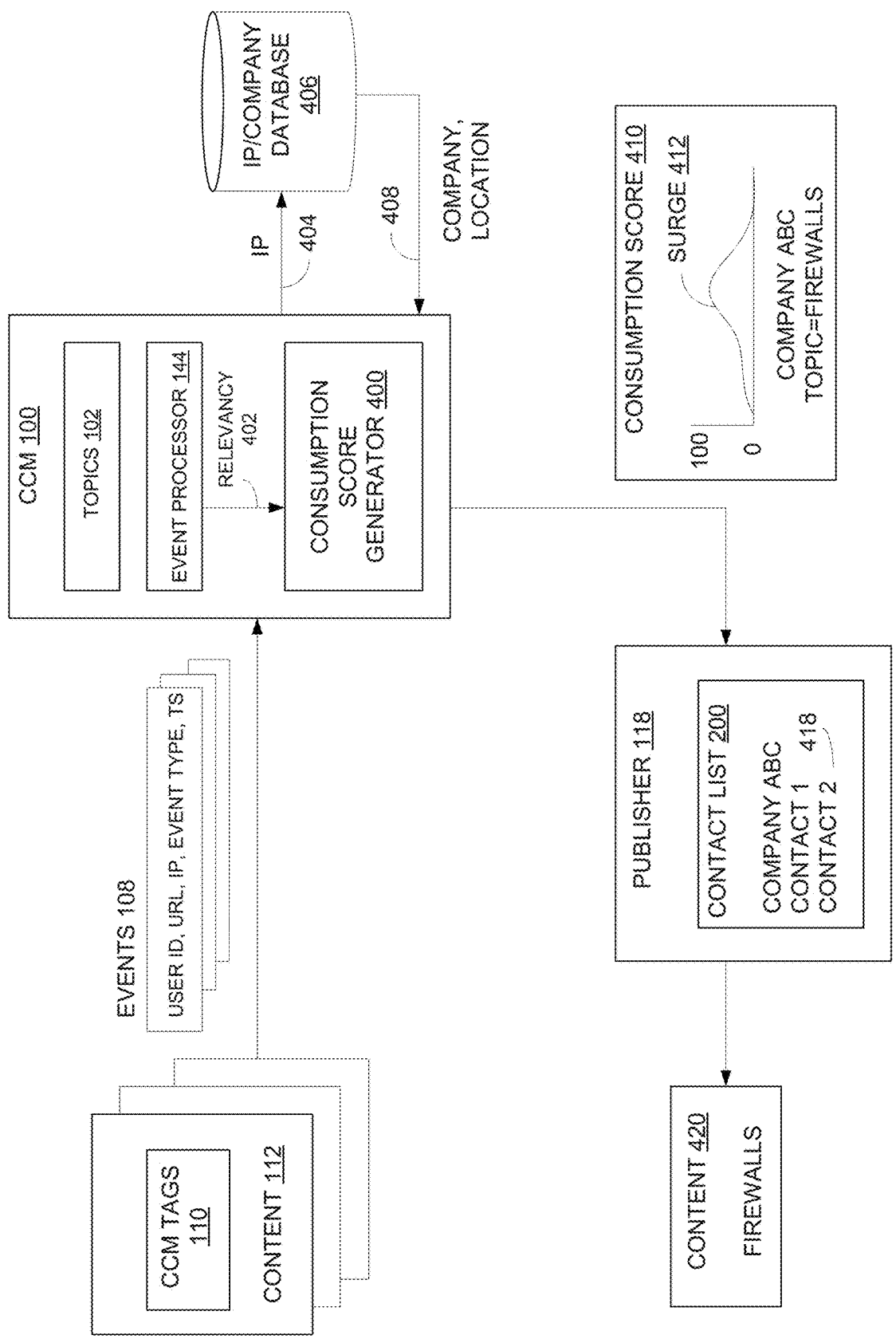
FIG. 8 depicts an example consumption score generator.

FIG. 8 depicts an example consumption score generator used in CCM 100. As explained above, CCM 100 may receive multiple events 108 associated with different content 112. For example, users may access web browsers, or any other application, to view content 112 on different websites. Content 112 may include any webpage, document, article, advertisement, or any other information viewable or audible by a user. For example, content 112 may include a webpage article or a document related to network firewalls.

CCM tag 110 may capture events 108 identifying content 112 accessed by a user during the web or application session. For example, events 108 may include a user identifier (USER ID), URL, IP address, event type, and timestamp (TS).

The user identifier may be a unique identifier CCM tag 110 generates for a specific user on a specific browser. The URL may be a link to content 112 accessed by the user during the web session. The IP address may be for a network device used by the user to access the Internet and content 112. As explained above, the event type may identify an action or activity associated with content 112. For example, the event type may indicate the user downloaded an electric document or displayed a webpage. The timestamp (TS) may identify a day and time the user accessed content 112.

Consumption score generator (CSG) 400 may access an IP/company database 406 to identify a company/entity and location 408 associated with IP address 404 in event 108. For example, existing services may provide databases 406 that identify the company and company address associated with IP addresses. The IP address and/or associated company or entity may be referred to generally as a domain. CSG 400 may generate metrics from events 108 for the different companies 408 identified in database 406.

In another example, CCM tags 110 may include domain names in events 108. For example, a user may enter an email address into a webpage field during a web session. CCM 100 may hash the email address or strip out the email domain address. CCM 100 may use the domain name to identify a particular company and location 408 from database 406.

As also described above, event processor 144 may generate relevancy scores 402 that indicate the relevancy of content 112 with different topics 102. For example, content 112 may include multiple words associate with topics 102. Event processor 144 may calculate relevancy scores 402 for content 112 based on the number and position words associated with a selected topic.

CSG 400 may calculate metrics from events 108 for particular companies 408. For example, CSG 400 may identify a group of events 108 for a current week that include the same IP address 404 associated with a same company and company location 408. CSG 400 may calculate a consumption score 410 for company 408 based on an average relevancy score 402 for the group of events 108. CSG 400 also may adjust the consumption score 410 based on the number of events 108 and the number of unique users generating the events 108.

CSG 400 may generate consumption scores 410 for company 408 for a series of time periods. CSG 400 may identify a surge 412 in consumption scores 410 based on changes in consumption scores 410 over a series of time periods. For example, CSG 400 may identify surge 412 based on changes in content relevancy, number of unique users, and number of events over several weeks. It has been discovered that surge 412 may correspond with a unique period when companies have heightened interest in a particular topic and are more likely to engage in direct solicitations related to that topic.

CCM 100 may send consumption scores 410 and/or any surge indicators 412 to publisher 118. Publisher 118 may store a contact list 200 that includes contacts 418 for company ABC. For example, contact list 200 may include email addresses or phone number for employees of company ABC. Publisher 118 may obtain contact list 200 from any source such as from a customer relationship management (CRM) system, commercial contact lists, personal contacts, third parties lead services, retail outlets, promotions or points of sale, or the like or any combination thereof.

In one example, CCM 100 may send weekly consumption scores 410 to publisher 118. In another example, publisher 118 may have CCM 100 only send surge notices 412 for companies on list 200 surging for particular topics 102.

Publisher 118 may send content 420 related to surge topics to contacts 418. For example, publisher 118 may send email advertisements, literature, or banner ads related to a firewall to contacts 418. Alternatively, publisher 118 may call or send direct mailings regarding firewalls to contacts 418. Since CCM 100 identified surge 412 for a firewall topic at company ABC, contacts 418 at company ABC are more likely to be interested in reading and/or responding to content 420 related to firewalls. Thus, content 420 is more likely to have a higher impact and conversion rate when sent to contacts 418 of company ABC during surge 412.

In another example, publisher 118 may sell a particular product, such as firewalls. Publisher 118 may have a list of contacts 418 at company ABC known to be involved with purchasing firewall equipment. For example, contacts 418 may include the chief technology officer (CTO) and information technology (IT) manager at company ABC. CCM 100 may send publisher 118 a notification whenever a surge 412 is detected for firewalls at company ABC. Publisher 118 then may automatically send content 420 to specific contacts 418 at company ABC with job titles most likely to be interested in firewalls.

CCM 100 also may use consumption scores 410 for advertising verification. For example, CCM 100 may compare consumption scores 410 with advertising content 420 sent to companies or individuals. Advertising content 420 with a particular topic sent to companies or individuals with a high consumption score or surge for that same topic may receive higher advertising rates.

Figure 9:
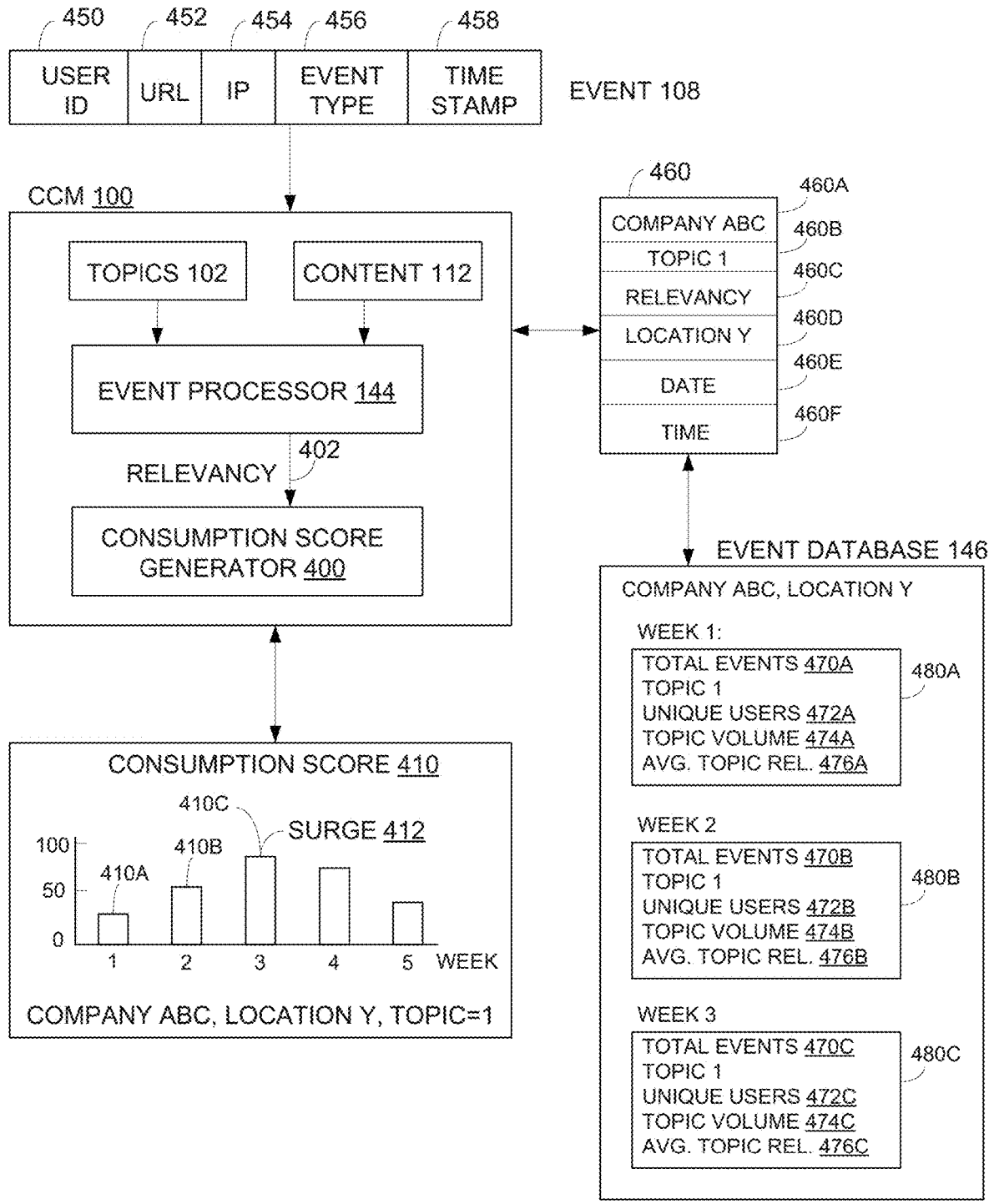
FIG. 9 depicts the example consumption score generator in more detail.

FIG. 9 shows in more detail how CCM 100 generates consumption scores 410. CCM 100 may receive millions of events from millions of different users associated with thousands of different domains every day. CCM 100 may accumulate the events 108 for different time periods, such as for each week. Week time periods are just one example and CCM 100 may accumulate events 108 for any selectable time period. CCM 100 also may store a set of topics 102 for any selectable subject matter. CCM 100 also may dynamically generate some of topics 102 based on the content identified in events 108 as described above.

Events 108 as mentioned above may include a user ID 450, URL 452, IP address 454, event type 456, and timestamp 458. Event processor 144 may identify content 112 located at URL 542 and select one of topics 102 for comparing with content 112. Event processor 144 may generate an associated relevancy score 402 indicating the relevancy of content 112 to selected topic 102. Relevancy score 402 may alternatively be referred to as a topic score.

CSG 400 may generate consumption data 460 from events 108. For example, CSG 400 may identify a company 460A associated with IP address 454. CSG 400 also may calculate a relevancy score 460C between content 112 and the selected topic 460B. CSG 400 also may identify a location 460D for with company 460A and identify a date 460E and time 460F when event 108 was detected.

CSG 400 may generate consumption metrics 480 from consumption data 460. For example, CSG 400 may calculate a total number of events 470A associated with company 460A (company ABC) and location 460D (location Y) for all topics during a first time period, such as for a first week. CSG 400 also may calculate the number of unique users 472A generating the events 108 associated with company ABC and topic 460B for the first week. CSG 400 may calculate for the first week a total number of events generated by company ABC for topic 460B (topic volume 474A). CSG 400 also may calculate an average topic relevancy 476A for the content accessed by company ABC and associated with topic 460B. CSG 400 may generate consumption metrics 480A-480C for sequential time periods, such as for three consecutive weeks.

CSG 400 may generate consumption scores 410 based on consumption metrics 480A-480C. For example, CSG 400 may generate a first consumption score 410A for week 1 and generate a second consumption score 410B for week 2 based in part on changes between consumption metrics 480A for week 1 and consumption metrics 480B for week 2. CSG 400 may generate a third consumption score 410C for week 3 based in part on changes between consumption metrics 480A, 480B, and 480C for weeks 1, 2, and 3, respectively. In one example, any consumption score 410 above as threshold value is identified as a surge 412.

Figure 10:
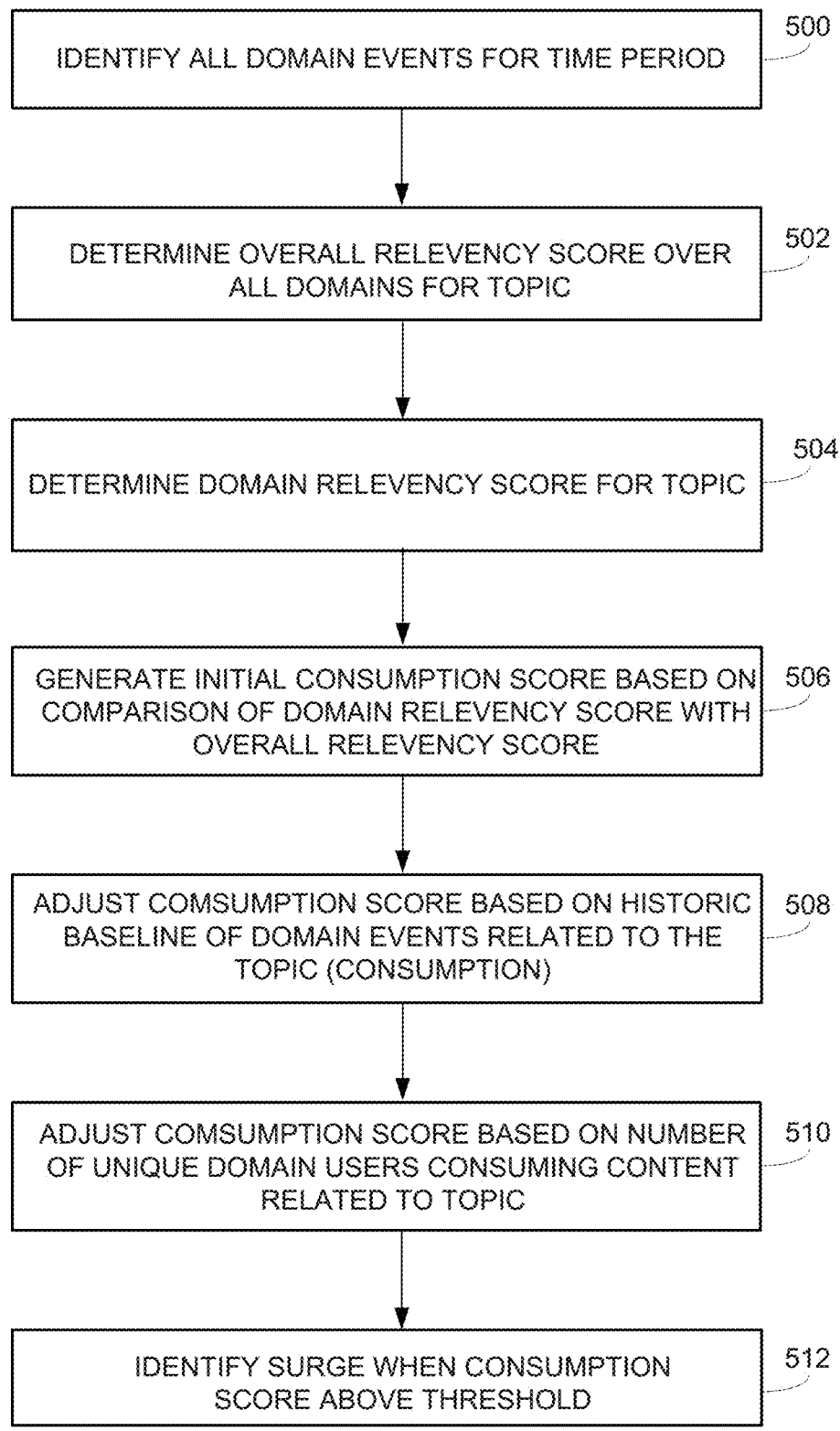
FIG. 10 depicts an example process for identifying a surge in consumption scores.

FIG. 10 depicts a process for identifying a surge in consumption scores. In operation 500, the CCM may identify all domain events for a given time period. For example, for a current week the CCM may accumulate all of the events for every IP address (domain) associated with every topic.

The CCM may use thresholds to select which domains to generate consumption scores. For example, for the current week the CCM may count the total number of events for a particular domain (domain level event count (DEC)) and count the total number of events for the domain at a particular location (metro level event count (DMEC)).

The CCM may calculate the consumption score for domains with a number of events more than a threshold (DEC>threshold). The threshold can vary based on the number of domains and the number of events. The CCM may use the second DMEC threshold to determine when to generate separate consumption scores for different domain locations. For example, the CCM may separate subgroups of company ABC events for the cities of Atlanta, New York, and Los Angeles that have each a number of events DMEC above the second threshold.

In operation 502, the CCM may determine an overall relevancy score for all selected domains for each of the topics. For example, the CCM for the current week may calculate an overall average relevancy score for all domain events associated with the firewall topic.

In operation 504, the CCM may determine a relevancy score for a specific domain. For example, the CCM may identify a group of events having a same IP address associated with company ABC. The CCM may calculate an average domain relevancy score for the company ABC events associated with the firewall topic.

In operation 506, the CCM may generate an initial consumption score based on a comparison of the domain relevancy score with the overall relevancy score. For example, the CCM may assign an initial low consumption score when the domain relevancy score is a certain amount less than the overall relevancy score. The CCM may assign an initial medium consumption score larger than the low consumption score when the domain relevancy score is around the same value as the overall relevancy score. The CCM may assign an initial high consumption score larger than the medium consumption score when the domain relevancy score is a certain amount greater than the overall relevancy score. This is just one example, and the CCM may use any other type of comparison to determine the initial consumption scores for a domain/topic.

In operation 508, the CCM may adjust the consumption score based on a historic baseline of domain events related to the topic. This is alternatively referred to as consumption. For example, the CCM may calculate the number of domain events for company ABC associated with the firewall topic for several previous weeks.

The CCM may reduce the current week consumption score based on changes in the number of domain events over the previous weeks. For example, the CCM may reduce the initial consumption score when the number of domain events fall in the current week and may not reduce the initial consumption score when the number of domain events rises in the current week.

In operation 510, the CCM may further adjust the consumption score based on the number of unique users consuming content associated with the topic. For example, the CCM for the current week may count the number of unique user IDs (unique users) for company ABC events associated with firewalls. The CCM may not reduce the initial consumption score when the number of unique users for firewall events increases from the prior week and may reduce the initial consumption score when the number of unique users drops from the previous week.

In operation 512, the CCM may identify surges based on the adjusted weekly consumption score. For example, the CCM may identify a surge when the adjusted consumption score is above a threshold.

Figure 11:
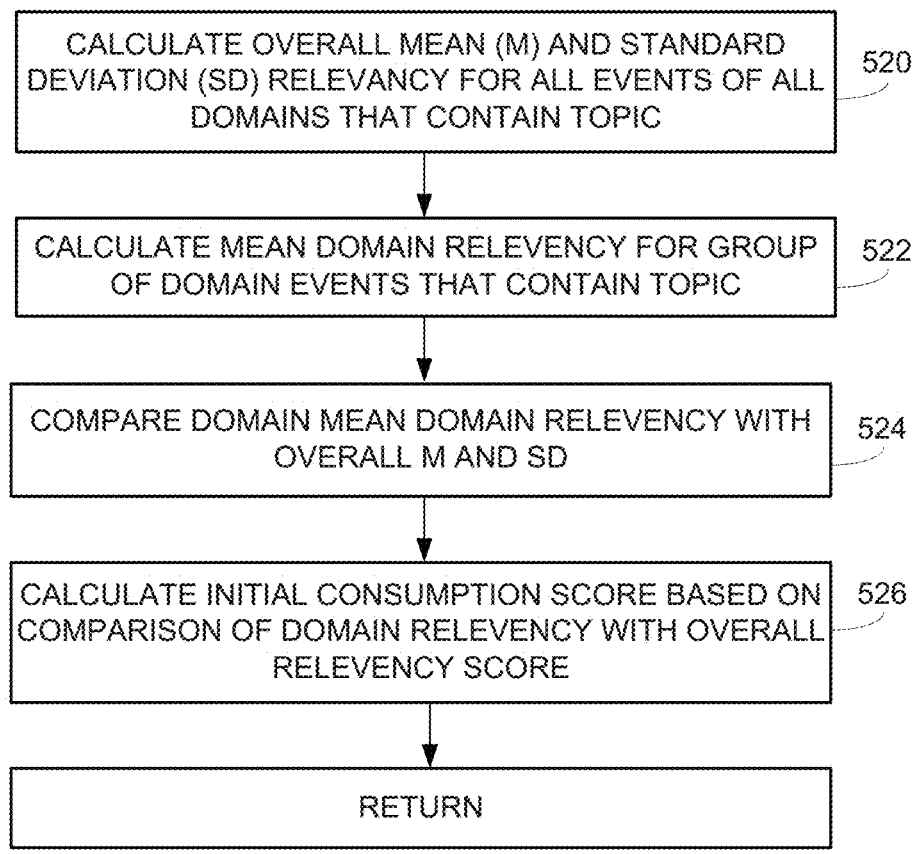
FIG. 11 depicts an example process for calculating initial consumption scores.

FIG. 11 depicts in more detail the process for generating an initial consumption score. It should be understood this is just one example scheme and a variety of other schemes also may be used.

In operation 520, the CCM may calculate an arithmetic mean (M) and standard deviation (SD) for each topic over all domains. The CCM may calculate M and SD either for all events for all domains that contain the topic, or alternatively for some representative (big enough) subset of the events that contain the topic. The CCM may calculate the overall mean and standard deviation as follows:

$$\text{Mean: } M = \frac{1}{n} * \Sigma_1^n x_i$$

$$\text{Standard deviation: } SD = \sqrt{\frac{1}{n-1} \Sigma_1^n (x_i - M)^2}$$

Where $x_i$ is a topic relevancy and n is a total number of events.

In operation 522, the CCM may calculate a mean (average) domain relevancy for each group of domain and/or domain/metro events for each topic. For example, for the past week the CCM may calculate the average relevancy for company ABC events for firewalls.

In operation 524, the CCM may compare the domain mean relevancy with the overall mean (M) relevancy and over standard deviation (SD) relevancy for all domains. For example, the CMM may assign three different levels to the domain mean relevancy (DMR).

Low: DMR<M−0.5*SD ~33% of all values
Medium: M−0.5*SD<DMR<M+0.5*SD ~33% of all values
High: DMR>M+0.5*SD ~33% of all values In operation 526, the CCM may calculate an initial consumption score for the domain/topic based on the above relevancy levels. For example, for the current week the CCM may assign one of the following initial consumption scores to the company ABC firewall topic. Again, this just one example of how the CCM may assign an initial consumption score to a domain/topic.

Relevancy=High: initial consumption score=100
Relevancy=Medium: Initial consumption score=70
Relevancy=Low: Initial consumption score 40.

Figure 12:
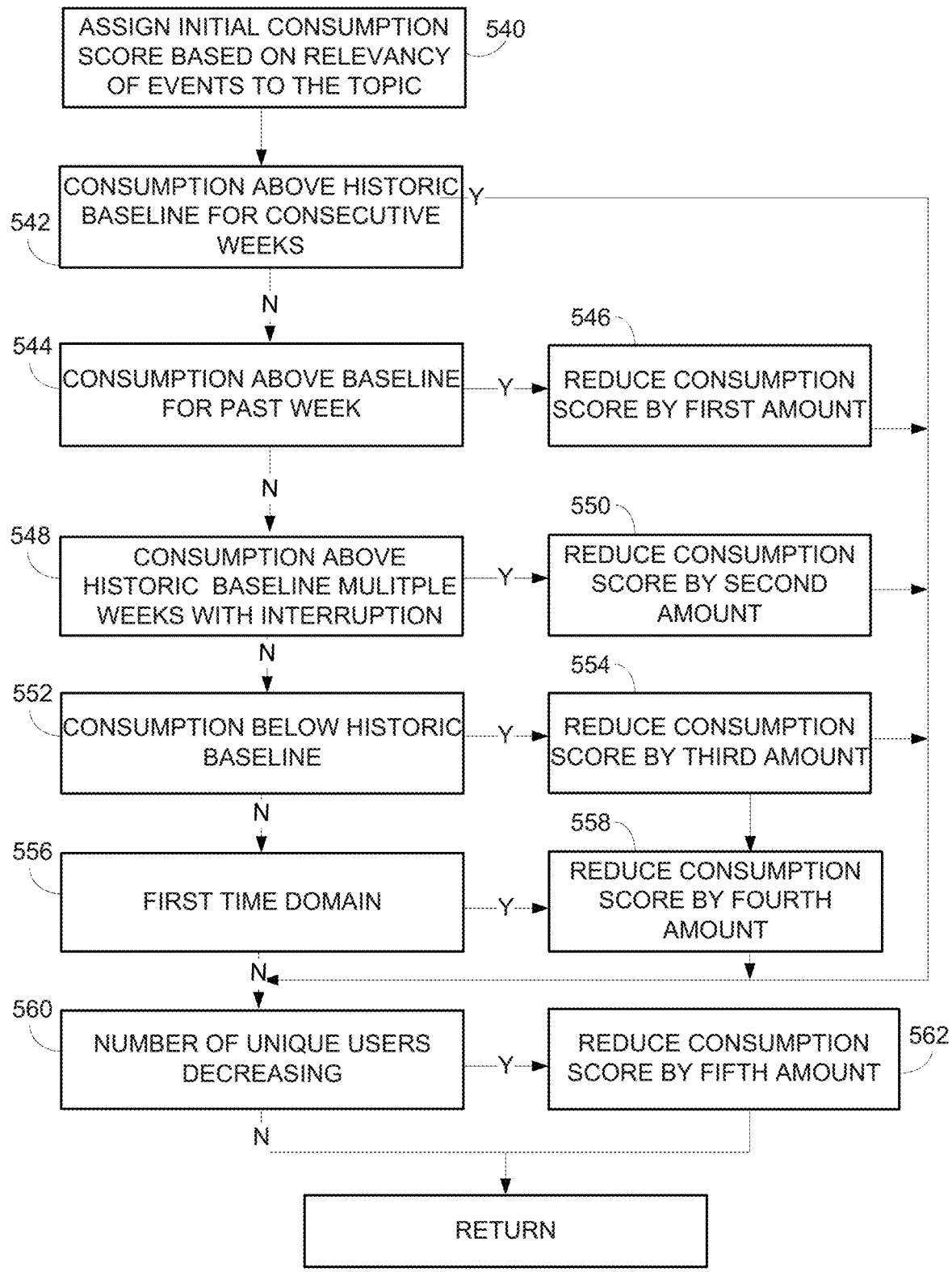
FIG. 12 depicts an example process for adjusting the initial consumption scores based on historic baseline events.

FIG. 12 depicts one example of how the CCM may adjust the initial consumption score. These are also just examples and the CCM may use other schemes for calculating a final consumption score. In operation 540, the CCM may assign an initial consumption score to the domain/location/topic as described above in FIG. 11.

The CCM may calculate a number of events for domain/location/topic for a current week. The number of events is alternatively referred to as consumption. The CCM also may calculate the number of domain/location/topic events for previous weeks and adjust the initial consumption score based on the comparison of current week consumption with consumption for previous weeks.

In operation 542, the CCM may determine if consumption for the current week is above historic baseline consumption for previous consecutive weeks. For example, the CCM may determine is the number of domain/location/topic events for the current week is higher than an average number of domain/location/topic events for at least the previous two weeks. If so, the CCM may not reduce the initial consumption value derived in FIG. 11.

If the current consumption is not higher than the average consumption in operation 542, the CCM in operation 544 may determine if the current consumption is above a historic baseline for the previous week. For example, the CCM may determine if the number of domain/location/topic events for the current week is higher than the average number of domain/location/topic events for the previous week. If so, the CCM in operation 546 may reduce the initial consumption score by a first amount.

If the current consumption is not above than the previous week consumption in operation 544, the CCM in operation 548 may determine if the current consumption is above the historic consumption baseline but with interruption. For example, the CCM may determine if the number of domain/location/topic events has fallen and then risen over recent weeks. If so, the CCM in operation 550 may reduce the initial consumption score by a second amount.

If the current consumption is not above than the historic interrupted baseline in operation 548, the CCM in operation 552 may determine if the consumption is below the historic consumption baseline. For example, the CCM may determine if the current number of domain/location/topic events is lower than the previous week. If so, the CCM in operation 554 may reduce the initial consumption score by a third amount.

If the current consumption is above the historic base line in operation 552, the CCM in operation 556 may determine if the consumption is for a first-time domain. For example, the CCM may determine the consumption score is being calculated for a new company or for a company that did not previously have enough events to qualify for calculating a consumption score. If so, the CCM in operation 558 may reduce the initial consumption score by a fourth amount.

In one example, the CCM may reduce the initial consumption score by the following amounts. This of course is just an example and the CCM may use any values and factors to adjust the consumption score.

Consumption above historic baseline consecutive weeks (operation 542). —0

Consumption above historic baseline past week (operation 544). —20 (first amount).

Consumption above historic baseline for multiple weeks with interruption (operation 548)—30 (second amount).

Consumption below historic baseline (operation 552). —40 (third amount).

First time domain (domain/metro) observed (operation 556). —30 (fourth amount).

As explained above, the CCM also may adjust the initial consumption score based on the number of unique users. The CCM tags 110 in FIG. 8 may include cookies placed in web browsers that have unique identifiers. The cookies may assign the unique identifiers to the events captured on the web browser. Therefore, each unique identifier may generally represent a web browser for a unique user. The CCM may identify the number of unique identifiers for the domain/location/topic as the number of unique users. The number of unique users may provide an indication of the number of different domain users interested in the topic.

In operation 560, the CCM may compare the number of unique users for the domain/location/topic for the current week with the number of unique users for the previous week. The CCM may not reduce the consumption score if the number of unique users increases over the previous week. When the number of unique users decrease, the CCM in operation 562 may further reduce the consumption score by a fifth amount. For example, the CCM may reduce the consumption score by 10.

The CCM may normalize the consumption score for slower event days, such as weekends. Again, the CCM may use different time periods for generating the consumption scores, such as each month, week, day, hour, etc. The consumption scores above a threshold are identified as a surge or spike and may represent a velocity or acceleration in the interest of a company or individual in a particular topic. The surge may indicate the company or individual is more likely to engage with a publisher who presents content similar to the surge topic.

3. Consumption DNA

One advantage of domain-based surge detection is that a surge can be identified for a company without using personally identifiable information (PII) of the company employees. The CCM derives the surge data based on a company IP address without using PII associated with the users generating the events.

In another example, the user may provide PII information during web sessions. For example, the user may agree to enter their email address into a form prior to accessing content. As described above, the CCM may hash the PII information and include the encrypted PII information either with company consumption scores or with individual consumption scores.

Figure 13:
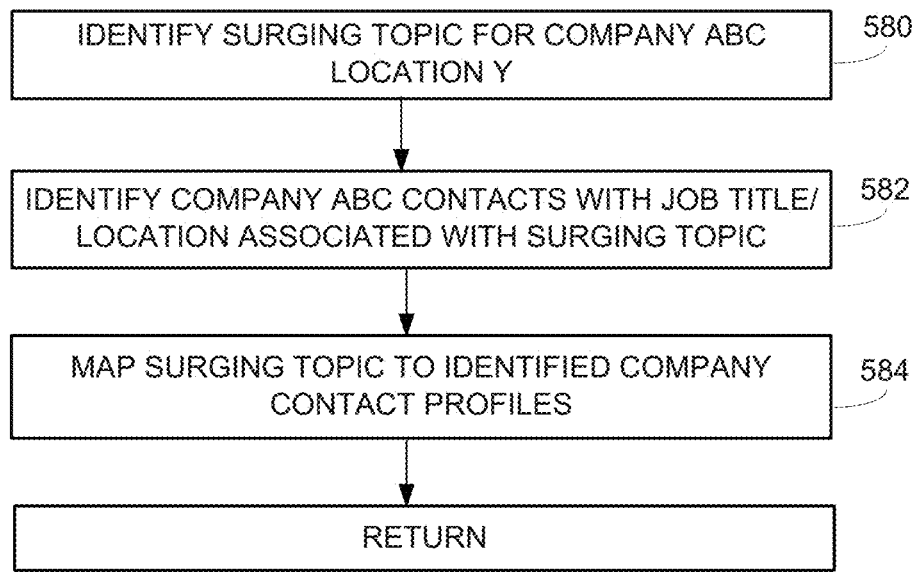
FIG. 13 depicts an example process for mapping surge topics with contacts.

FIG. 13 shows one example process for mapping domain consumption data to individuals. In operation 580, the CCM may identify a surging topic for company ABC at location Y as described above. For example, the CCM may identify a surge for company ABC in New York for firewalls.

In operation 582, the CCM may identify users associated with company ABC. As mentioned above, some employees at company ABC may have entered personal contact information, including their office location and/or job titles into fields of webpages during events 108. In another example, a publisher or other party may obtain contact information for employees of company ABC from CRM customer profiles or third party lists.

Either way, the CCM or publisher may obtain a list of employees/users associated with company ABC at location Y. The list also may include job titles and locations for some of the employees/users. The CCM or publisher may compare the surge topic with the employee job titles. For example, the CCM or publisher may determine that the surging firewall topic is mostly relevant to users with a job title such as engineer, chief technical officer (CTO), or information technology (IT).

In operation 584, the CCM or publisher maps the surging firewall topic to profiles of the identified employees of company ABC. In another example, the CCM or publisher may not be as discretionary and map the firewall surge to any user associated with company ABC. The CCM or publisher then may direct content associated with the surging topic to the identified users. For example, the publisher may direct banner ads or emails for firewall seminars, products, and/or services to the identified users.

Consumption data identified for individual users is alternatively referred to as Dino DNA and the general domain consumption data is alternatively referred to as frog DNA. Associating domain consumption and surge data with individual users associated with the domain may increase conversion rates by providing more direct contact to users more likely interested in the topic.

4. Intent Measurement

Figure 14:
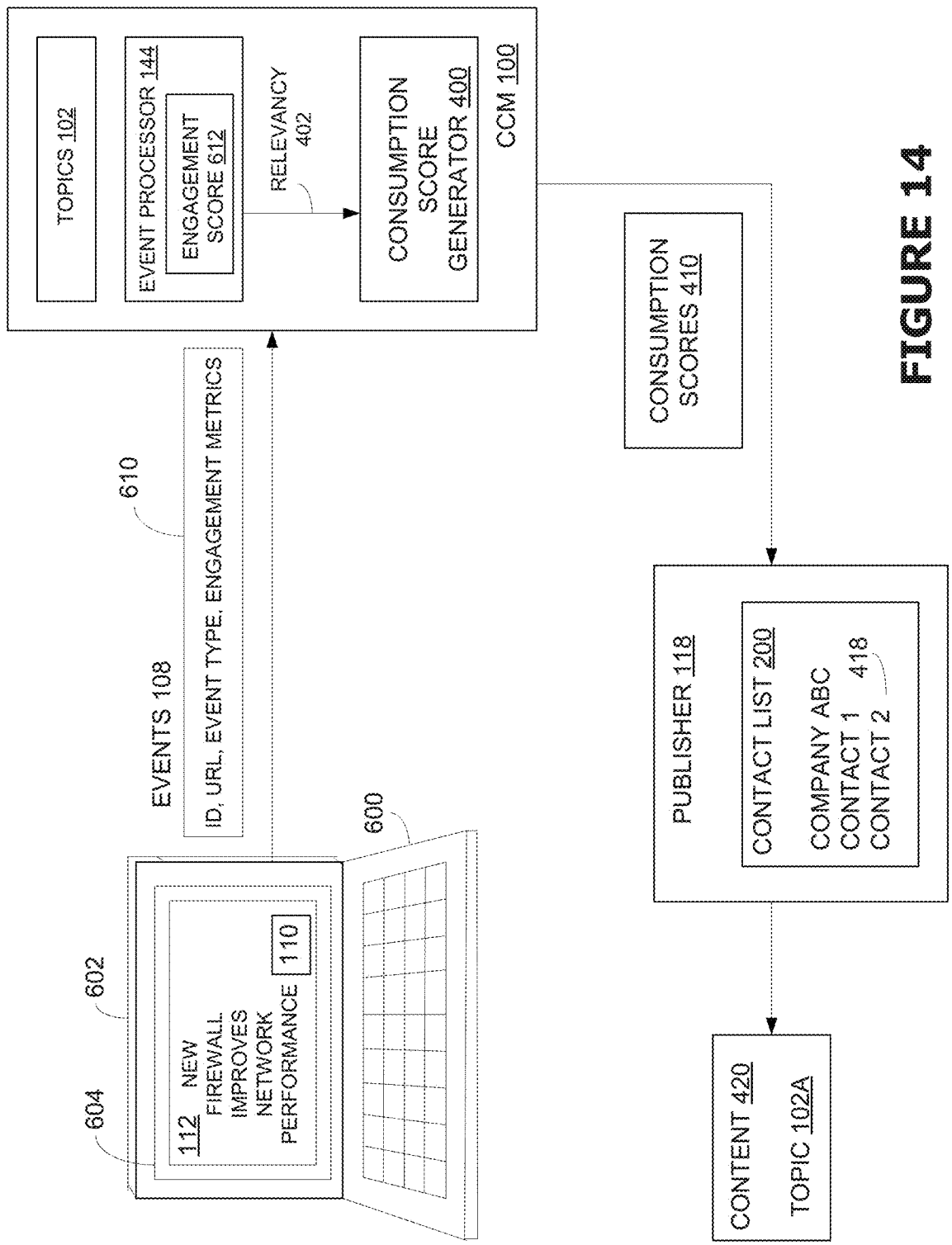
FIG. 14 depicts an example content consumption monitor calculating content intent.

FIG. 14 depicts how CCM 100 may calculate consumption scores based on user engagement. A computer 600 may comprise a laptop, smart phone, tablet or any other device for accessing content 112. In this example, a user may open a web browser 604 on a screen 602 of computer 600. CCM tag 110 may operate within web browser 604 and monitor user web sessions. As explained above, CCM tag 110 may generate events 108 for the web session that include an identifier (ID), a URL for content 112, and an event type that identifies an action or activity associated with content 112. For example, CCM tag 110 may add an event type identifier into event 108 indicating the user downloaded an electric document.

In one example, CCM tag 110 also may generate a set of impressions, which is alternatively referred to as engagement metrics 610, indicating actions taken by the user while viewing content 112. For example, engagement metrics 610 may indicate how long the user dwelled on content 112 and/or how the user scrolled through content 112. Engagement metrics 610 may indicate a level of engagement or interest the user has in content 112. For example, the user may spend more time on the webpage and scroll through webpage at a slower speed when the user is more interested in the content 112.

CCM 100 may calculate an engagement score 612 for content 112 based on engagement metrics 610. CCM 100 may use engagement score 612 to adjust a relevancy score 402 for content 112. For example, CCM 100 may calculate a larger engagement score 612 when the user spends a larger amount of time carefully paging through content 112. CCM 100 then may increase relevancy score 402 of content 112 based on the larger engagement score 612. CSG 400 may adjust consumption scores 410 based on the increased relevancy 402 to more accurately identify domain surge topics. For example, a larger engagement score 612 may produce a larger relevancy 402 that produces a larger consumption score 410.

Figure 15:
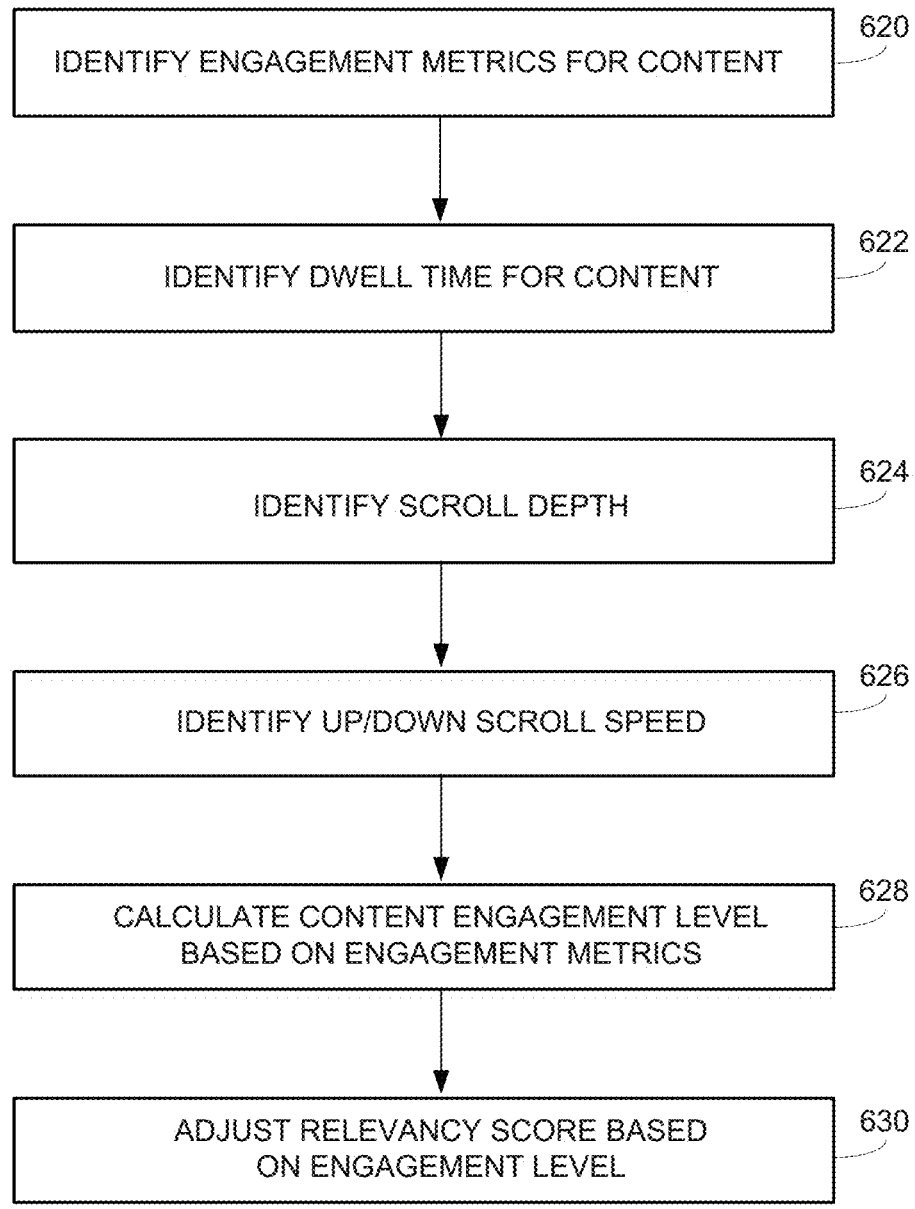
FIG. 15 depicts an example process for adjusting a consumption score based on content intent.

FIG. 15 depicts an example process for calculating the engagement score for content. In operation 620, the CCM may receive events that include content engagement metrics. For example, the engagement metrics may indicate any user interaction with content including tab selections that switch to different pages, page movements, mouse page scrolls, mouse clicks, mouse movements, scroll bar page scrolls, keyboard page movements, touch screen page scrolls, or any other content movement or content display indicator.

In operation 622, the CCM may identify the content dwell time. The dwell time may indicate how long the user actively views a page of content. In one example, tag 110 may stop a dwell time counter when the user changes page tabs or becomes inactive on a page. Tag 110 may start the dwell time counter again when the user starts scrolling with a mouse or starts tabbing.

In operation 624, the CCM may identify from the events a scroll depth for the content. For example, the CCM may determine how much of a page the user scrolled through or reviewed. In one example, the CCM tag or CCM may convert a pixel count on the screen into a percentage of the page.

In operation 626, the CCM may identify an up/down scroll speed. For example, dragging a scroll bar may correspond with a fast scroll speed and indicate the user has less interest in the content. Using a mouse wheel to scroll through content may correspond with a slower scroll speed and indicate the user is more interested in the content.

The CCM may assign higher values to engagement metrics that indicate a higher user interest and assign lower values to engagement metrics that indicate lower user interest. For example, the CCM may assign a larger value in operation 622 when the user spends more time actively dwelling on a page and may assign a smaller value when the user spends less time actively dwelling on a page.

In operation 628, the CCM may calculate the content engagement score based on the values derived in operations 622-628. For example, the CCM may add together and normalize the different values derived in operations 622-628.

In operation 630, the CCM may adjust content relevancy values described above in FIGS. 1-7 based on the content engagement score. For example, the CCM may increase the relevancy value when the content has a high engagement score and decrease the relevancy for a lower engagement score.

CCM 100 or CCM tag 110 in FIG. 14 may adjust the values assigned in operations 622-626 based on the type of device 600 used for viewing the content. For example, the dwell times, scroll depths, and scroll speeds, may vary between smart phone, tablets, laptops and desktop computers. CCM 100 or tag 110 may normalize or scale the engagement metric values so different devices provide similar relative user engagement results.

5. Website Classification

It may be difficult to identify company purchasing intent based on brief user visits to a webpage that contains little content. However, a pattern of users visiting multiple vendor sites associated with the same topic during the same time period may identify a more significant interest signal. A site classifier may adjust relevancy scores based on different website classifications and produce surge signals that better indicate a company interest in purchasing a particular product or service.

Figure 16:
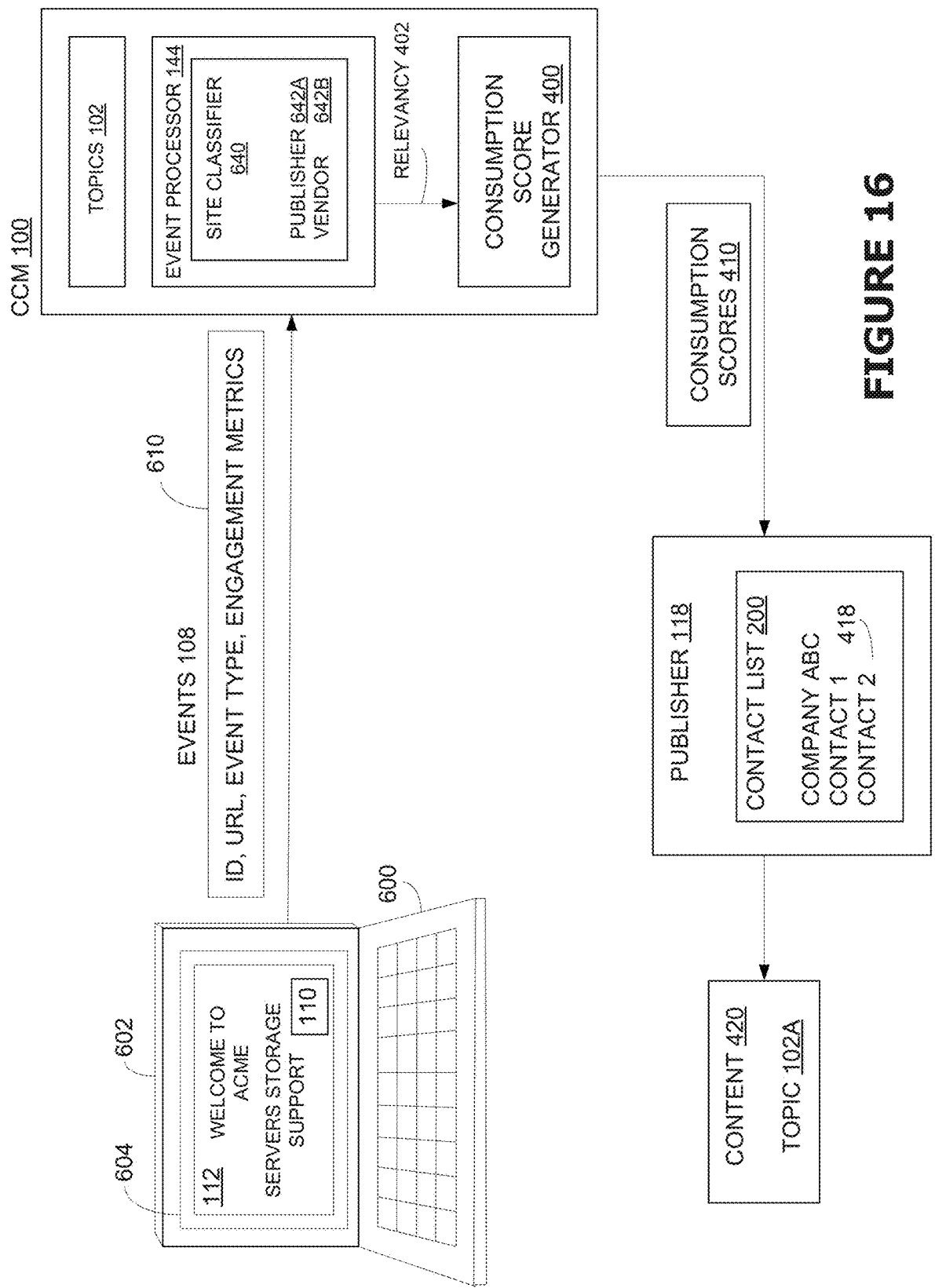
FIG. 16 depicts an example of the site classifier in more detail.

FIG. 16 depicts how CCM 100 may calculate consumption scores based on website classifications. Computer 600 may comprise a laptop, smart phone, tablet or any other device for accessing content 112. In this example, a user may open a web browser 604 on a screen 602 of computer 600. CCM tag 110 may operate within web browser 604 and monitor user web sessions. As explained above, CCM tag 110 may generate events 108 for the web session that include an identifier (ID), a URL for content 112, and an event type that identifies an action or activity associated with content 112. For example, CCM tag 110 may add an event type identifier into event 108 indicating the user downloaded an electronic document.

As also explained above, CCM tag 110 may generate a set of engagement metrics 610 for actions taken by the user while viewing content 112. For example, engagement metrics 610 may indicate how long the user dwelled on content 112 and/or how the user scrolled through content 112. Engagement metrics 610 may indicate a level of engagement or interest the user has in content 112. For example, the user may spend more time on the webpage and scroll through the webpage at a slower speed when the user is more interested in the content 112.

CCM 100 may adjust consumption scores 410 based on a category of website 642 containing content 112. For example, a first category of website 642A may be associated with a publisher, such as a news reporting company or a blog site. A second category of website 642B may be associated with a vendor, such as a manufacturer or retailer that sells products or services. CCM 100 may adjust relevancy score 402 and resulting consumption scores 410 based on content 112 being located on publisher website 642A or located on vendor website 642B.

For example, it has been discovered that a user may be closer to making a purchase decision when viewing content on a vendor website 642B compared to viewing similar content on a publisher website 642A. Accordingly, CCM 100 may increase relevancy score 402 associated with content 112 located on a vendor website 642B.

CCM 100 may use the increased relevancy score 402 to calculate consumption scores 410 as described above. The website classification-based consumption scores 410 may identify surges 412 as shown in FIG. 9 that more accurately indicate when companies are ready to purchase products or services associated with topics 102.

A publisher website may refer to any website that focuses more on providing informational content compared to content primarily directed to selling products or services. For example, the publisher may be a news service or blog that displays news articles and commentary or a service organization or marketer that publish content. The vendor website contain content primarily directed toward selling products or services and may include websites operated by manufacturers, retailers, or any other intermediary.

Marketer websites may be a sub-category of publisher websites and may refer to websites focusing on the marketing and discussions of different products or services. For example, a marketer website may include online trade magazines or marketing websites for different product and service categories.

News websites may be another sub-category of publisher websites and may refer to websites directed to more general news topics. For example, a news website may include news articles on any current subject matter.

The example explanations below refer to publisher websites, vendor websites, news websites, and marketer websites. However, it should be understood that the schemes described below may be used to classify any category of website that may have an associated structure, content, or type of user engagement. It should also be understood that the classification schemes described below may be used for classifying any group of content including different content located on the same website or content located for example on servers or cloud systems.

Figure 17:
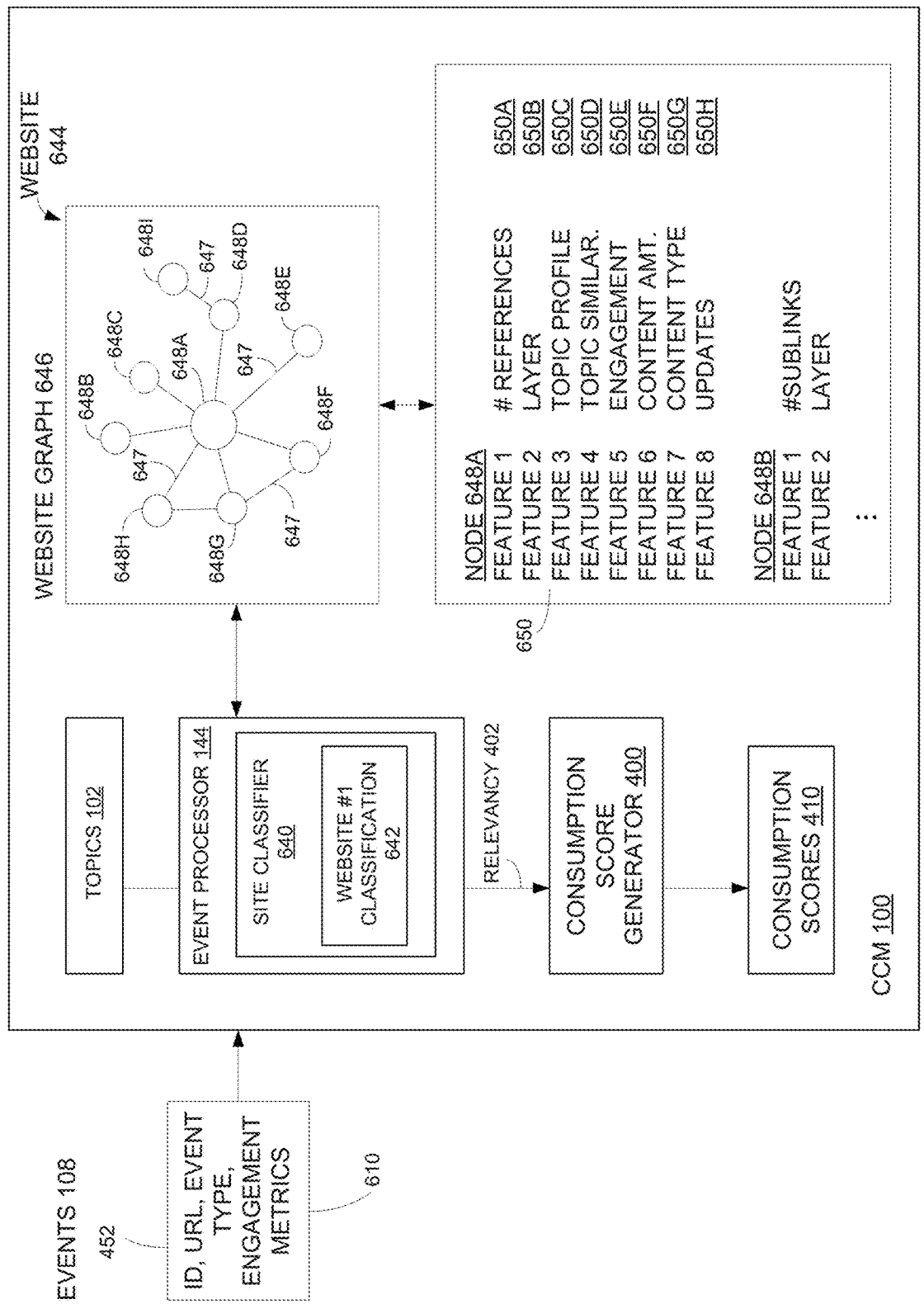
FIG. 17 depicts an example process for site classification.

FIG. 17 shows how site classifier 640 operates in more detail. Site classifier 640 may generate graphs 646 to represent websites 644 accessed by users, including explicit representation pieces of content (webpages) and the references (hyperlinks) they have to each other. Each website (graph) 646 may include multiple nodes 648 each associated with a piece of content on website 644. For example, each node 648 may represent a webpage on website 644. Graph 646 also may include edges 647 identifying the references between the different nodes 648. For example, a first home page 648A on website 644 may include references to webpages 648B-648I. Webpage 648G may include second level references 647 to webpages 648H and 648F. Webpage 648D may include a second level references 647 to webpage 648I.

Site classifier 640 may classify website 644 based on the structure of graph 646. For example, home page 648A in graph 646 may include references 647 to many subwebpages 648B-648H. Graph 646 also may include only a few webpage sublevels below home page 648A. For example, nodes 648B-648H are located on a first sub-level below home page 648A. An additional webpage sublevel exists that includes webpage 648I.

A website 644 with a home page 648A with a relatively large number of references 647 to a large number of first level subpages 648B-648H may more likely represent a vendor website 644. For example, a vendor website may include multiple products or services all accessed through the home page. Further, a vendor website 644 may have a relatively small number of lower level references 647 and associated webpage sublevels (shallow depth). In this example, site classifier 640 may predict website 644 as associated with a vendor.

In another example, home page 648A may include relatively few references 647 to other webpages 648. Further, there may be many more sublayers of webpages 648 linked to other webpages. In other words, graph 646 may have a deeper tree structure. In this example, site classifier 640 may predict website 644 as associated with a publisher.

Based on the structure of graph 646 in FIG. 17, site classifier 640 may predict website 644 is a vendor website. A company accessing a vendor website may indicate more urgency in a company intent to purchase a product associated with the website. Accordingly, site classifier 640 may increase the relevancy scores 402 produced from content 112 accessed from vendor website 644.

This is just one example of how site classifier 640 may classify websites 644 based on an associated webpage structure. Site classifier 640 also may classify websites 644 based on other features 650 extracted from the HTML in the webpages at the URLs 452 identified in events 108.

Site classifier 640 may first determine if a graph 646 already exists for the website 644 associated with URL 452 in event 108. If a graph 646 already exists, site classifier 640 may check a timestamp in event 108 with a timestamp assigned to graph 646. If a graph 646 has not been created for website 644 or the graph needs updating, site classifier 640 may download the HTML for the webpages on website 644.

Site classifier 640 extracts features 650 for each node/ webpage 648 and generates associated graph 646. For each node 648, site classifier 640 may identify the number of references 650A contained in the HTML by inspecting for the HTML for hrefs, anchors, and tags. Site classifier 640 also may identify the sublayer location 650B of node 648 within graph 646. For example, site classifier 640 may identify the fewest number of references 647 separating a node 648 from homepage node 648A.

After identifying layers 650B for each node 648, site classifier 640 may derive graph 646 identifying the relationships between each node 648. While shown graphically in FIG. 17, graph 646 may also or alternatively be generated in a table format that identifies the relationships between different nodes 648 and provides additional graph metrics, such as the number of node layers, the number of nodes on each node layer, and the number of links for each node layer.

As mentioned above, the number of references 650A and/or the association of reference links 647 with other nodes 648 may indicate the structure and associated type of website 644. A deeper tree structure with more lower level nodes 648 linked to other lower level nodes 648 may indicate a publisher website 644. A shallower tree structure with fewer node levels or fewer links at higher node levels may indicate a vendor website 644. Of course, this is just one example of the different structural features that may distinguish different website classes.

Site classifier 640 may generate a topic profile 650C for each node 648. For example, event processor 144 may use content analyzer 142 in FIG. 2 to identify a set of topics contained in the webpage. Topic profile 650C may provide an aggregated view of content on node 648. Site classifier 640 also may generate topic similarity values 650D indicating the similarity of topics on a particular node 648 with topics on other linked nodes 648 on a higher graph level, the same graph level, lower graph levels, or the similarity with topics for unlinked nodes on the same or other graph levels.

The relationships between topics on different nodes 648 also may indicate the type of webpage 648. For example, nodes 648 on a publisher website 644 may be more disparate and have a wider variety of topics 650C than nodes 648 on a vendor website 644. In another example, similar topics for nodes 648 on a same graph level or nodes on a same branch of graph 646 may more likely represent a vendor website.

Site classifier 640 may identify topic similarities 650D by identifying the topics on a first webpage, such as home webpage 648A. Site classifier 640 then compares the home page topics with the content on a second webpage. Content analyzer 142 in FIG. 2 then generates a set of relevancy scores indicating the relevancy or similarity of the second webpage to the home page. Of course, site classifier 640 may use other natural language processing schemes to identify topic similarities between different nodes 648. Site classifier 640 may generate topic similarities 650D between any linked nodes 648, nodes associated with a same or different graph levels, or any other node relationship.

Site classifier 640 also may generate engagement feature 650E for each webpage 648. As described above in FIGS. 14 and 15, CCM 100 may generate consumption scores 410 and identify company surges 412 based on user engagement metrics 610. As explained above, engagement feature 650E may indicate a level of engagement or interest the user has the webpage 648. For example, engagement feature 650E may capture information about how long the user dwelled on a particular webpage 648 and/or how the user scrolled through content in the webpage 648. The user may spend more time on a webpage and scroll at a slower speed when more interested in the webpage content 112.

Site classifier 640 may use engagement feature 650E to classify website 644. For example, users on a publisher news website 644 may on average spend more time reading articles on individual webpages 648 and may scroll multiple times through relatively long articles. Users on a vendor website 644 may on average spend less time viewing different products and scroll less on relatively short webpages 648. A user also may access a publisher news website more frequently, such as every day or several times a day. The user may access vendor websites 644 much less frequently, such as only when interested in purchasing a particular product.

In addition, users may spend more time on more webpages of a publisher website when there is a particular news story of interest that may be distributed over several publisher news stories. This additional engagement on the publisher website could be mistakenly identified as a company surge, when actually the additional engagement is due to a non-purchasing related news topic. On the other hand, users from a same company viewing multiple vendor websites within a relatively short time period, and/or the users viewing the vendor websites with additional engagement, may represent an increased company urgency to purchase a particular product.

Site classifier 640, or another module in event processor 144, may generate engagement scores 612 for each node 648 on website 644 as described above in FIGS. 14 and 15. Site classifier 640 then may classify website 644 as a publisher based at least partially on webpages 648 having higher engagement scores where users on average spend more time on the webpages, and visit the webpages more frequently. Site classifier 640 may classify website 644 as a vendor website based, at least partially, on webpages 648 having lower engagement scores where users spend less time on the webpage and visit the webpage less frequently, or have engagement scores with higher variance or other statistical characteristics.

Site classifier 640 may generate an average engagement score 612 for the webpages 648 on the same website 644. Site classifier 640 may increase relevancy score 402 when the amount and pattern of engagement scores 612 indicate a vendor website 644 and may reduce relevancy score 402 when the amount and pattern of engagement score 612 indicates a publisher website 644.

Different types of websites may contain different amounts of content. For example, individual webpages 648 on a publisher website 644 may generally contain more text (deeper content) than individual webpages 648 on a vendor website (shallower content). Site classifier 640 may calculate amounts of content 650F for individual webpages 648 in website 644. For example, site classifier 640 may count the number of words, paragraphs, documents, pictures, videos, images, etc. contained in individual webpages 648.

Site classifier 640 may calculate an average amount of content 650F in nodes 648 on the same website 644. An average content amount above some threshold may more likely represent a publisher website 644 and an average amount of content 650F below some threshold may more likely represent a vendor website 644. Site classifier 640 may increase relevancy score 402 when the average amount of content 650F indicates a vendor website 644 and may reduce relevancy score 402 when the average amount of content 650F indicates a publisher website 644.

Different types of websites may contain different types of content. For example, publisher websites 644 may contain more advertisements than vendor website 644. In another example, vendor sites may have a "contact us" webpage, product webpages, purchase webpages, etc. A "contact us" link in a publisher website may be hidden in several levels of webpages compared with a vendor website where the "contact us" link may be located on the home page. A vendor website also may have a more prominent hiring/careers webpage linked directly to home webpage.

Site classifier 640 may identify different types and locations of content 650F in the webpage HTML. For example, site classifier 640 may identify Iframes in the webpage HTML. An IFrame (Inline Frame) is an HTML document embedded inside another HTML document and is often used to insert content from another source, such as an advertisement.

Site classifier 640 also may classify websites 644 based on these other types of content 650G and locations of content 650G. Site Classifier may also identify "infinite scroll" techniques or "virtual page views" that allow a website visitor to continually scroll down an article, and, at end of content, produce a new article to continue reading within the same page without clicking a link. Examples: Forbes.com/BusinessInsider.com.

Site classifier 640 also may classify website 644 based on frequency of content updates 650H. For example, a publisher site may update and/or replace webpage content, such as news articles, more frequently than a vendor website replaces webpage content for products or services. Site classifier 640 may identify topics on the webpages 648 of website 644 on a scheduled frequency, such as every day, week, or month. Additionally, site classifier 640 may receive updates to new content added to a website, through a subscription to RSS feeds, if they exist. RSS feeds are an industry established way for website content producers to push notifications of new and updated material to a consumer. Site classifier 640 may generate an update value 650H indicating the frequently of topics changes on the webpages and/or website. A higher update value 650H may indicate a publisher site and a lower update value may indicate a vendor website.

Site classifier 640 may use any combination of features 650 to classify website 644. Site classifier 640 also may weight some features 650 higher than other features. For example, site classifier 640 may assign a higher vendor score to a website 644 identified with a shallow graph structure 646 compared with identifying website 644 with relatively shallow content 650F. Site classifier 640 generates a classification value for website 644 based on the combination of features 650 and associated weights. Site classifier 640 then adjusts relevancy 402 based on the classification value. For example, site classifier 640 may increase relevancy score 402 or consumption score 410 more for a larger vendor classification value and may decrease relevancy score 402 or consumption score 410 more for a larger publisher classification value.

Figure 18:
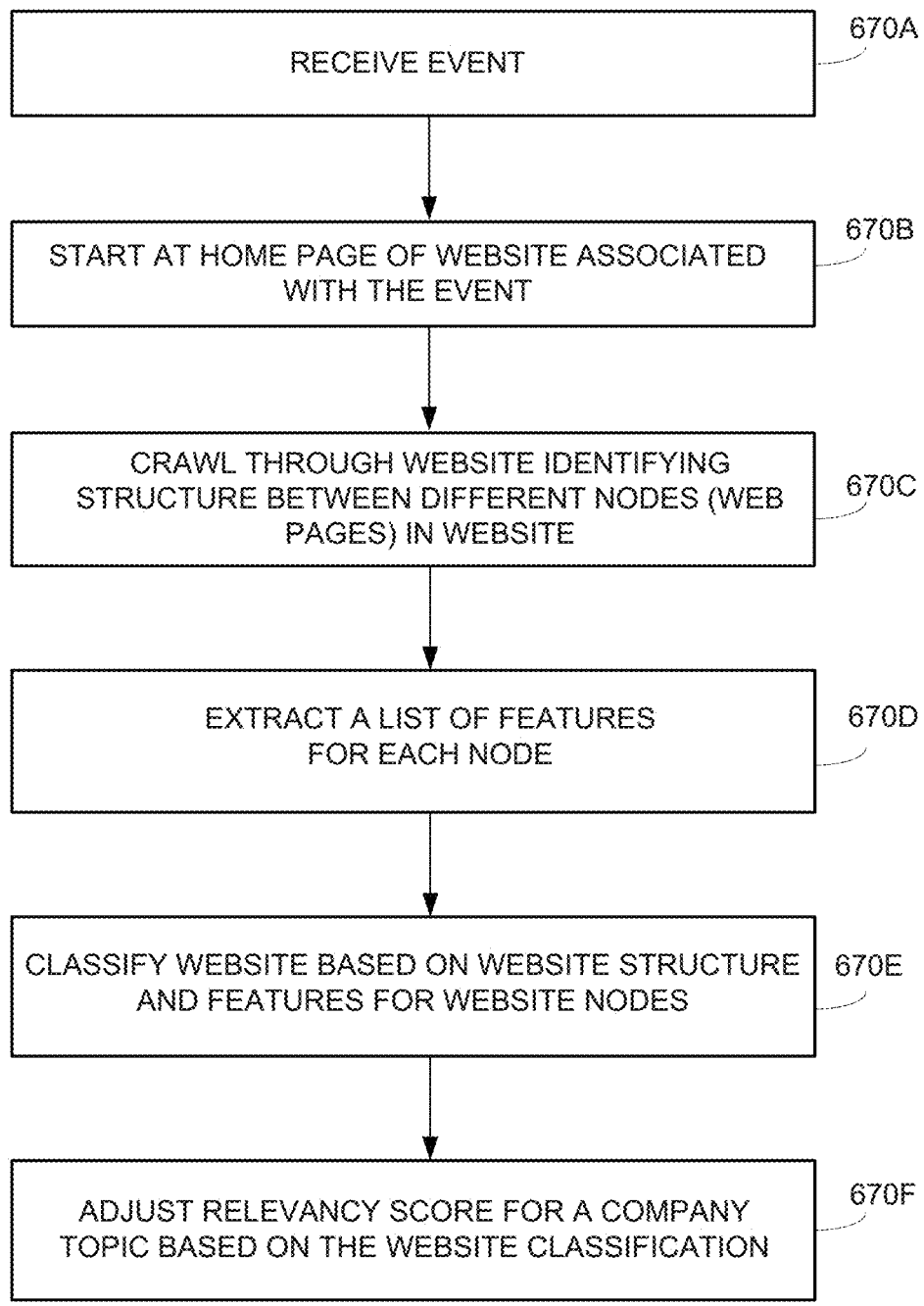
FIG. 18 depicts an example CCM that uses a site classifier.

FIG. 18 shows an example process for identifying company surge scores based on website classifications. In operation 670A, the site classifier may receive an event that includes a user ID, URL, event type, engagement metrics, and any other information identifying content or an activity on a webpage. The site classifier first may determine if a graph 646 already exists on the website associated with the URL. If an up to date graph 646 exists, the site classifier may have already classified the website. If so, site classifier may adjust any derived relevancy scores based on the website classification.

Otherwise, the site classifier in operation 670B may start at the home page of the website associated with the received event. In operation 670C, the site classifier may crawl through the website identifying the structure between nodes. For example, the site classifier identifies links on the home page to other webpages. The site classifier then identifies links in the HTML of the lower level pages to other pages to generate a website graph or tree structure as shown in FIG. 17.

In operation 670D, the site classifier extracts other features from the webpages as described above. For example, the site classifier identifies the number of references, layers of webpages, topics, interaction amounts and types of content, number of updates, etc. associated with each webpage. In operation 670E, the site classifier classifies the website based on the website structure and other node features. For example, the site classifier may use any combination of the features discussed above to generate a classification value for the website.

As explained above, the site classifier also may weigh different node features differently. For example, the site classifier may assign a larger weight to a website graph structure indicating a publisher website and assign a lower weight to a particular type of content associated with publisher websites.

Based on all of the weighted features, the site classifier may generate the classification value predicting the type of website. In operation 670F, the site classifier may adjust the relevancy score for company topics based on the classification value. For example, site classifier may increase the relevancy score more for a larger vendor classification value and may reduce the relevancy score more for a larger publisher classification value.

6. Website Fingerprinting Using Vectors

Site classifier 640 may generate vectors that represent the different features of webpages and websites. Site classifier 640 uses a machine learning model to then classify the different websites based on the feature vectors. The feature vectors are alternatively referred to as webpage embeddings and provide more accurate website classifications while using fewer computing resources in a classification task.

Figure 19:
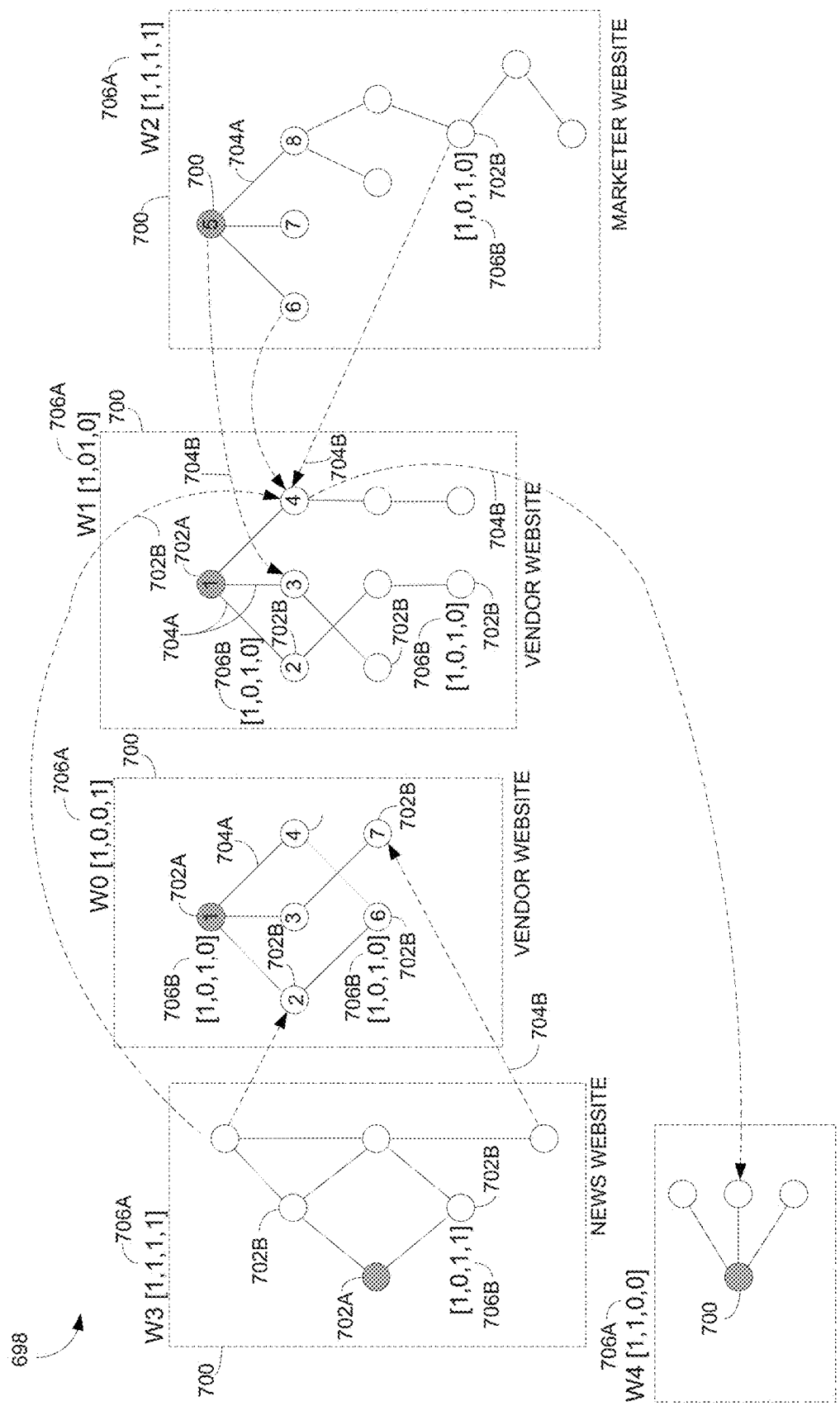
FIG. 19 depicts an example structural semantic network graph for webpages.

FIG. 19 shows an example structure for a network 698 that includes multiple websites 700 alternatively referred to as sites W0, W1, W2, W3, and W4. In one example, websites 700 may be associated with different types of organizations referred to as classes. For example, W0 and W1 may be vendor websites, W2 may be a marketer website, W3 may be a news website, and W4 may be any other class of website.

As explained above, vendor websites W0 and W1 may contain content primarily directed toward selling or promoting products or services and may include websites operated by manufacturers, retailers, or any other intermediary. Marketer websites W2 may be operated by organizations that provide content directed to marketing or promoting different products, such as an online trade magazine. News websites W3 may be operated by news services or blogs that contain news articles and commentary on a wide variety of different subjects. Website W4 may be any other class of website. For example, website W4 may be a website operated by an individual or operated by an entity not primarily focused on selling products or services.

Each website 700 includes a collection of webpages 702 alternatively referred to as nodes. Each website 700 may include a root webpage or node 702A and a set of other lower tiered nodes 702B. Each webpage 702 has a specific universal resource locator (URL) alternatively referred to as a link 704. Webpages 702 may include URLs 704A that link to other webpages 702 within the same website 700. Webpages 702 also may include URLs 704B that link to webpages 702 on other websites 700.

7. Structural Semantics

Across websites 700, the relationships (links 704A) between webpages 702 on the same websites 700 and relationships (links 704B) between webpages 702 on other websites 700 are referred to generally as structural semantics. In one example, site classifier 640 uses links 704 to capture the structural semantics across all websites 700.

As explained above, vendor websites W0 and W1 may have different structural semantics than marketer website W2 or news website W3. For example, vendor website W0 may have a different tree structure of links 704A from root page 702A to lower pages 702B compared with marketer website W2 or news website W3. Vendor websites W0 and W1 also may have more links from root page 702A to lower level webpages 702B. Vendor website W0 also may have relatively fewer links 704B to other websites 700, compared with marketer website W2 or news website W3.

In this example, there are no external links 704B connecting the two vendor websites W0 and W1 together. However, marketer website W2 and news website W3 may discuss products or services sold on vendor websites W0 and W1 and therefore may include more external links 704B to these websites. Thus, marketer website W2 and news website W3 may have the unique quality of including more links 704B to webpages on vendor websites W0 and W1.

In one example, a web crawler walks through each website 700 to identify what is conceptually equivalent to a language for network 698. The network crawler may start from a particular node 702 in a website 700 and identify paths to other nodes. For example, the crawler may identify the following path [2, 1, 3, 5, 8] formed by links 704 in webpages 702 referencing other webpages 702.

In this example, node 2 in website W1 is linked through a hyperlink 704A to node 1 in website W1, node 1 in website W1 is linked through another hyperlink 704A to node 3 in website W1, node 3 in website W1 is linked through another hyperlink 704B to node 5 in website W2, and node 5 in website W2 is linked through another hyperlink 704A to node 8 in website W2, etc.

Generated path [2, 1, 3, 5, 8] is conceptually equivalent to a sentence of words, effectively representing an instance of a natural language structure for network 698. Word embedding techniques in Natural Language Processing, such as Word2Vec (as referenced below) are used to convert individual words found across numerous examples of sentences within a corpus of documents into low-dimensional vectors, capturing the semantic structure of their proximity to other words, as exists in human language. Similarly, website/network (graph) embedding techniques such as LINE, DeepWalk or GraphSAGE can convert sequences of pages found across a collection of referenced websites into low-dimensional vectors, capturing the semantic structure of their relationship to other pages.

Site classifier 640 uses natural language processing to convert the different paths, such as path [2, 1, 3, 5, 8] for node 2, into structural semantic vector 706B. Vector 706B is alternatively referred to as an embedding. Site classifier 640 may generate structural semantic vectors 706B for each webpage 702 in the same website 700. Site classifier 640 then combines the structural semantic vectors 706B for the same website 700 together via a summation to generate a website structural semantic vector 706A. Site classifier 640 feeds website vectors 706A into a logistic regression model that then classifies website 700 as a vendor, marketer, or news provider.

8. Site Semantic Features and Interaction Features

Figure 20:
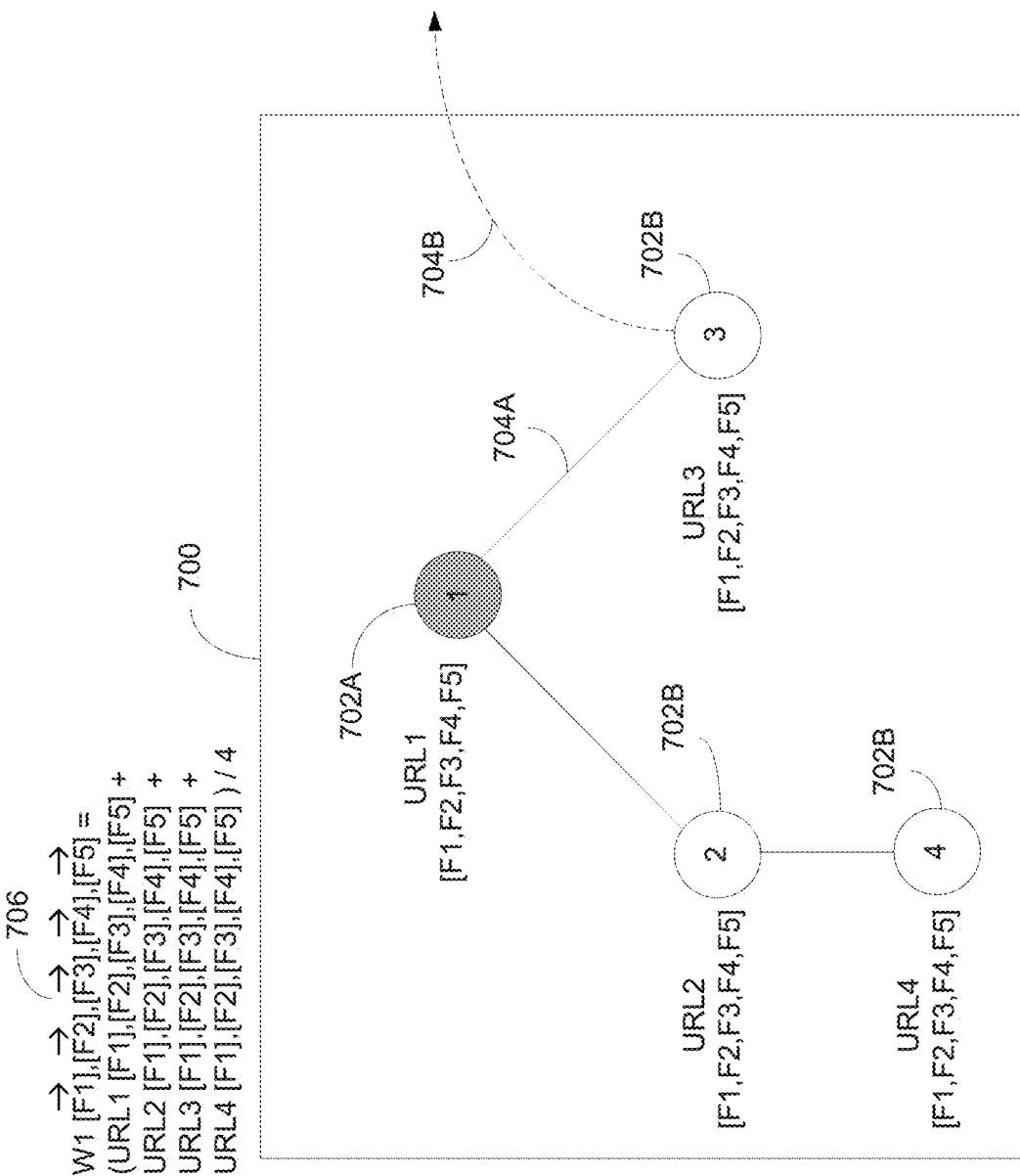
FIG. 20 depicts example features generated for the webpages of FIG. 19.

FIG. 20 shows in more detail one particular website 700. As mentioned above, site classifier 640 may classify website 700 based on structural semantic features. Site classifier 640 may generate and use additional features of webpages 702 to classify website 700. Features generated by site classifier 640 may include but is not limited to the following.

Feature F1: Structural semantics. As explained above, structural semantics F1 may be generated based on the structural relationships between webpages 702 provided by hyperlinks 704.

Feature F2: Content semantics. Content semantics F2 may capture the language and metadata semantics of content contained within webpages 702. For example, a machine learning trained natural language processor model may predict topics associated with the content, such as sports, religion, politics, fashion, or travel. Of course, any other topic taxonomy may be considered to predict topics from webpage content. In addition, site classifier 640 can also identify content metadata, such as the breath of content, number of pages of content, number of words in webpage content, number of topics in webpage content, number of changes in webpage content, etc. Content semantics F2 also may include any other HTML elements that may be associated with different types of websites, such as Iframes, document object models (DOMs), etc.

Similar to structural semantic F1, vendor, marketing, and news websites 700 may have different content semantics F2. For example, a news website W3 may include content with more topics compared with a vendor website W0 that may be limited to a small set of topics related to their products or services. Content on news website W3 also may change more frequently compared to vendor website W0. For example, content on news website W3 may change daily and content on vendor website W0 related to products or services may change weekly or monthly.

Feature F3: B2B Topic Semantic. B2B topics identify different business topics contained in the webpage content. Identifying B2B topics and generating associated topic vectors is described above in FIG. 2. For example, CCM 100 may identify different business-related topics in each webpage 702, such as network security, servers, virtual private networks, etc. Of course, any other topic may be identified in webpage content.

Feature F4: Content Interaction Behavior. Content interaction behavior is alternatively referred to as content consumption or content use. Content interaction behavior identifies patterns of user interaction/consumption on webpages 702. For example, news site W3 in FIG. 19 may receive more continuous user interaction/consumption throughout the day and over the entire week and weekend. Marketer website W2 (Trade publications) and vendor sites W0 and W1 may have more volatile user consumption mostly restricted to work hours during the work week.

Types of user consumption reflected in feature F4 may include, but is not limited to time of day, day of week, total amount of content consumed/viewed by the user, percentages of different device types used for accessing webpages 702, duration of time users spend on the webpage and total engagement user has on the webpage, the number of distinct user profiles accessing the webpage vs. total number of events for the webpage, dwell time, scroll depth, scroll velocity, and variance in content consumption over time.

Identifying different event types associated with these different user content interaction behaviors (consumption) and associated engagement scores is described in more detail above. For example, site classifier may 640 may generate the content interaction feature F4 based on the event types and engagement metrics identified in events 108 associated with each webpage 702.

Feature F5: Entity Type. The entity type feature identifies types or locations of industries, companies, organizations, bot-based applications or users accessing the webpage. For example, CCM 100 may identify each user event 108 as associated with an enterprise, small-medium business (SMB), educational institutions, mobile network operators, hotel, web-crawling applications etc. Identifying types of businesses or locations accessing webpages is described in U.S. application Ser. No. 16/163,283, titled "ASSOCIATING IP ADDRESSES WITH LOCATIONS WHERE USERS ACCESS CONTENT", filed Oct. 17, 2018, which is herein incorporated by reference in its entirety.

Structural semantics F1, content semantics F2, and B2B topics F3 are together referred to as website semantic features. Content interaction behavior F4 and entity type F5, and any other user interactions with webpages is referred to as behavioral features.

In one example, site classifier 640 generates one or more feature vectors F1-F5 for each webpage 702. Site classifier 640 then combines all of the same webpage feature vectors to generate an overall website feature vector 706. For example, site classifier 640 may add together the structural semantics feature vectors F1 generated for each of the individual webpages 702 in website 700. Site classifier 640 then divides the sum by the number of webpages 702 to generate an average structural semantics feature vector F1 for website 700.

Site classifier 640 performs the same averaging for each of the other features F2-F5 to form a combined feature vector 706. Site classifier 640 feeds combined feature value 706 into a computer learning model that classifies website 700 as either a vendor, marketer, or news site. Again, this is just one example, and any combination of features F1-F5, or any other features, can be used to classify website 700.

Figure 21:
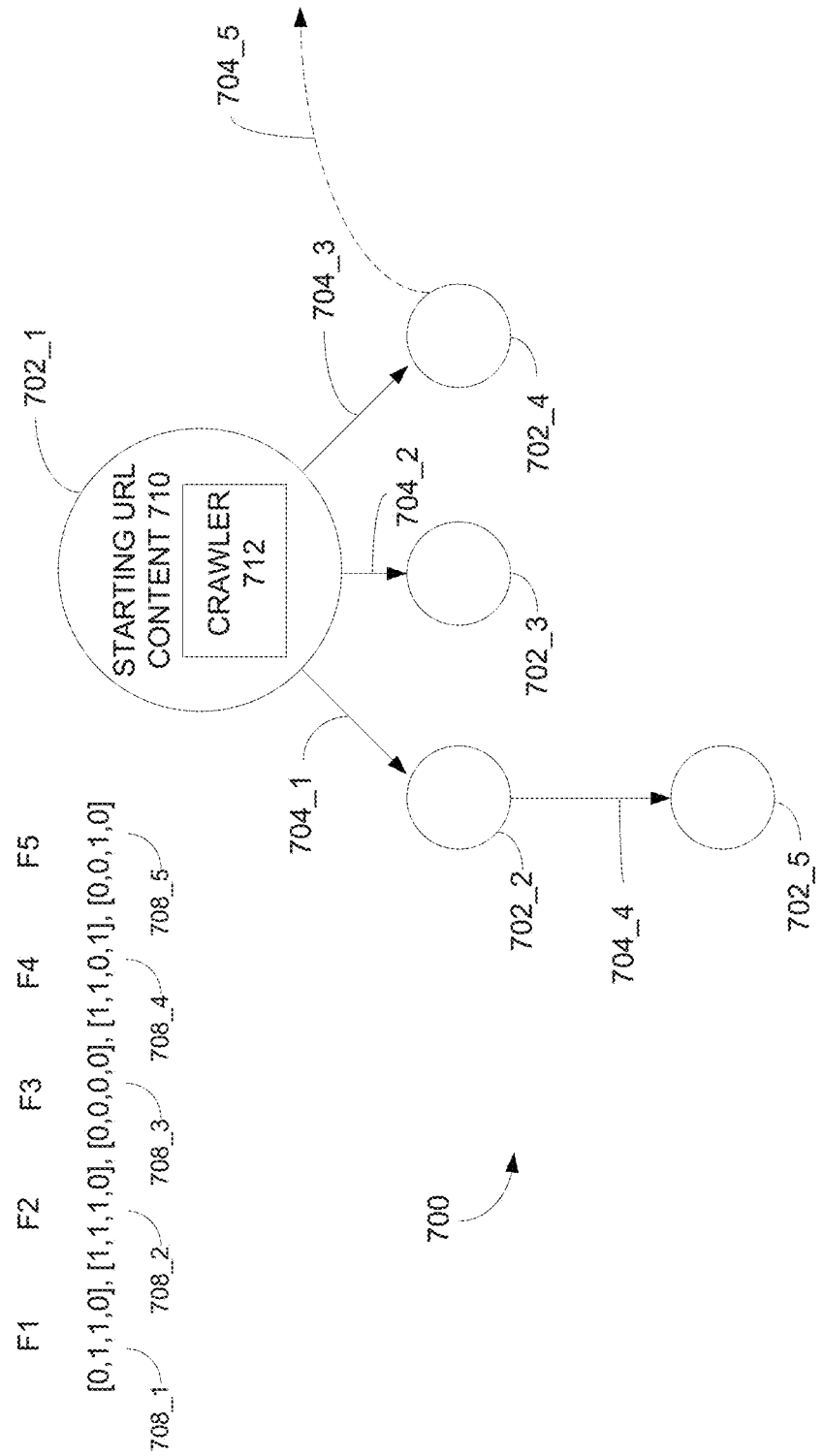
FIG. 21 depicts example vector embeddings generated for the features of FIG. 20.

FIG. 21 shows in more detail how site classifier 640 generates vectors 708 for features F1-F5. As explained above, CCM 100 may obtain webpage content 710 from millions of websites 700. Content 710 may include the hypertext markup language (HTML) from each webpage 702. Content 710 may include any text, video, or audio data included with the HTML.

Multiple web crawlers 712 may start at random webpages 702 within different websites and walk different paths through other webpages 702. Web crawlers 712 identify the different paths through the different webpages as explained above in FIG. 19. The paths are used for generating the structural semantics of each webpage 702. Content 710 for each webpage 702 is parsed to identify the different content semantics. Independent of the features generated from web crawling, content consumption events associated with each webpage are also processed to identify the behavioral features of each webpage 702.

Vectors 708 are then generated for each of the identified features F1-F5. In this example, vector 708_1 represents the structural semantics feature F1 for webpage 702_1, vector 708_2 represents the content semantics feature F2 for webpage 702_1, vector 708_3 represents the topic feature F3 for webpage 702_1, vector 708_4 represents the content interaction feature F4 for webpage 702_1, and vector 708_4 represents the entity type feature F5 for webpage 702_1.

Crawler 712 fetches HTML for a webpage 702_1. Crawler 712 finds a link 704_1 to a next lower webpage 702_2. Crawler 712 then parses the HTML for webpage 702_2 for any other links. In this example, crawler 712 identifies a link 704_4 to a next lower level webpage 702_5. Crawler 712 then parses HTML for webpage 702_5 for any other links. In this example, there are no additional links in webpage 702_5.

Crawler 712 then parses the HTML in webpage 702_1 for any additional links. In this example, crawler 712 identifies a next link 704_2 to another lower level webpage 702_3. Crawler 712 parses the HTML in webpage 702_3 and determines there are no additional links.

Crawler 712 further parses the HTML in webpage 702_1 and identifies a third link 704_3 to webpage 702_4. Crawler 712 parses the HTML in webpage 702_4 and identifies an external link 704_5 to a webpage located on a different website. Crawler 712 then parses the HTML on the webpage located on the other website for other links as described above.

Crawler 712 continues crawling webpages until detecting a convergence of the same webpages on the same websites. Otherwise, crawler 712 may stop crawling through a web path if no new webpages or websites are detected after some threshold number of hops. Crawler 712 then may crawl through the next link in webpage 702_1. When all links in webpage 702_1 are crawled, crawler 712 may start crawling the remaining links in the next webpage 702_2.

As explained above, the different paths identified by web crawler 712 through webpage 702_1, such as path [2, 1, 3, 5, 8] described above in FIG. 19, are converted by an unsupervised learning model, such as DeepWalk (Perozzi, Bryan et al. "DeepWalk: online learning of social representations." KDD (2014)), LINE (Tang, Jian et al. "LINE: Large-scale Information Network Embedding." WWW (2015)), or GraphSAGE (Hamilton, William L. et al. "Inductive Representation Learning on Large Graphs." NIPS (2017)) into structural semantic vector 708_1.

Values in vector 708_1 may represent different structural characteristics of webpage 702_1. For example, values in vector 708_1 may indicate the hierarchical position of webpage 702_1 within website 700, the number of links to other webpages within website 700, the number of links to other webpages outside of website 700, etc. Structural semantic vector 708_1 may capture first order proximity identifying direct relationships of webpage 702_1 with other webpages. Vector 708_1 also may capture second order proximity identifying indirect relationships of webpage 702_1 with other webpages through intermediate webpages.

A natural language processor analyzes content 710 to generate a vector 708_2 for content semantic feature F2. The natural language machine learning algorithm may identify subjects, number or words, number of topics, etc. in the text of webpage 702_1. The natural language processor converts the identified topics, sentence structure, word count, etc. into content semantic vector 708_2. A content semantic vector 708_2 is generated for each webpage 702 in website 700.

Content semantic vectors 708_2 for different webpages 702 are easily compared to identify webpage or website similarities and differences which may provide further insight into website classification. For example, a cosine similarity operation may be performed for different content semantic vectors 708_2 to determine the similarity of topics for webpages 702 on the same websites 700 or to determine the similarities between topics on different websites 700.

One example machine learning algorithm for converting text from a webpage into content semantic vector 708_2 is Word2Vec described in Mikolov, Tomas et al. "Efficient Estimation of Word Representations in Vector Space." *CoRR* abs/1301.3781 (2013), which is herein incorporated by reference in its entirety. Converting text into a multidimensional vector space is known to those skilled in the art and is therefore not described in further detail.

Site classifier 640 may generate a vector 708_3 for topic feature F3. As described above, content analyzer 142 in FIG. 2 above generates topic vectors 136 for different webpages. Site classifier 640 may use a similar content analyzer to generate B2B topic vector 708_3 for webpage 702_1. Each value in B2B topic vector 708_3 may indicate the probability or relevancy score of an associated business-related topic within content 710. In one example, content semantics vector 708_2 may represent a more general language structure in content 710 and B2B topic vector 708_3 may represent a more specific set of business-related topics in content 710.

Site classifier 640 generates a vector 708_4 for content interaction feature F4. Vector 708_4 identifies different user interactions with webpage 702_1. Site classifier 640 may generate vector 708_4 by analyzing the events 108 associated with webpage 702_1. For example, each event 108 described above may include an event type 456 and engagement metric 610 identifying scroll, time duration on the webpage, time of day, day of week webpage was accessed, variance in consumption, etc. Each value in vector 708_4 may represent a percentage or average value for an associated one of the event types 456 for a specified time period.

For example, site classifier 640 may identify all of the events 108 for a specified time period associated with webpage 702_1. Site classifier 640 may generate content interaction vector 708_4 by identifying all of the same event types in the set of events 108. Site classifier 640 then may identify the percentage of events 108 associated with each of the different event types. Site classifier 640 uses each identified percentage as a different value in content interaction vector 708_4.

For example, a first value in content interaction vector 708_4 may indicate the percentage of events generated for webpage 702_1 during normal work hours and a second value in content interaction vector 708_4 may indicate the percentage or ratio of events generated for webpage 702_1 during non-work hours. Other values in content interaction vector 708_4 may identify any other user engagement or change of user engagement with webpage 702_1.

Site classifier 640 generates a vector 708_5 for entity type feature F5. Vector F5 identifies different types of users interacting with webpage 702_1. Site classifier 640 may generate vector 708_5 by analyzing all of the events 108 associated with webpage 702_1. For example, each event 108 may include an associated IP address. As mentioned above, CCM 100 may identify the IP address as being associated with an enterprise, small-medium business (SMB), educational entity, mobile network operator, hotel, etc.

Site classifier 640 identifies the events 104 associated with webpage 702_1 for a specified time period. Site classifier 640 then identifies the percentage of the events associated with each of the different entity types. For example, site classifier 640 may generate an entity type vector 708_5= [0.23, 0.20, 0.30, 0.17, 0.10] where [% enterprise, % small medium business, % education, % mobile network operators, % hotels].

As mentioned above in FIG. 20, site classifier 640 calculates the average for feature vectors 708_1, 708_2, 708_3, 708_4, and 708_5 generated for all of the webpages 702 associated with the same website 700 to generate an overall website feature vector 706 as shown in FIG. 20. Each of the different features F1-F5 provide additional information for more accurate site classifications.

Figure 22:
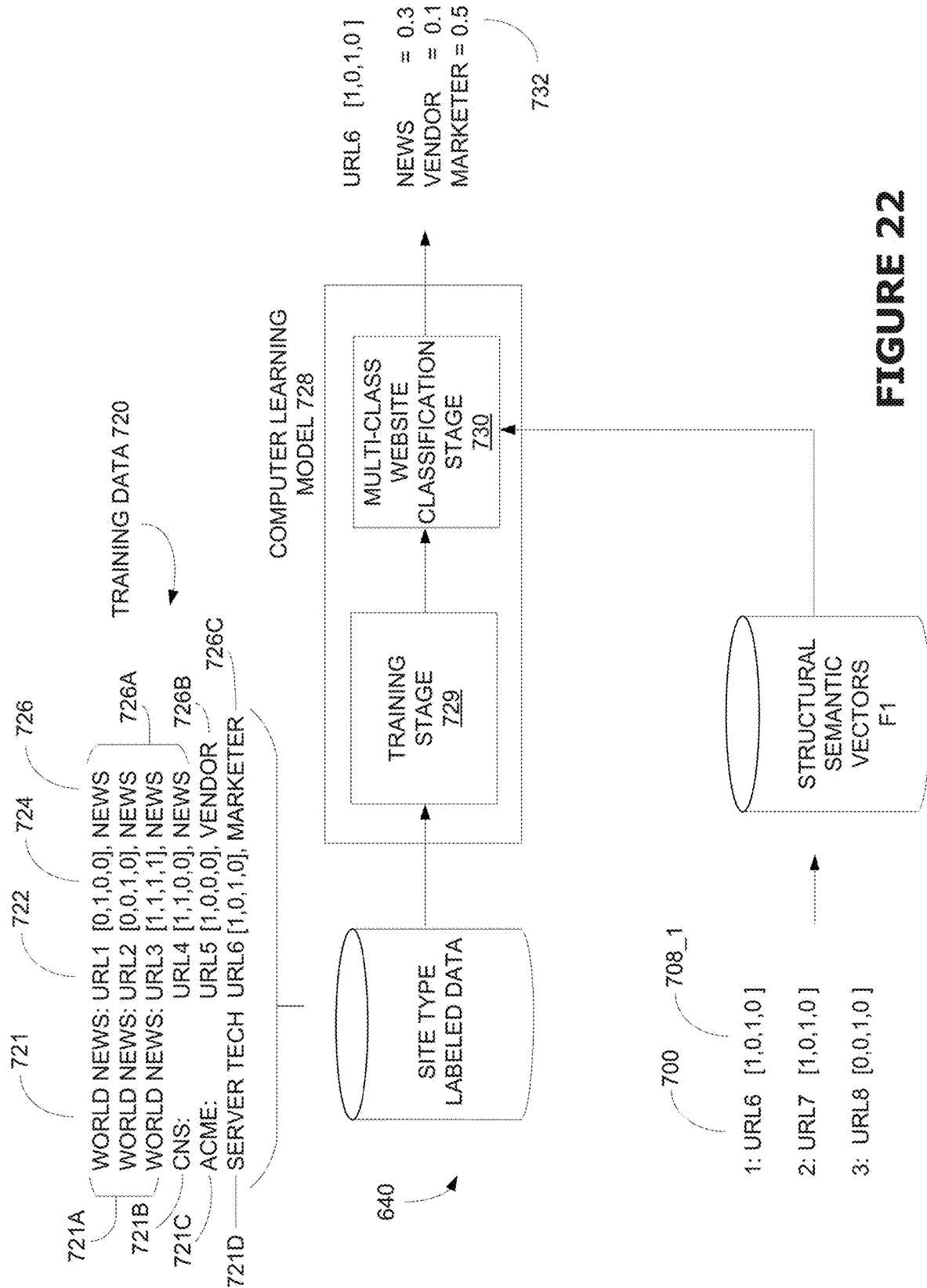
FIG. 22 depicts an example computer learning model trained using the vector embeddings of FIG. 21.

FIG. 22 shows how site classifier 640 classifies a website based on structural semantic feature F1. However, it should be understood that site classifier 640 may classify websites based on any combination of features F1-F5 described above.

Site classifier 640 may receive a set of training data 720 that includes the URLs 722 and associated structural semantic (SS) vectors 724 for a set of known webpages. Site classifier 640 may crawl through a set of webpages (URLs 722) on websites 721 with known classifications 726. For example, a known news website 721A may include three webpages with URL 1, 2, and 3. Site classifier 640 may crawl each URL 1, 2, and 3 over a previous week to generate associated SS vectors 724. URLs 1, 2, and 3 are from a known news website and accordingly are manually assign news classification 726A.

Site classifier 640 also generates SS vectors 724 for URL4 associated with another known news website 721B, URL5 associated with a known vendor website 721C, and URL6 associated with a known marketer website 721D. Of course, SS vectors 724 may be generated for each webpage 722 on each of websites 721. The operator assigns each SS vector 724 its known site classification 726.

Site classifier 640 feeds training data 720 that includes SS vectors 724 and the associated known site classifications 726 into a computer learning model 728. For example, computer learning model 728 may be a logistic regression (LR) model or Random Forest model. Of course, other types of supervised computer learning models can also be used. Computer learning model 728 uses training data 720 during a training stage 729 to identify the characteristics of SS vectors 724 associated with each site classification 726. After model 728 has completed training stage 729, it then operates as a site classifier in website classification stage 730.

Structural semantic vectors 708_1 are generated for different websites 700 with unknown classification as described above. SS vectors 708_1 are fed into model 728. Model 728 generates site prediction values 732 for each website 700. For example, computer learning model 728 may predict the website associated with URL6 as having a 0.3 likelihood of being a news website, 0.1 likelihood of a vendor website, and a 0.5 likelihood of a marketer website.

Figure 23:
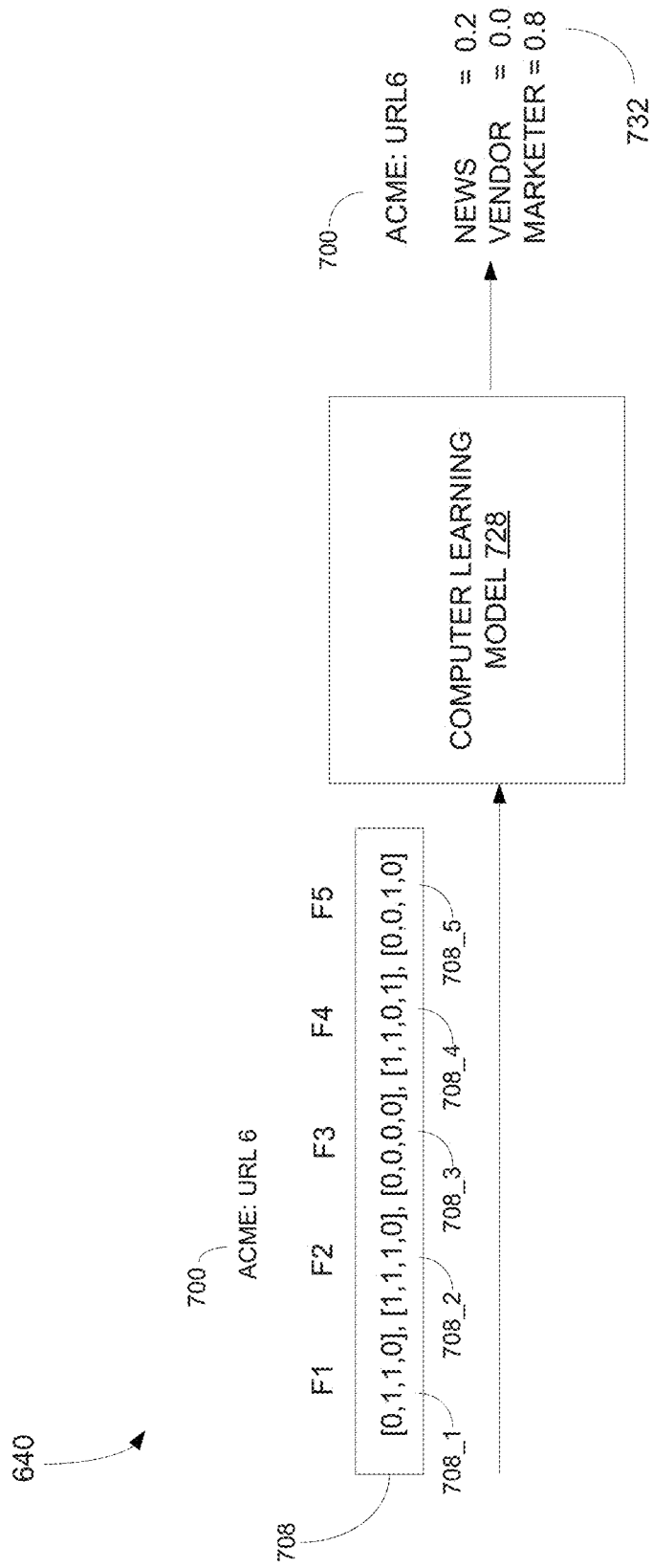
FIG. 23 depicts an example computer learning model configurable or operable to classify websites based on associated vector embeddings.

FIG. 23 shows in more detail how site classifier 640 uses multiple feature vectors 708 to classify website 700. In this example, website 700 is associated with URL6. Site classifier 640 generates vector 708_1 from the structural semantic features F1 of the webpages in website 700, and generates vector 708_2 from the content semantic features F2 of the webpages in website 700. Site classifier 640 generates vector 708_3 from the topic features F3 identified in the webpages in website 700. Site classifier 640 analyzes the events associated with each webpage of website 700 and generates vector 708_4 from the user interaction features F4 and generates vector 708_5 from the entity type features F5 associated with the webpages of website 700.

Computer learning model 728 is trained as explained above with any combination of vectors 708_1, 708_2, 708_3, 708_4, and 708_5 generated from websites with known classifications. Vectors 708 are generated from website 700 with an unknown classification and fed into a machine learning trained classifier model 728. Model 728 generates site predictions 732 for website 700. In this example, model 728 may more accurately predict website 700 as a marketer website due to the additional features F2, F3, F4, and F5 used for classifying website 700.

As mentioned, site classifications 732 can be used as another event dimension for determining user or company intent and surge scores. For example, a large surge score from a vendor website may have more significance for identifying a company surge than a similar surge score on a news or marketing website. Site classifications 732 can also be used for filtering different types of data. For example, CCM 100 can capture and determine surge scores from events 108 generated for one particular website class.

9. IP Address Classification

Figure 24:
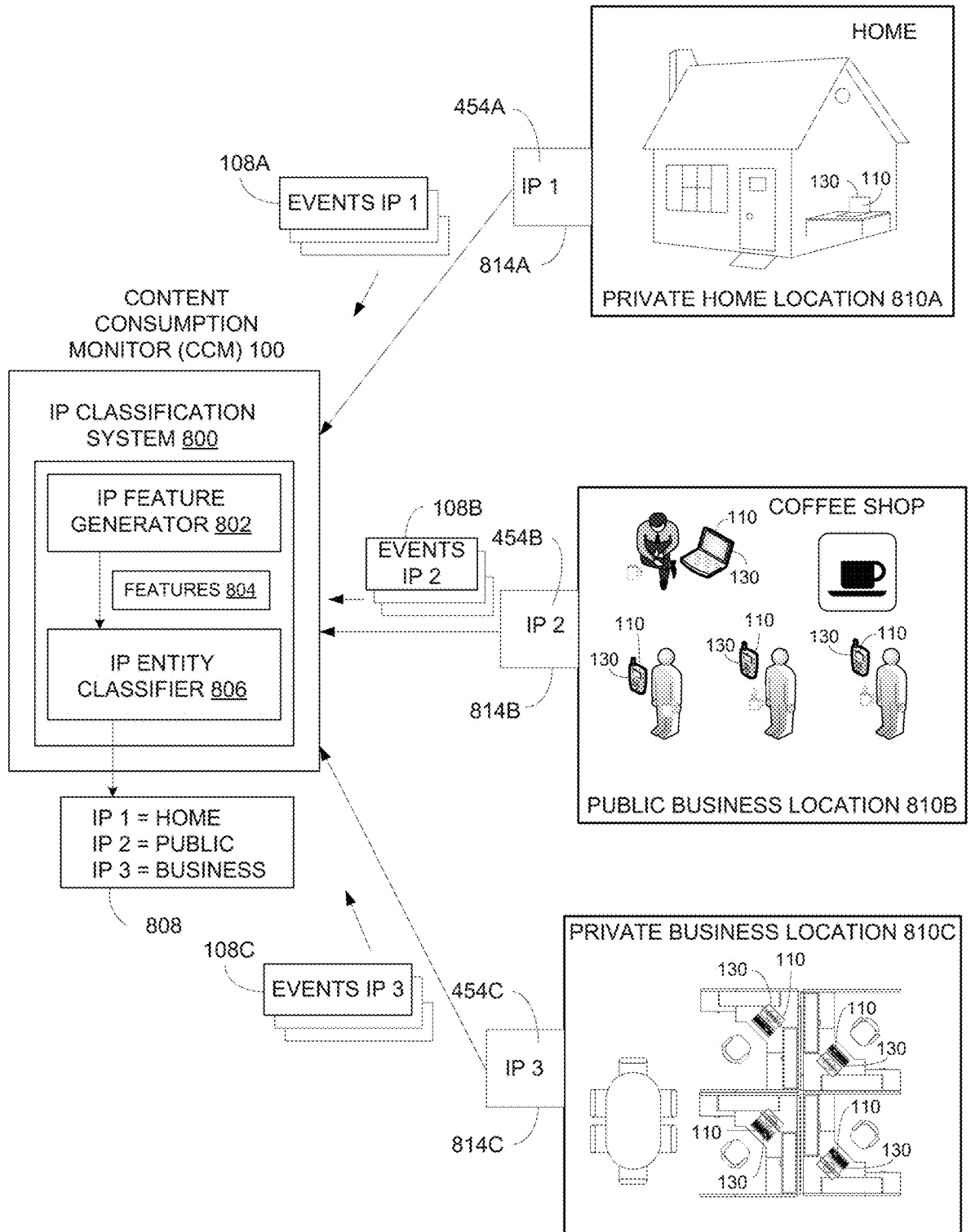
FIG. 24 depicts an example IP classification system.

FIG. 24 shows how an IP classification system 800 operating in content consumption monitor 100 identifies different types of entities associated with IP addresses 454. IP classification system 800 leverages the fact that IP addresses 454 may be associated with different physical locations. For example, a first router 814A may have an associated IP address 454A (IP1) and may be associated with a private home location 810A. A second router 814B may have IP address 454B (IP2) and may be associated with a public business location 810B. A third router 814C may have IP address 454C (IP3) and may be associated with a private business location 810B.

For explanation purposes, private home location 810A may refer to any location associated with a relatively small group of people, such as a private residence. In at least one example, content accessed by users at private home location 810A may not necessarily be associated with a company. For example, persons living at private home location 810A may work for companies and may view work related content from private home location 810A. However, it may be unlikely that the majority of content accessed by users at private home location 810A are associated with a same company.

Public business location 810B may be associated with any entity, establishment, building, event, location, etc. that caters to multiple users that are not necessarily employed, or otherwise associated, with the same company, entity, establishment, etc. For example, public business location 810B may be a coffee shop run by a company that sells coffee to the general public. Content accessed by the different users at coffee shop location 810B may not necessarily be associated with the coffee company that operates the coffee shop. For example, users entering coffee shop location 810A may work for a variety of different companies and may view a variety of different content unrelated to the coffee company.

Private business location 810C may be associated with any entity, establishment, building, event, location, etc. where multiple users work, are employed, or are otherwise associated with the same business, entity, or establishment. For example, private business location 810C may be the corporate offices of the coffee company that runs coffee shop location 810B. In another example, private business location 810C may be the corporate offices of an entertainment or casino company that operates an amusement park and/or casino at public business location 810B.

Of course, in other examples the entities associated with IP locations 810B and 810C are unrelated. For example, the company at private business location 810C may not have retail stores or facilities. In at least in one example, users at private business location 810C may mostly work for the same company and may mostly view content related to their jobs at the same company.

As described above, tags 110 monitor content accessed by computing devices 130 at the different IP locations 810. Tags 110 generate events 108 that identify different parameters of the content accessed by the users at IP locations 810. As mentioned above, events 108 may include a user ID, URL, IP address, event type and timestamp. Events 108 also may include a device type and a time offset.

An IP feature generator 802 identifies the source IP addresses 454 in IP messages sent from tags 110 to CCM 100 that include events 108. Feature generator 802 identifies different features 804 of events 108 at the different IP address locations 810. For example, feature generator 802 may determine the average amount of content each user accesses at the different IP locations 810, the average amount of time users access content at the different IP locations 810, and when users access content at the different IP locations 810. Feature generator 802 also may determine what types of computing devices 130 are used for accessing content at the different IP locations 810.

An IP entity classifier 806 uses features 804 to determine types of establishments associated with IP locations 810. For example, features 804 may indicate a relatively small number of users access content at IP address location 810A. IP classifier 806 may accordingly identify IP address 454A as a home location.

IP classifier 806 may determine from features 804 that a relatively large number of users access content consistently throughout the day and on weekends at location 810B. IP classifier 806 also may determine from features 804 that most of the users at location 810B use smart phones to access content. IP classifier 806 may determine IP address 454B is associated with a public business location.

IP classifier 806 may determine from features 804 that users at IP location 810C mostly access content during business hours Monday through Friday. IP classifier 806 also may determine from features 804 that most of the users at location 810C use personal computers or laptop computers to access content. IP classifier 806 may determine IP address 454C is associated with a private business location.

IP classifier 806 may generate an IP entity map 808 that CCM 100 uses IP entity map 808 to more efficiently and effectively generate consumption scores and identify surges for different companies. For example, CCM 100 may distinguish between multiple IP addresses owned by the same company that include both public business locations and private business locations. In another example, CCM 100 may identify multiple different companies operating within in a shared office space location.

CCM 100 may generate different consumption scores 410 (FIGS. 8 and 9) for the different IP address locations 810 or may only provide consumption scores 410 for IP addresses associated with private business locations 810C. In another example, some publishers 118 may be more interested in consumption scores 410 for a certain demographic of users that patronize retail locations 810B of particular businesses. CCM 100 may generate consumption scores 410 and related surge data 412 for the events 108B associated with public business locations 810B for those businesses. Thus, CCM 100 can filter out events that are less likely to indicate the current interests of associated businesses, business customers, or any other definable entity or demographic.

It is also worth noting that IP classification system 800 may generate IP entity map 808 without using personal identification information (PII). Events 108 may include a user identifier 450 (see e.g., FIG. 9). However, classification system 800 can classify IP address locations 810 based only on event timestamps and/or device types. Thus, CCM 100 can generate consumption scores for particular company IP addresses without using PII data. Publishers 118 are then free to use their own contact lists to send content to particular companies based on the associated company consumption scores.

Figure 25:
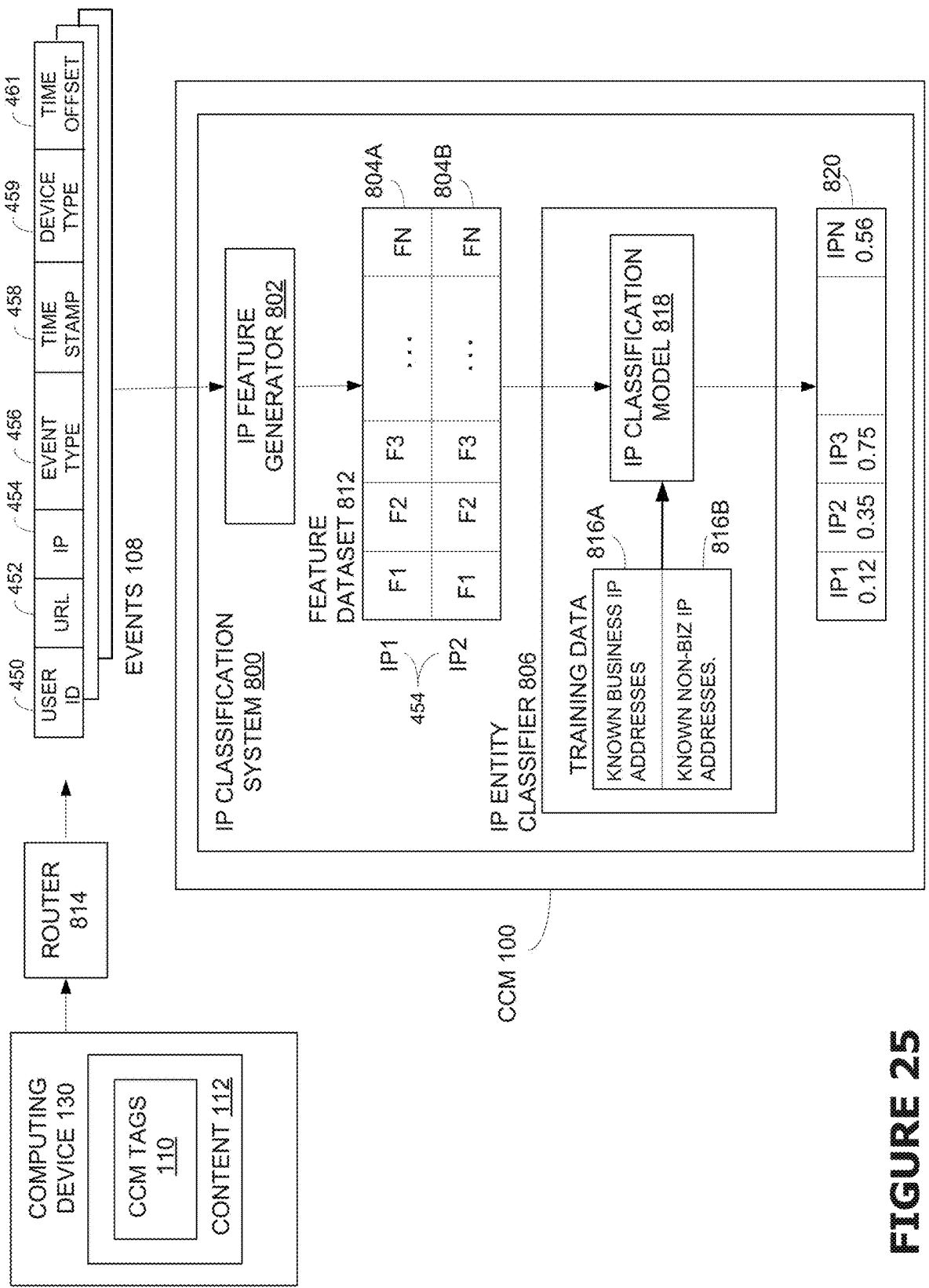
FIG. 25 depicts an example of the IP classification system of FIG. 24 in more detail.

FIG. 25 shows in more detail how IP classification system 800 identifies the types of establishments associated with IP address locations. As described above, events 108 may include a user identifier (ID) 450 such as a unique cookie ID, a URL 452 identifying content accessed by a user associated with user ID 450, an IP address 454, and a timestamp 458. Events 108 also may include a device type 459 and a time offset 461.

IP address 454 may be the IP address of the router or switch 814 at the physical location where tags 110 generate events 108. Tags 110 may send IP messages to CCM 100 every 15 seconds via router 814. The messages contain events 108 and include a source IP address for router 814 that CCM 100 uses to send acknowledgement messages back to tags 110.

Tags 110 may discover device type 459 of the computing device 130 that the user uses to access content 112. For example, tags 110 may identify computing device 130 as a personal computer, laptop, tablet, or smart phone based on the web browser screen resolution, type of web browser used for viewing content 112, or a type of user agent used by the web browser.

Tags 110 also may add a time offset 461 corresponding with the time zone associated with events 108. Classification system 800 can adjust all timestamps 458 from all IP address locations to correspond to a same universal time.

IP feature generator 802 may produce a variety of different features 804 for each IP address 454 based on any combination of parameters in events 108. As described above, feature generator 802 may generate some features 804 based on timestamps 458 and/or device type 459. In one example, feature generator 802 may generate a new feature dataset 812 each day, or over some other selectable time period. Several features 804 have been described above and additional features 804 are described below in more detail.

IP entity classifier 806 may use an IP classification model 818 to identify types of establishments associated with IP addresses 454. In one example, classification system 800 uses a logistic regression (LR) model 818 as follows:

$$N^{-1} \log L(f|x) = N^{-1} \Sigma_{i=1}^{N} \log Pr(y_i|x_i;f)$$

where: N is _number of observations; L is loss function; Θ is parameters/coefficients used to calculate probability, Pr is probability, yi is class (0 or 1) of the ith observation, and xi is a vector of features representing an IP. Logistic regression models and other types of models used for identifying different behavior patterns are known to those skilled in the art and are therefore not described in further detail.

IP classification system 800 trains model 818 with training data 816. A first set of training data 816A may include features 804 for IP addresses 454 from known private business locations. For example, training data 810A may be produced from events 108 generated from the known corporate headquarters or known business offices of companies.

A second set of training data 816B may include features 804 for IP addresses from known public business locations or known non-business locations. For example, training data 810B may be generated from coffee shops, retail stores, amusement parks, internet service providers, private homes, or any other publicly accessible Internet location.

In one example, model 818 uses training data 816 to identify features 804 associated with private business locations. However, model 818 may be trained to identify any other type of physical IP location, such as public business locations, private home locations, geographic locations, or any other business or user demographic.

Classification system 800 feeds features 804 for a particular IP address 454 into trained model 818. Model 818 generates prediction values 820 that indicate the probability of the associated IP address being a private business location. For example, classification system 800 may identify any IP address 454 with a prediction score 820 over 0.45 as a private business location. Conversely, classification system 800 may identify any IP address 454 with a prediction score 820 less than some other threshold as a public business location or a private home location. Classification system 800 generates IP entity map 808 in FIG. 24 from prediction values 820. For example, IP entity map 808 may include a row for each IP address 454 and a column marked if the associated IP address is identified as a private business location.

Figure 26:
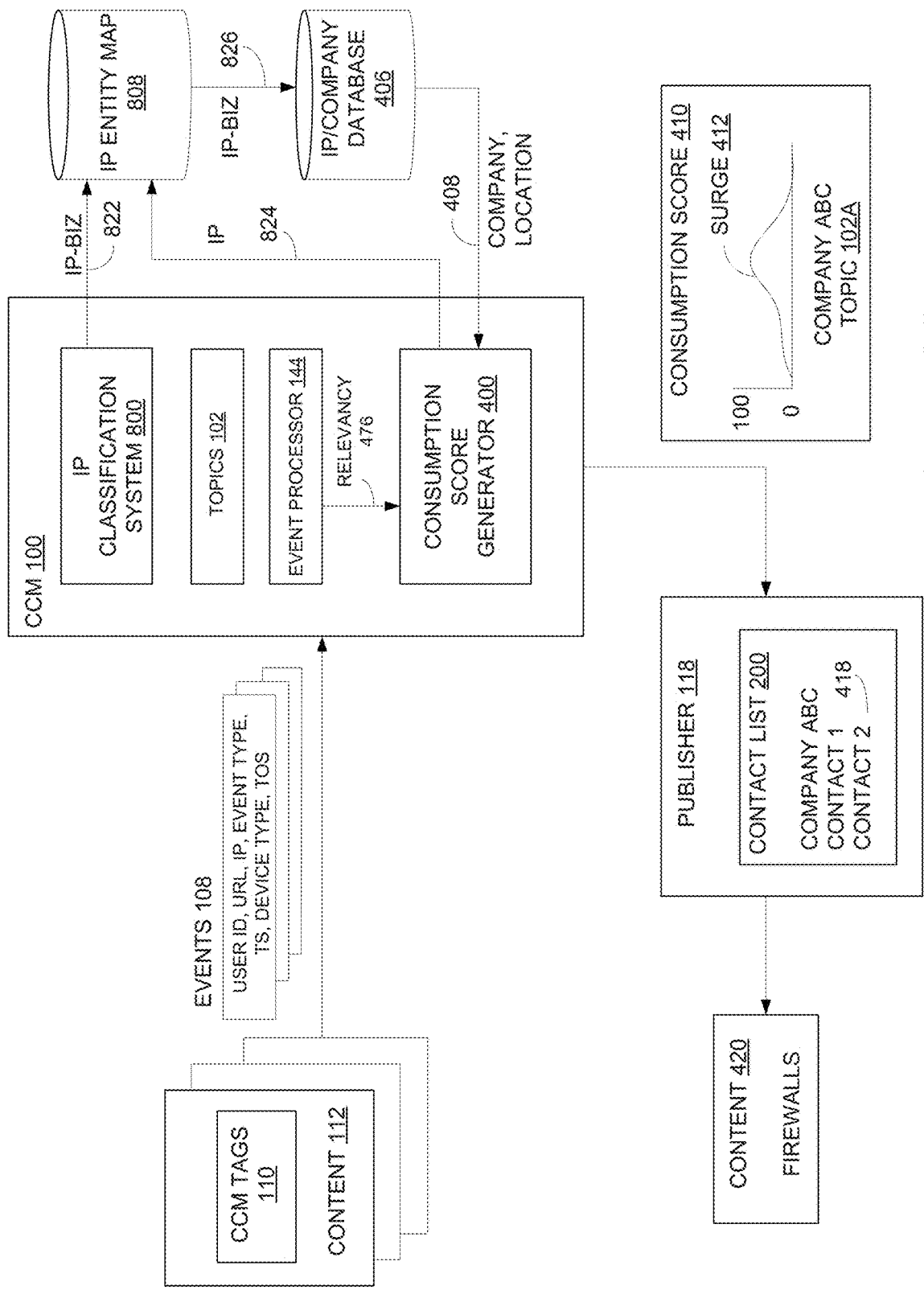
FIG. 26 depicts an example of how the content consumption monitor uses an IP entity map to generate consumption data.

FIG. 26 shows how IP classification system 800 generates more accurate business consumption scores. As described above, IP classification system 800 identifies the types of establishments associated with different IP addresses. In this example, IP classification system 800 classifies IP addresses 822 as private business locations (IP-BIZ). The classified IP address are stored in IP entity map 808.

As explained above, a domain name service may provide a database 406 that identifies companies and company addresses associated with different IP addresses. The IP address and/or associated company or entity may be referred to generally as a domain. As also mentioned above, database 406 may include multiple different IP addresses associated with the same company. Some of these IP addresses may be associated with public business locations that do not necessarily identify the intent or interests of the company.

CCM 100 may receive a group of events having the same IP address 824. To generate more accurate consumption scores, CSG 400 may compare the IP address 824 associated with the group of events 108 with IP entity map 808. Map 808 indicates in output 826 if IP address 824 is associated with a private business location. If IP address 824 is not associated with a private business location, CSG 400 may not generate a consumption score 410. If output 826 indicates IP address 824 is associated with a private business location (IP-BIZ), CSG 400 may generate a consumption score 410 for the identified company and location 408.

CSG 400 calculates a consumption score 410 from events 108 that includes the IP address 824 verified as associated with a private business location. As explained above, CSG 400 may generate consumption score 410 for a topic 102 based on an average topic relevancy score 476 for the group of events 108. CSG 400 may adjust consumption score 410 based on the total number of events 470, number of unique users 472, and topic volume 474 as described above in FIG. 9.

IP classification system 800 may continuously update IP entity map 808 and CSG 400 may continuously confirm which received IP addresses 824 are associated with private business locations. GSG 400 may stop generating consumption scores 410 for any IP addresses 824 that are no longer associated with private business locations. By filtering out events from public business locations and non-business locations, CCM 100 may more accurately identify topics of interest and surges for businesses.

As mentioned above, CCM 100 may send consumption scores 410 and/or any surge information 412 for the company 408 associated with IP address 824 to publisher 118. Publisher 118 may store a contact list 200 including contacts 418 for company 408. Publisher 118 may send content 420 related to topic 102A to contacts 418 when consumption data 410 identifies a surge 412.

In another example, CCM 100 may tag the profiles of users associated with the identified businesses 408. CCM 100 them may accumulate all of the user intent vectors associated with the same company as described above.

Figure 27:
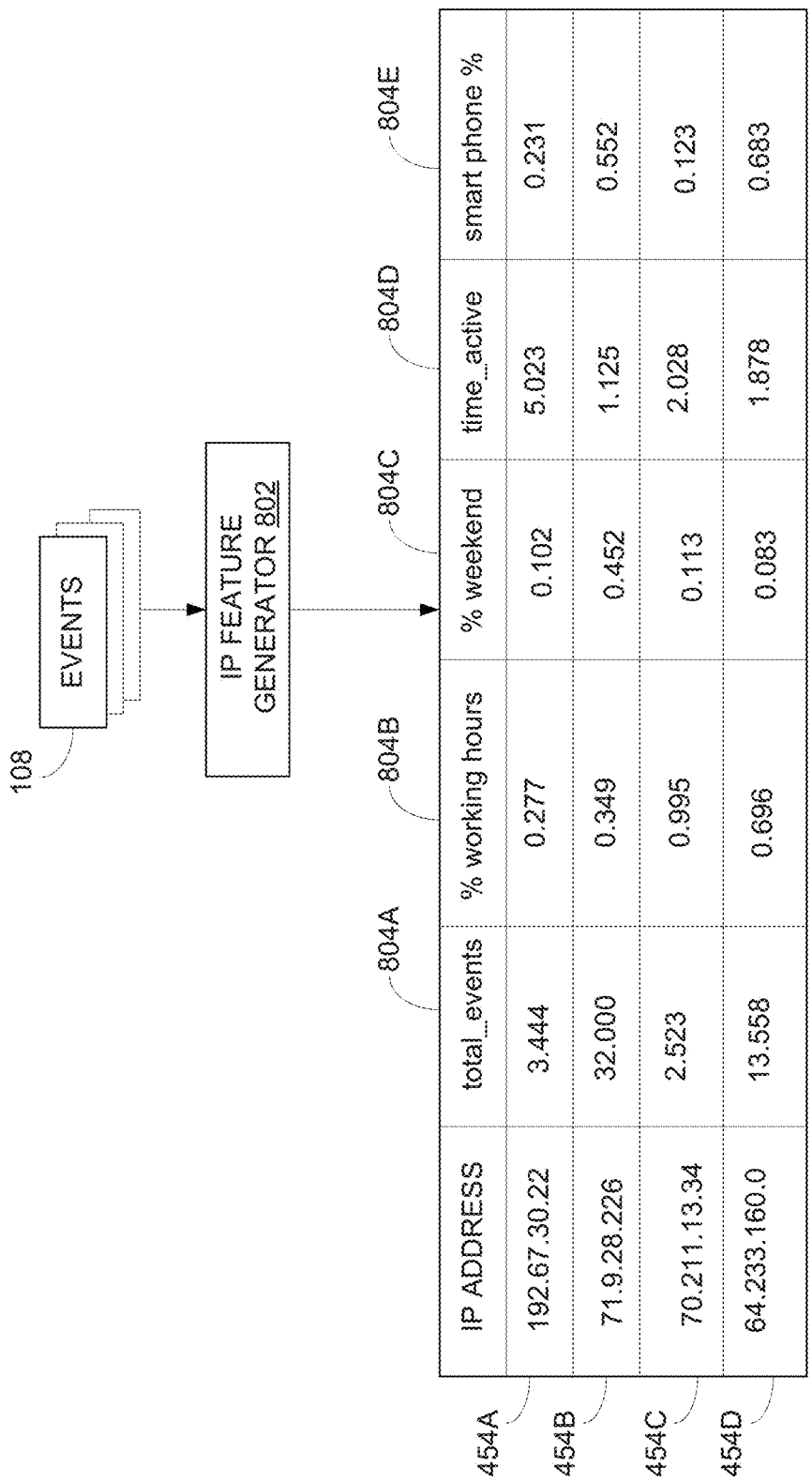
FIG. 27 depicts an example feature dataset generated by the IP classification system.
Figure 28:
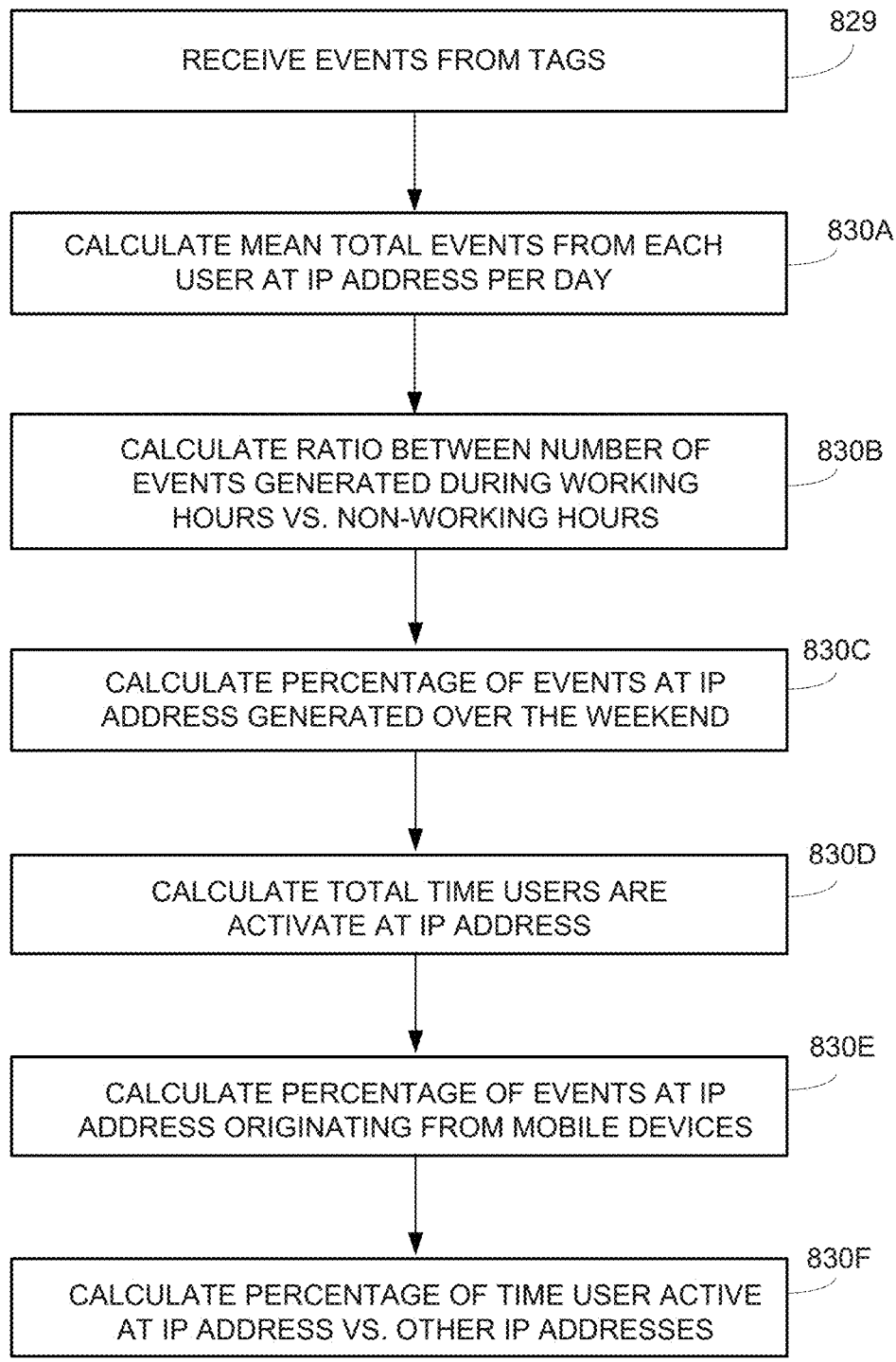
FIG. 28 depicts an example process for generating the feature dataset in FIG. 27.

FIG. 27 shows examples of features generated by feature generator 802 from events 108 and FIG. 28 shows the associated operations performed by feature generator 802. As described above, any number of features/metrics can be generated from events 108 and then used by IP classification system 800 to classify IP addresses. Feature generator 802 may generate features 804 over any programmable time period, such as daily.

Referring to FIGS. 27 and 28, in operation 829 feature generator 802 receives events 108 that include associated IP addresses 454A-454D. Feature generator 802 may generate features 804A-804E using all of the events 108 received during that day that include the same IP address. Feature generator 802 may generate some features 804 as mean values, average values, ratios, percentages, normalized values, etc. The actual values shown in feature dataset 812 are just examples and may vary based on the specific calculations used by feature generator 802.

In operation 830A, feature generator 802 may calculate a feature 804A that identifies a mean total number of events generated at each IP address 454 during each day. For example, feature generator 802 may calculate the mean total events generated by each user from the IP address per day. Feature 804A may help distinguish IP addresses associated with businesses from other IP addresses associated with individuals.

In operation 830B, feature generator 802 may generate a feature 804B that identifies a ratio of events generated during working hours vs. events generated during non-working hours. For example, feature generator may calculate the mean number of events generated for each user between 8 am-6 pm compared with all other hours. Feature 804B may help distinguish IP addresses associated with private business locations where users generally access content during business hours from IP addresses associated with other public business locations where users may access content any time of the day.

In operation 830C, feature generator 802 may generate a feature 804C that identifies a percentage of events generated on weekends. Feature 804C also helps distinguish IP addresses associated with private business locations where users generally access content during work days from other public business locations and private home locations where users may access a higher percentage of content during the weekends.

In operation 830D, feature generator 802 may generate a feature 804D that identifies the amount of time users actively access content from the IP address. Feature generator 802 may identify the first time a particular user accesses content at the IP address during the day and identify the last time particular the user accesses content at the same IP address during that day. Feature 804D may help distinguish private business locations where users generally access different content throughout the day at the same business location vs. public business locations where users may only access content for a short amount of time while purchasing a product, such as coffee.

Feature generator 802 may extend the active time 804D as long as the user accesses some content within some time period. In another example, feature generator 802 may terminate active time periods when the user does not access content for some amount of time. Feature generator 802 then may identify the longest or average active time periods for each user and then calculate an average active time for all users that access content at the IP address 454. Many users at public business locations, such as a coffee shop, may have zero duration events since the user may only generate one event at that IP address.

In operation 830E, feature generator 802 may generate a feature 804E that identifies the percentage of content accessed by users with mobile device, such as cell phones. Feature 804E may help distinguish private business locations where users mostly use personal computers or laptops from public business locations where users may more frequently access content with cell phones.

In another example, feature generator 802 may calculate a percentage of time users are active at a particular IP address vs. other IP addresses. This also may help distinguish private business locations where users generally spend more time accessing content vs. public business locations where users may spend less time accessing content. In another example, feature generator may identify the average number of users that have accessed the same IP address over a week. A public business location may have a larger number of users access the IP address over a week.

Features used in the model may include, but are not limited to, the following:

ip_p_during_business: The percent of an IPs activity that happens during business hours. "Business hours" being defined as 8 am-6 pm M-F. For example, an IP that is active 24/7 may have a value of 0.30. A business active 24 hours a day during M-F may have a value of 0.42;

mean_profile_p_during_business_global: This feature looks at the average percentage of activity during business hours of the profiles that have visited this IP address. This feature is different than 'ip_p_during_business' because it aggregates over the global behavior over profiles at the IP rather than only the profile at the IP;

mean_dow_active_global: An average over the profiles at an IP of how many days of the week they are active globally (i.e. across all IPs). For example, if there are two profiles at an IP, and one has been active 7 days (even if not at this IP for all 7 days) and another active for only 2 days the value may be 4.5;

mean_dow_active_at_ip: An average over the profiles at an IP of how many days of the week each profile is active only at the specific IP. So even if a user was active 7 days globally, but only 1 day at this IP, then only that 1 day would be considered;

mean_percent_weekday_at_ip: An average over the profiles of what percentage of their activity happened at the specific IP address during the week. For example, if all of a profile's traffic was Wednesday and Friday, their individual percent weekday would be 1. This feature is the mean of this metric for all profiles at an IP address;

mean_avg_start_hour_global: Averages across profiles at an IP the hour, in local time, of the profile's average first activity globally;

mean_avg_end_hour_global: Averages across profiles at an IP the hour, in local time, of the profile's average last activity globally;

mean_avg_start_hour_at_jp: Averages across profiles at an IP the hour, in local time, of the profile's average first activity only at the specific IP;

mean_avg_end_hour_at_ip: Averages across profiles at an IP the hour, in local time, of the profile's average last activity only at the specific IP;

mean_avg_duration_at_ip: For each profile at the IP, it takes the average "duration" of activity for each profile. The "duration" is defined as the last timestamp-first timestamp. This means that a profile with a single event will have a duration of 0. The duration of each day for each profile is averaged, then the average of all profiles is taken to provide the value for this feature;

mean_avg_duration_ratio: this is the ratio of the 'duration_at_ip' and the 'duration_global' averaged per profile then averaged across all these profiles;

mean_pages_visited_ratio: the ratio of pages viewed at this IP over the pages viewed globally per profile, averaged across all profiles;

mean_dow_active_ratio: the ratio of days of week active at this IP over the days of week active globally, averaged across all profiles;

mean_avg_start_hour_diff: the feature looks at the difference between when a profile starts at the IP and globally, then averages this difference for each profile for the entire period then takes the average across all profiles;

mean_profile_p_during_business_ratio: average ratio of the percentage of profile activity that happens at the IP vs globally;

mean_avg_end_hour_diff: the feature looks at the difference between when a profile ends at the IP and globally, then averages this difference for each profile for the entire period then takes the average across all profiles;

mean_p_sunday_evts_at_ip: Average over profiles at IP of what percentage of their hours are on Sunday;

mean_p_monday_evts_at_ip: Average over profiles at IP of what percentage of their hours are on Monday;

mean_p_tuesday_evts_at_ip: Average over profiles at IP of what percentage of their hours are on Tuesday;

mean_p_wednesday_evts_at_ip: Average over profiles at IP of what percentage of their hours are on Wednesday;

mean_p_thursday_evts_at_jp: Average over profiles at IP of what percentage of their hours are on Thursday;

mean_p_friday_evts_at_ip: Average over profiles at IP of what percentage of their hours are on Friday;

mean_p_saturday_evts_at_ip: Average over profiles at IP of what percentage of their hours are on Saturday;

mean_avg_daily_pages_visited: Looks at the average number of pages a profile visits at the IP per day, then averages these across all profiles at the IP;

percent_mobile: Percentage of traffic from IP that has the device type of mobile (note: only non-null values are used for this calculation);

percent_tablet: Percentage of traffic from IP that has the device type of tablet (note: only non-null values are used for this calculation);

percent_desktop: Percentage of traffic from IP that has the device type of desktop (note: only non-null values are used for this calculation);

normalized_entropy: This is a Shannon entropy of profile_atr_domain for the IP address. For example, it represents how much confusion there is in the profile_atr_domains for the IP. The Shannon entropy is then divided by the maximum possible entropy yielding a value between [0.0, 1.0] which is the normalized entropy. Note that this value can be NaN when the Shannon entropy is 0. This has the interpretation that the normalized entropy should be 0;

profile_events_ratio: This feature compares the number of events generated by each profile at an IP, on average. In one example, the IP might have short-lived users, who generate an average of two events, thus this feature would have a value of 0.5. In another example, an IP might have many business users, who generate on average 10 events, resulting in this feature taking a value of 0.1. To note, the range for this feature is from (0,1] unlike more intuitive reciprocals which range from [1,infty);

ua_events_ratio: This feature is similar to profile_events_ratio only it uses the number of unique user agents instead of profiles;

log 10_mean_ips_visited: The log 10 transform of the average number of IP addresses visited by each profile at this IP;

log 10_mean_pages_visited_global: The log 10 transform of the average number of pages visited/viewed globally by profiles that have been at this IP address;

log 10_mean_pages_visited_at_jp: The log 10 transform of the average number of pages visited/viewed globally by profiles that have been at this IP address; and log 10_mean_avg_daily_ips_visited: This is the same as log 10_mean_jps_visited only it first averages over the daily IPs visited per profile.

Feature generator 802 may identify any other feature 804 that indicates how users may access content at different IP locations. As explained above, IP classification system 800 uses feature dataset 805 to then identify the different types of establishments associated with different IP addresses.

Beyond predicting whether or not an IP address behaves like a business, IP classification system 800 can make other inferences about the type of physical location (e.g., hotel, coffee shop, hospital) or underlying application or process (e.g., mobile network operator, university, botnet, proxy) the network IP address supports. For instance, classification system 800 may infer additional firmographic attributes, such as industry, company size, etc.

IP classification system 800 also may predict other organization characteristics associated with IP addresses 454. In the example above, classification system 800 generated prediction values 820 that indicate the probability of IP address 454 being associated with a business location (IS-BIZ).

FIG. 29 depicts example organization characteristics ($F_{ORG}$) generated by the IP classification system 800, according to various embodiments. Referring to FIGS. 24 and 29, IP classification system 800 may predict other organization types 840 ($F_{ORG}$) associated with external-facing IP address 454. Examples of different organization types 840 are described below.

Enterprise (ENT): An IP address of a corporate office of an enterprise, such as equal to or more than 100 employees.

Small-medium business (SMB): An IP address of a small-medium business location with a smaller number of employees than an enterprise, such as less than 100 employees.

Co-Workspaces (COW): An IP address of a co-working environment, shared by multiple organization entities.

Residential (RES): An IP address of a home residence.

Educational (EDU): An IP address associated with an educational institution, such as colleges or universities.

Hotel (HOTL): An IP address of a hotel.

Airport (AIRP): An IP address of an airport.

Mobile Network Operators (MNO): An IP address of a network to support mobile device internet connectivity BOT and PROXY (B&P): An IP address of a network that supports non-human Internet traffic. For example, bots may access websites when crawling for content. Proxies may fetch data on behalf of users when navigating on webpages.

Social Hubs (SHUB): An IP address of a café, bar, or other public or social business location.

IP classification model 818 may generate single prediction values 844 for a group of organization characteristics 840, such as predicting an IP address located at either an IS-BIZ or an IS-SMB. For example, a multiclass classification model 818 may generate separate prediction values 844 for each different organization type 840 in $F_{ORG}$ vector 842. In ML, multiclass or multinominal classification refers to classifying instances into one of three or more classes, and binary classification refers to classifying instances into two classes.

As mentioned above, CCM 100 may selectively process events 108 with IP addresses associated with particular organization characteristics 840. IP address classification substantially improves the performance of computer systems by allowing CCM 100 to filter out and reduce associated computer processing for events 108 associated with certain organization characteristics 840. CCM 100 can also more accurately calculate consumption scores and detect surge events based on the organization characteristics 840 associated with events 108.

10. IP Address to Domain Resolution System

CCM 100 may use an IP/company database 406 as described above in FIGS. 8 and 18 to map IP addresses to domain names. Unfortunately, some IP-domain mappings may be incorrect. For example, some companies may use IP addresses provided by Internet Service Providers (ISPs). An IP-domain service may incorrectly map IP addresses to the name of the ISP and not the name of the company that uses the IP address. Other companies may operate as their own ISPs and identify their organization names when registering their IP addresses. The IP-domain service may correctly map these IP addresses to the correct organization names.

Another IP-domain service may use tags 110 to obtain domain names of companies entered into webpage forms. The second IP-domain service may map the captured company domain name to an IP address at the location where the user entered the domain name into the webpage form. As explained above, the IP address may be associated with a business location where the user is employed. However, the IP address could also be associated with an ISP used by a variety of home residences or a public location, such as a coffee shop or restaurant, used by the general public. Thus, IP-domain services may map different domains to the same IP address or map different IP addresses to the same domain.

Figure 30:
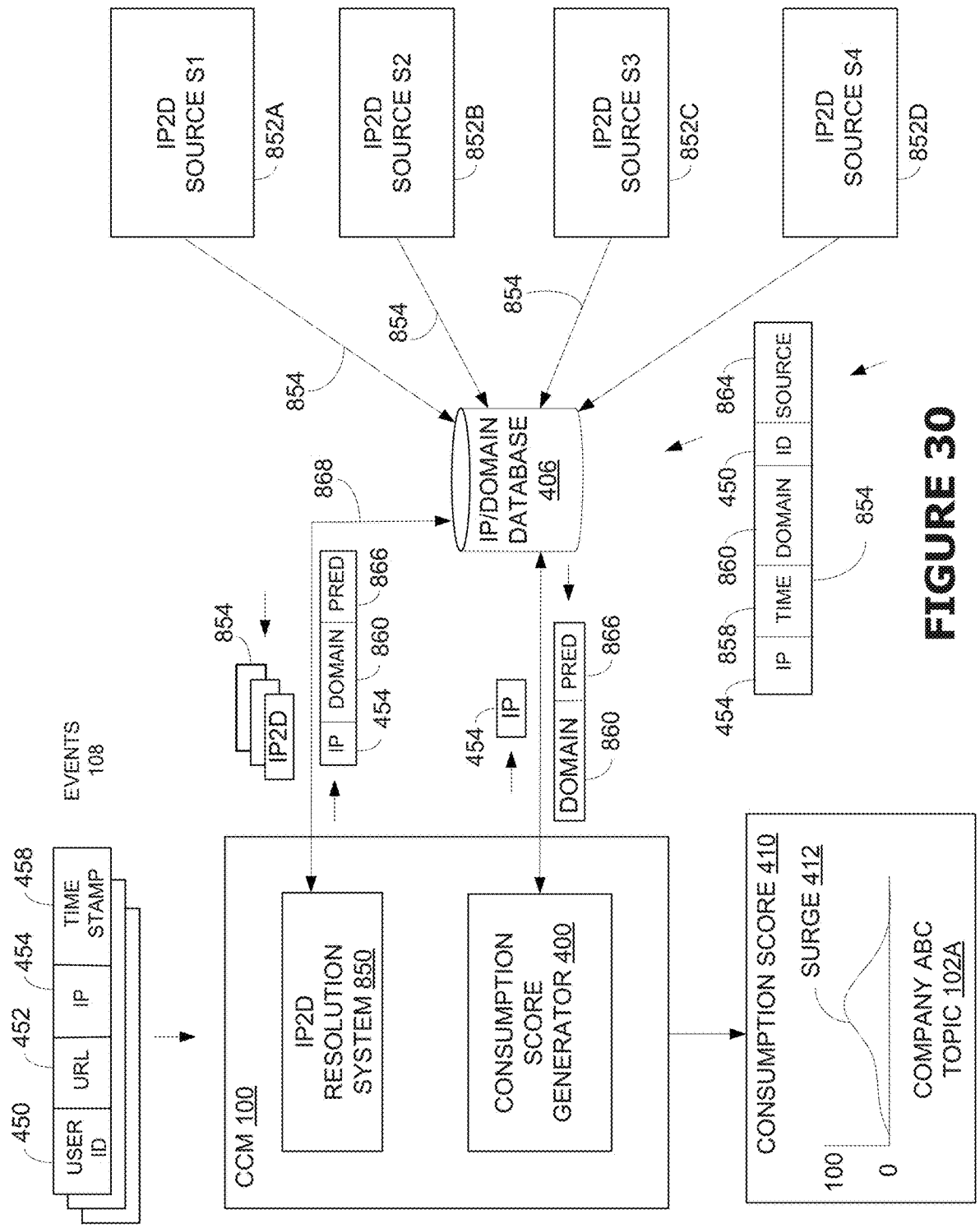
FIG. 30 depicts an example IP2D resolution system that predicts which domains are associated with IP addresses.

Referring to FIG. 30, an IP to domain (IP2D) resolution system 850 predicts which domain is most likely associated with an IP address. Multiple different sources 852 provide IP2D mappings 854. In one example, IP2D source data 854 may include an IP address 454, a timestamp 858, a domain 860, a unique user identifier or profile identifier 450, and a source identifier 864. Resolution system 850 receives and stores IP2D source data 854 from sources 852 in IP/domain database 406. As mentioned above, IP2D source data 854 from sources 852 may map multiple different domains 860 to the same IP address 454. Sources 852 may provide different types of IP2D source data 854 or sources 852 may be different IP2D mapping services. Example types/sources of IP2D source data 854 are described below.

Email Sniffers: First source 852A may obtain IP2D source data 854 from e-mail sniffers which may operate similar to tags 110 described previously and identify email addresses entered into webpage forms. The e-mail sniffers send HTTP requests, such as event 108, back to source 852A that include an external IP address of network where the user is located, the hashed email address, and the domain, extracted from the email address. Source 852A maps the domain to the external IP address of the event message. Other information entered into webforms may additionally or alternatively be captured in a same or similar manner, and this data may be used as a type/source of IP2D source data 854.

Email Logins: Second source 852B may capture email addresses entered into website login platforms. A tag (e.g., same or similar to tag 110) in the login webpage may capture the hashed email address entered into a login form field. The tag sends the captured domain name in the email address to source 852B. Source 852B maps the external IP address 454 of the message/event sent by the tag to the captured domain name. Messages received by second source 852B also may include URLs of the websites where the login activity takes place. The URLs may be used to identify a particular type of business, associated with the IP2D mapping. For example, the URL may identify the login webpage for a bank, or other business-related website. Email login events associated with source 852B may represent more direct commerce activities, such as logging into a bank account, purchasing items, or online newsletter subscription. Email sniffer events associated with source 852A may represent a wider variety of events that include more informational and non-business-related activities. Other information entered into login pages may additionally or alternatively be captured in a same or similar manner, and this data may be used as a type/source of IP2D source data 854.

Email Opens: A third source 852C may capture domain names contained in emails. Another tag (e.g., same or similar to tag 110) may exist in emails sent to different users. The emails contain the email address of the user. When the user opens the email, for example in Outlook®, the tag in the email captures the domain name in the destination email address. The tag sends a message to source 850C that includes the domain name. The external IP address of the message is mapped to the captured domain name in the destination email address. Other information contained in emails or other messages may additionally or alternatively be captured in a same or similar manner, and this data may be used as a type/source of IP2D source data 854.

Offline Lookup: A fourth source 852D may include offline IP2D source data. Some companies supply their business names during a registration process when purchasing IP addresses from Internet Service Providers (ISPs). Data source 852D may access these IP address-business name mappings from ISP registrations or domain name service (DNS) lookups. Data source 852D may collect other domains, such as from business cards or seminar signups where users provide associated business information. Data source 852D may map the domain names to a unique identifier 450 shared with CCM 100. For example, CMM 100 receives events 108 that include unique user ids 450. CMM 100 sends user ids 450 to data source 852D and receives back associated domain names 860. CMM 100 then maps domain names 860 to the unique user ids 450 and associated IP addresses 454 in events 108.

Other examples of IP2D source data 854 include forward DNS records (e.g., all present DNS records for a website or domain), DNS historical records, subdomain mappings, reverse DNS (rDNS) records (e.g., rDNS records obtained by performing an rDNS lookup), registrar name servers (e.g., current records at the domain registrar), glue record history (e.g., DNS records created at the domain registrar), historical registrar name servers (e.g., past information about NS used on the registrar, going back by years), DNS software identification (e.g., software information for the DNS servers such as name, current version, etc.), associated domain names (e.g., associated domains hosted on the same networks as a main apex or root domain), historically associated IPs (e.g., IPs previously or currently associated with a network or domain), and/or other like information.

IP2D resolution system 850 accesses IP2D source data 854 in database 406 via an Internet connection 868 and generates predictions 866 indicating which domain 860 is most likely associated with IP address 454. Resolution system 850 may store predictions 866 in IP/domain database 406 with IP2D source data 854.

CCM 100 receives events 108 that contain IP addresses 454. CSG 400 sends IP address 454 from event 108 to IP/Domain database 406. Database 406 may send back the domain 860 with the highest prediction value 866 for IP address 454. CSG 400 then generates consumption score 410 for the company associated with domain 860. This allows CSG 400 to more accurately identify the companies associated with events 108, generate more accurate consumption scores 410, and more accurately identify associated company surges 412.

Some IP addresses 454 may have domains 860 with low prediction scores 866. CSG 400 may decide not to generate consumption scores 410 for IP addresses 454 with domain prediction values 866 below some threshold value. This improves the performance and bandwidth of CCM 100 by avoiding processing events 108 and generating associated consumption scores 410 with unreliable domain names IP addresses 454 may be periodically reassigned to different domains 860. Different sources 852 also may periodically provide new IP2D source data 854 with different IP to domain mappings. IP2D predictor 850 may periodically retrain computer learning models that make domain predictions 866 with the latest IP2D source data 854.

11. IP-Domain-Source Voting Matrix

Figure 31:
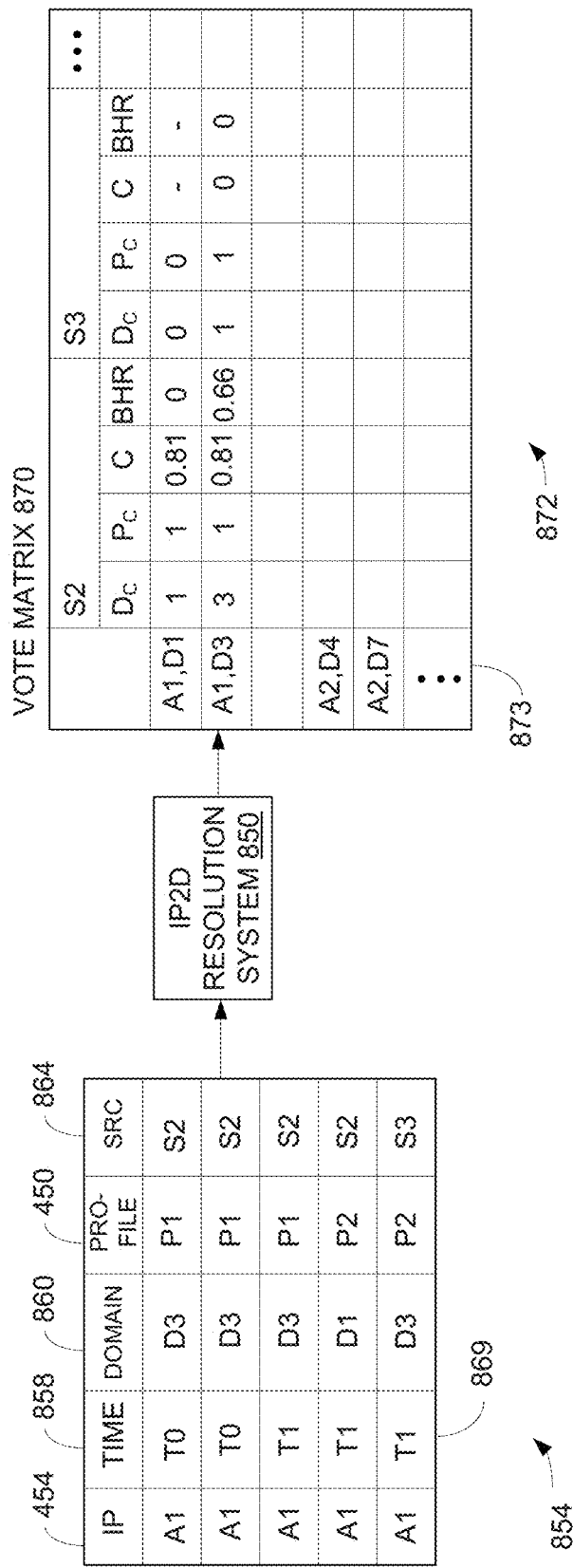
FIG. 31 depicts example source vote features ($F_{SV}$) generated from IP2D source data.

FIG. 31 shows how IP2D resolution system 850 generates a vote matrix 870 from IP2D source data 854. A table 869 includes a set of IP2D source data 854. IP2D source data 854 includes IP address (A) to domain (D) mappings generated by different sources (S). IP2D source data 854 may be generated at different times (T) and associated with different profiles (P). In this example, table 869 includes IP2D source data 854 for IP address (A1).

IP address A is a public/external IP address mapped to a domain D by one of sources S. In one example, IP address A may be the external IP address where a tag captures a domain D. In another example, IP address A may be identified in a domain name service registry.

Time T is a date and timestamp with a time zone offset that refers to a same universal time. Time T may be a time when domain D was captured or may some other time indicating when domain D was mapped to IP address A.

Domain D is a domain name, business name, or any other name associated with a business, or any other organization.

Id/profile P is a unique identifier associated with a person, organization, computing device, or event. For example, a tag or cookie on a computer device may have an associated unique id 450. The tag (e.g., tag 110) is inserted into a web browser, webpage, email, or some other information object or application. The tag captures a network session events (and/or other data) and sends the event along with the id to a source.

Source S refers to any scheme used for capturing IP2D source data 854 or any service that provides IP2D source data 854. As mentioned above sources 852 may include email sniffers, email logins, email opens, and offline look-ups. But of course, these are just examples of any sources that may provide IP2D source data 854.

Resolution system 850 generates unique source vote features 872 ($F_{SV}$) in vote matrix 870 from raw IP2D source data 854. Features 872 are alternatively referred to as counts. Resolution system 850 generates features 872 for particular time periods, such as every 24 hours or every week. For example, resolution system 850 may aggregate all IP2D source data 854 received from all sources 852 over the previous week. Resolution system 850 then generates features 872 for the weeks-worth of IP2D source data 854. In some implementations, the vote matrix 870 may be a "voting classifier" that aggregates the features or predictions from multiple classifiers, and is used to predict an output class based on the highest weighted or non-weighted votes. Other matrix implementations may be used in other embodiments.

Resolution system 850 groups IP2D source data 854 into (A,D,S) keys. In this example, resolution system 850 generates features/counts 872 for each source S2 and S3 and each unique IP-domain pair 873. For example, table 869 include two unique IP-domain pairs (A1,D1) and (A1,D3). Resolution system 850 calculates a domain count $D_C$, profile count $P_C$, confusion, and business hour ratio (BHR) for each (A,D,S) key.

$D_C$ is the total number of times a particular source S maps a particular domain D domain to a particular IP address A. In this example, source S2 maps D1 to A1 one time and maps D3 to A1 three times.

$P_C$ is the number of unique profiles or user ids associated with each unique (A,D) mapping for the same source S. In this example, one unique profile P2 is associated with the (A1,D1) mapping and one unique profile P1 is associated with the (A1,D3) mapping.

C is the amount of source confusion or entropy associated with the (A,D) mapping. For example, more domains D mapped to a same IP address A may increase confusion C. In one example, a normalized Shannon entropy may be calculated for each (A,D) pair, where a value of 0 represents no confusion and a value of 1 represents maximum confusion.

Equation 1.0 shows an example formula used for calculating confusion C for a given IP address Ai.

$$C(Si) = -\sum_{Di}^{n} P(Di) \log_2 P(Di) \quad \text{Equation 1.0}$$

Si refers to a particular source and P(Di) refers to the probability of a source Si identifying a particular domain D.

For example, the probability of source S2 mapping D3 to A1 is P(A1,D3)=¾=0.75. The probability of source S2 mapping D1 to A1 is P (A1, D1)=¼=0.25. The calculated confusion of source S2 and A1 is C(S2)=[−¾×log$_2$(¾)]+[−¼×log$_2$(¼)]=[−0.75×−0.415]+[−0.25×2]=1−0.189=0.811.

Business hour ratio (BHR) calculates the ratio of the number of (A,D,S) keys generated during local business hours compared with the number of (A,D,S) keys generated over all hours. For example, the single (A1,D1,S2) mapping may have a timestamp T1 outside of normal 9 am-5 pm working hours. Therefore, BHR for (A1,D1,S2) is 0/1=0. Two of the three (A1,D3,S2) mappings may have a timestamp T0 within normal 9 am-5 pm working hours. Therefore, BHR for (A1,D3,S2) is ⅔=0.66.

FIG. 32 shows vote matrix 870 containing labeled IP2D training data 874. Labeled training data 874 is also referred to as a labeled dataset and includes known correct (A,D) mappings. Labeled training data 874 may be human curated to confirm a particular IP address is used by, or is located at, a particular domain. The Labeled training data 874 includes a Label (L) field/column 878, which indicates whether an IP2D mapping is a known correct mapping or a known incorrect IP2D mapping. In this example, (A1,D1) is a known correct IP2D mapping and (A1,D3) is a known incorrect IP2D mapping. IP2D resolution system 850 adds a true (one) label (L) to (A1,D1) row 876A of vote matrix 870 and adds a false (zero) label L to (A1,D3) row 876B.

Figure 33:
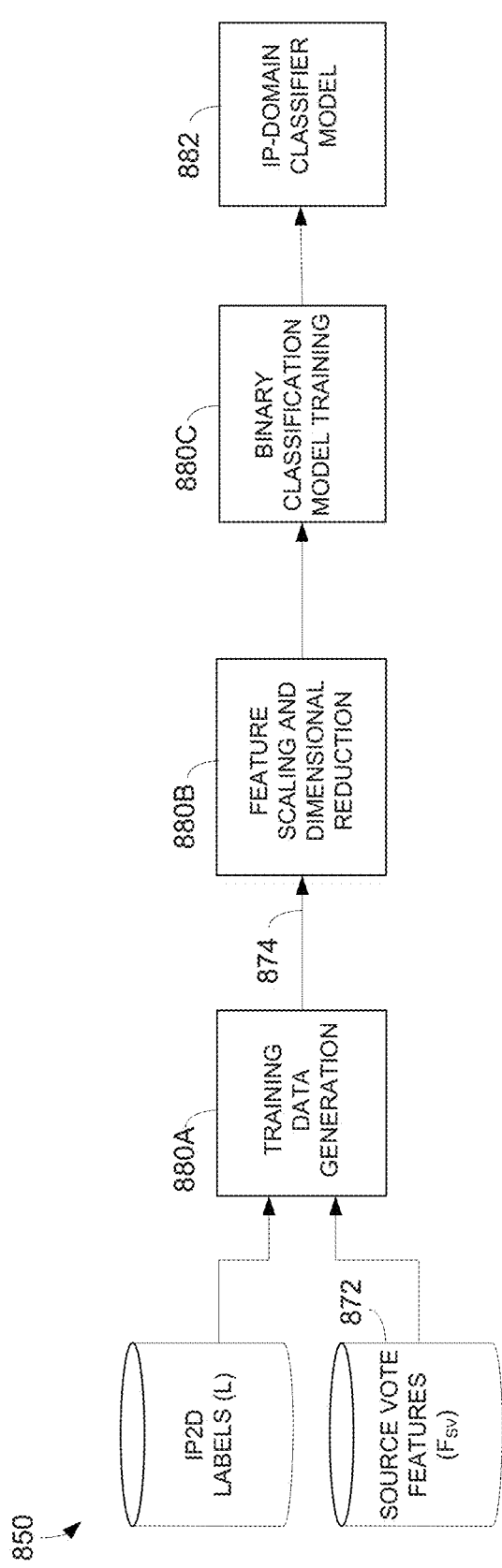
FIG. 33 depicts an example process for training an IP-Domain (IP2D) classifier model.

FIG. 33 describes in more detail how IP2D resolution system 850 trains an IP-domain classifier model. Operation 880A generates labeled IP2D training data 874 as shown above by labeling $F_{SV}$ features 872 with known correct and incorrect IP2D labels L.

Operation 880B may scale, normalize, and/or reduce the dimensions of labeled training data 874. For example, operation 880B may remove data 874 from certain sources S that are highly correlated with other sources. If two different sources S provide essentially the same data 874, operation 880B may remove data for the redundant sources. Operation 880B also may reduce the dimensions of training data 874, by reducing the number of columns in vote matrix 870 or creating new sources S that combine training data 874 from different sources.

Operation 880C uses binary classification model training to train an IP2D classifier model 882. Operation 880C may use a first set of labeled training data 874 to build a first version of IP2D classifier model 882. Operation 880C then inputs a second set of labeled training data 874 into IP2D classifier model 882 and compares the predictions with the labeled IP2D relationships. Operation 880C refines feature weightings in IP2D classifier model 882 until IP2D predictions are optimized. Example computer IP-domain classifier models 882 may include logistic regression (LR) models, Random Forest models, ensemble learning models, voting classifiers, and/or other like ML models, such as those discussed elsewhere herein.

Figure 34:
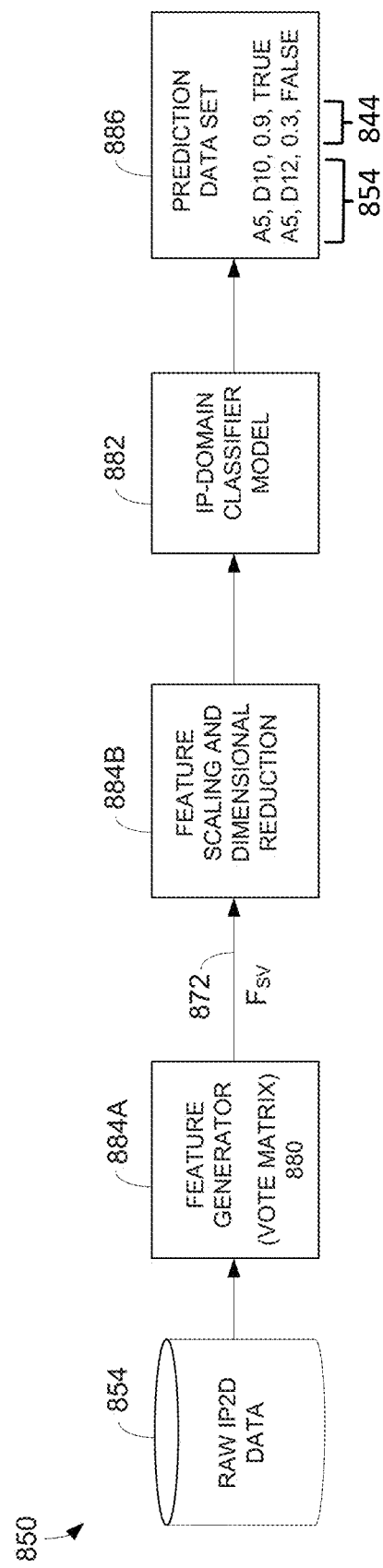
FIG. 34 depicts an example process for using the IP2D classifier model in FIG. 33 to generate IP2D predictions.

FIG. 34 shows how IP2D resolution system 850 uses trained IP2D classifier model 882 to predict most likely IP-domain mappings. A feature generation operation 884A generates $F_{SV}$ features 872 from raw IP2D source data 854 as described above. Operation 884B performs feature scaling and dimensional reduction similar to operation 880B in FIG. 33.

IP-domain classifier model 882 receives scaled IP2D features 872 and outputs a prediction data set 886. For example, IP2D classifier model 882 may predict a domain D10 has a 0.9 probability of mapping to IP address A5 and predict domain D12 has a 0.3 probability of mapping to IP address A5. Resolution system 850 may use thresholds to generate true or false associations of domains D with IP addresses A. For example, system 850 may identify any probability equal or greater than 50% as true and any probability less than 50% as false. Resolution system 850 then may identify the IP-domain mapping 854 with a highest probability 844 greater than 50% as true and identify all other IP-domain mappings for the same IP address A5 as false.

Figure 35:
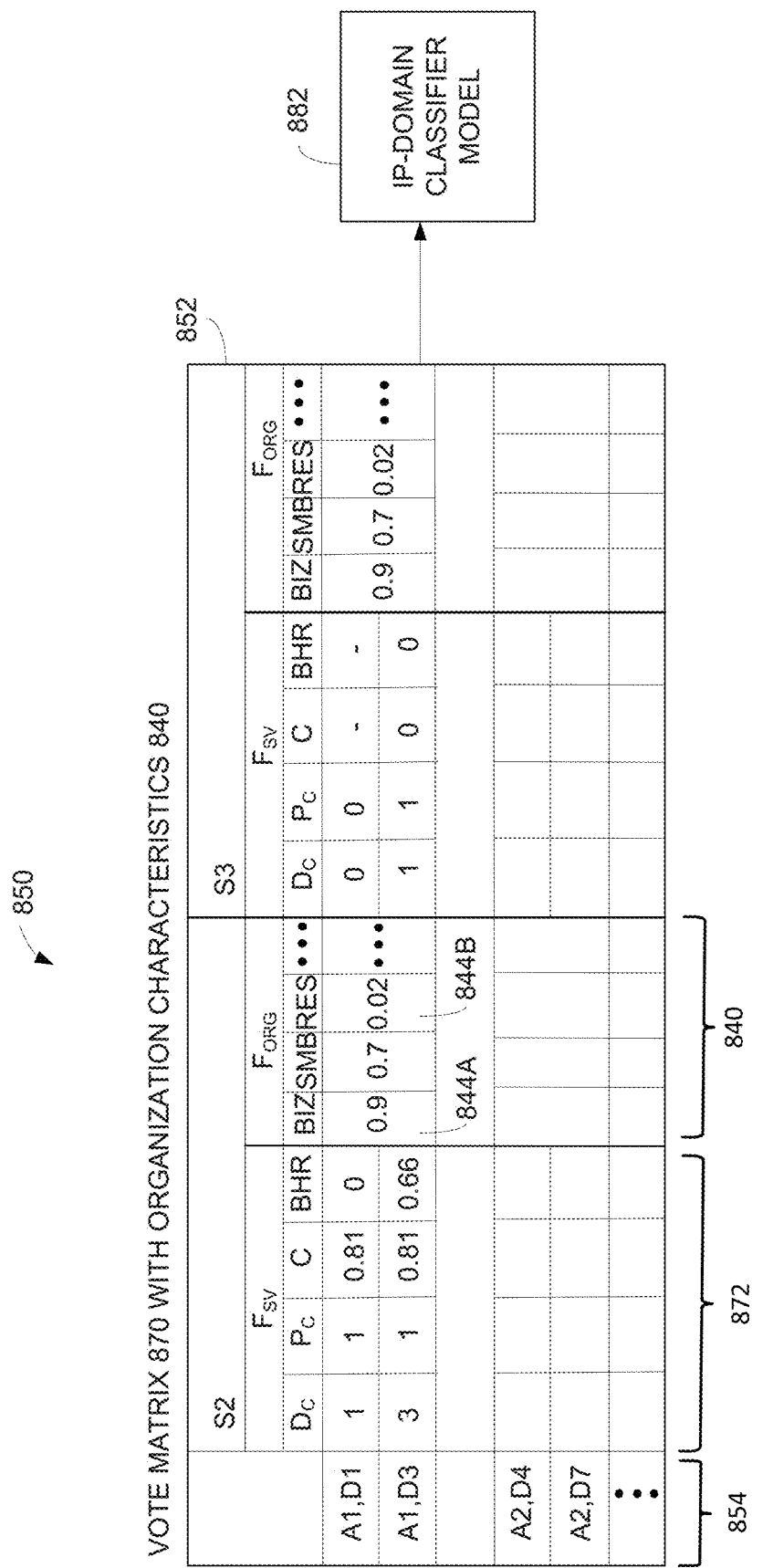
FIG. 35 depicts example $F_{SV}$ and $F_{ORG}$ features used for training the IP2D classifier model.

FIG. 35 shows how IP2D resolution system 850 uses both source vote features $F_{SV}$ and organization characteristics $F_{ORG}$ (also referred to as "organization features", "org features", and the like) to predict IP2D mappings. Resolution system 850 generates $F_{SV}$ features 872 from each unique (A,D,S) keys as described above. As also described supra in FIG. 29, IP entity classifier 806 may generate $F_{ORG}$ organization characteristics 840 for IP addresses.

IP resolution system 850 may combine $F_{SV}$ features 872 with $F_{ORG}$ features 840 into the same vote matrix 870. Resolution system 850 performs the same model training described above in FIG. 33, but with the combined $F_{SV}$ features 872 and $F_{ORG}$ features 840. Resolution system 850 uses the trained IP2D classification model 882 to predict the most likely domains D for associated IP addresses A.

Trained classification model 882 now also takes into account organization characteristics predictions 844 when predicting a most likely domain D for the IP address A. For example, domain D1 may be associated with a large company and domain D3 may be associated with an ISP that provides IP addresses to home residences. IP2D classifier model 882 may increase a probability score for domain D1 when IP address A1 has a high IP-BIZ prediction value 844A and a low residential (RES) prediction value 844B in organization characteristics 840.

By more accurately predicting the correct domains for associated IP addresses, IP2D resolution system 850 allows computing devices to more efficiently identify and process events 108 and generate more meaningful and accurate content consumption scores and surge detections for more identifiable organizations. Generating the unique features and training the associated computer learning models (ML models) described above, allow computing devices to process more events than previously possible and analyze an extraordinary numbers of diverse computing states and data variables. These capabilities were not previously possible using conventional computer programming techniques. Thus, content consumption monitor 100 not only increases computing system performance but also enables computing systems to analyze larger more complex data sets. This amounts to an improvement in the functioning of computing systems themselves.

12. Example Hardware and Software Configurations and Implementations

Figure 36:
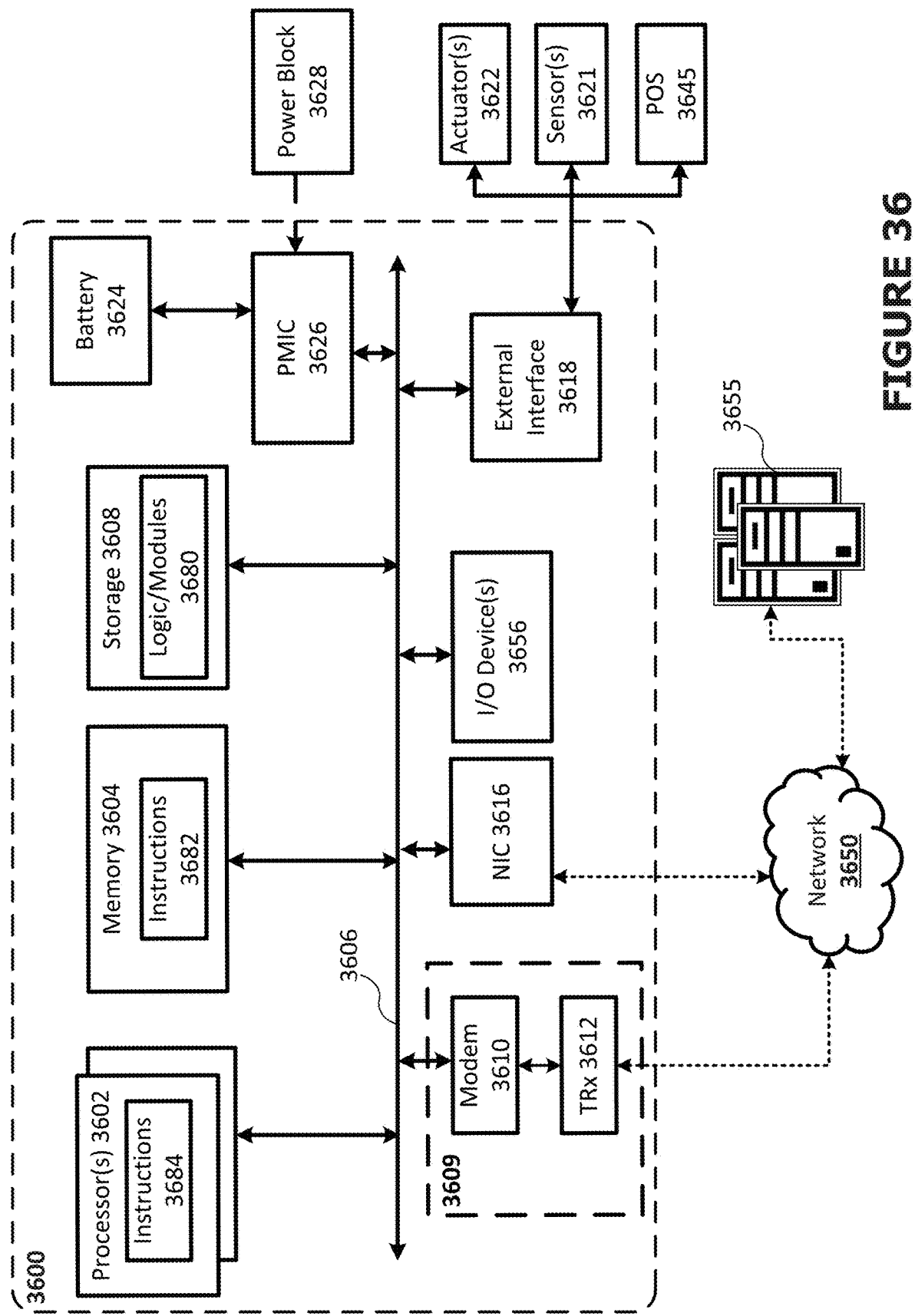
FIG. 36 depicts an example computing system suitable for practicing various aspects of the various embodiments discussed herein.

FIG. 36 illustrates an example of an computing system 3600 (also referred to as "computing device 3600," "platform 3600," "device 3600," "appliance 3600," "server 3600," or the like) in accordance with various embodiments. The computing system 3600 may be suitable for use as any of the computer devices discussed herein and performing any combination of processes discussed above. As examples, the computing device 3600 may operate in the capacity of a server or a client machine in a server-client network environment, or as a peer machine in a peer-to-peer (or distributed) network environment. Additionally or alternatively, the system 3600 may represent the CCM 100, IP2D resolution system 850, user computer(s) 280, application server(s), a third party platform or collection of servers that hosts and/or serves third party content 112, and/or any other system or device discussed previously. Additionally or alternatively, various combinations of the components depicted by FIG. 36 may be included depending on the particular system/device that system 3600 represents. For example, when system 3600 represents a user or client device, the system 3600 may include some or all of the components shown by FIG. 36. In another example, when the system 3600 represents the CCM 100 or a server computer system, the system 3600 may not include the communication circuitry 3609 or battery 3624, and instead may include multiple NICs 3616 or the like. As examples, the system 3600 and/or the remote system 3655 may comprise desktop computers, workstations, laptop computers, mobile cellular phones (e.g., "smartphones"), tablet computers, portable media players, wearable computing devices, server computer systems, web appliances, network appliances, an aggregation of computing resources (e.g., in a cloud-based environment), or some other computing devices capable of interfacing directly or indirectly with network 3650 or other network, and/or any other machine or device capable of executing instructions (sequential or otherwise) that specify actions to be taken by that machine.

The components of system 3600 may be implemented as an individual computer system, or as components otherwise incorporated within a chassis of a larger system. The components of system 3600 may be implemented as integrated circuits (ICs) or other discrete electronic devices, with the appropriate logic, software, firmware, or a combination thereof, adapted in the computer system 3600. Additionally or alternatively, some of the components of system 3600 may be combined and implemented as a suitable System-on-Chip (SoC), System-in-Package (SiP), multi-chip package (MCP), or the like.

The system 3600 includes physical hardware devices and software components capable of providing and/or accessing content and/or services to/from the remote system 3655. The system 3600 and/or the remote system 3655 can be implemented as any suitable computing system or other data processing apparatus usable to access and/or provide content/services from/to one another. The remote system 3655 may have a same or similar configuration and/or the same or similar components as system 3600. The system 3600 communicates with remote systems 3655, and vice versa, to obtain/serve content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Secure Shell (SSH), Extensible Messaging and Presence Protocol (XMPP); WebSocket; and/or some other communication protocol, such as those discussed herein.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents, audio files such as MPEG-4 audio files and WebM audio and/or video files; etc.). As used herein, the term "service" refers to a particular functionality or a set of functions to be performed on behalf of a requesting party, such as the system 3600. As examples, a service may include or involve the retrieval of specified information or the execution of a set of operations. In order to access the content/services, the system 3600 includes components such as processors, memory devices, communication interfaces, and the like. However, the terms "content" and "service" may be used interchangeably throughout the present disclosure even though these terms refer to different concepts.

Referring now to system 3600, the system 3600 includes processor circuitry 3602, which is configurable or operable to execute program code, and/or sequentially and automatically carry out a sequence of arithmetic or logical operations; record, store, and/or transfer digital data. The processor circuitry 3602 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 3602 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 3602 may be coupled with or may include memory/storage and may be configurable or operable to execute instructions stored in the memory/storage to enable various applications or operating systems to run on the system 3600. In these embodiments, the processors (or cores) of the processor circuitry 3602 are configurable or operable to operate application software (e.g., logic/modules 3680) to provide specific services to a user of the system 3600. In some embodiments, the processor circuitry 3602 may include special-purpose processor/controller to operate according to the various embodiments herein.

In various implementations, the processor(s) of processor circuitry 3602 may include, for example, one or more processor cores (CPUs), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, microprocessors or controllers, or any suitable combination thereof. As examples, the processor circuitry 3602 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 3602 may be mentioned elsewhere in the present disclosure.

In some implementations, the processor(s) of processor circuitry 3602 may be, or may include, one or more media processors comprising microprocessor-based SoC(s), FPGA(s), or DSP(s) specifically designed to deal with digital streaming data in real-time, which may include encoder/decoder circuitry to compress/decompress (or encode and decode) Advanced Video Coding (AVC) (also known as H.264 and MPEG-4) digital data, High Efficiency Video Coding (HEVC) (also known as H.265 and MPEG-H part 2) digital data, and/or the like.

In some implementations, the processor circuitry 3602 may include one or more hardware accelerators. The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the CCM 100, IP2D resolution system 850, and/or some other system/device discussed herein, which may be more efficient than using general-purpose processor cores. In some embodiments, the specific tasks or workloads may be offloaded from one or more processors of the processor circuitry 3602. In these implementations, the circuitry of processor circuitry 3602 may comprise logic blocks or logic fabric including and other interconnected resources that may be programmed to perform various functions, such as the procedures, methods, functions, etc. of the various embodiments discussed herein. Additionally, the processor circuitry 3602 may include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 3602 may include hardware elements specifically tailored for machine learning functionality, such as for operating the subsystems of the CCM 100 discussed previously with regard to FIG. 2. In these implementations, the processor circuitry 3602 may be, or may include, an AI engine chip that can run many different kinds of AI instruction sets once loaded with the appropriate weightings and training code. Additionally or alternatively, the processor circuitry 3602 may be, or may include, AI accelerator(s), which may be one or more of the aforementioned hardware accelerators designed for hardware acceleration of AI applications, such as one or more of the subsystems of CCM 100, IP2D resolution system 850, and/or some other system/device discussed herein. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 3602 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 3602 may be, or may include, one or more custom-designed silicon cores specifically designed to operate corresponding subsystems of the CCM 100, IP2D resolution system 850, and/or some other system/device discussed herein. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the CCM 100, IP2D resolution system 850, and/or some other system/device discussed herein may be operated, at least in part, on custom-designed silicon core(s). These "hardware-ized" subsystems may be integrated into a larger chipset but may be more efficient that using general purpose processor cores.

The system memory circuitry 3604 comprises any number of memory devices arranged to provide primary storage from which the processor circuitry 3602 continuously reads instructions 3682 stored therein for execution. In some embodiments, the memory circuitry 3604 is on-die memory or registers associated with the processor circuitry 3602. As examples, the memory circuitry 3604 may include volatile memory such as random access memory (RAM), dynamic RAM (DRAM), synchronous DRAM (SDRAM), etc. The memory circuitry 3604 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 3604 may also comprise persistent storage devices, which may be temporal and/or persistent storage of any type, including, but not limited to, non-volatile memory, optical, magnetic, and/or solid state mass storage, and so forth.

In some implementations, some aspects (or devices) of memory circuitry 3604 and storage circuitry 3608 may be integrated together with a processing device 3602, for example RAM or FLASH memory disposed within an integrated circuit microprocessor or the like. In other implementations, the memory circuitry 3604 and/or storage circuitry 3608 may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Storage circuitry 3608 is arranged to provide persistent storage of information such as data, applications, operating systems (OS), and so forth. As examples, the storage circuitry 3608 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 3602, resistance change memories, phase change memories, holographic memories, or chemical memories, and the like.

The storage circuitry 3608 is configurable or operable to store computational logic 3680 (or "modules 3680") in the form of software, firmware, microcode, or hardware-level instructions to implement the techniques described herein. The computational logic 3680 may be employed to store working copies and/or permanent copies of programming instructions, or data to create the programming instructions, for the operation of various components of system 3600 (e.g., drivers, libraries, application programming interfaces (APIs), etc.), an OS of system 3600, one or more applications, and/or for carrying out the embodiments discussed herein. The computational logic 3680 may be stored or loaded into memory circuitry 3604 as instructions 3682, or data to create the instructions 3682, which are then accessed for execution by the processor circuitry 3602 to carry out the functions described herein. The processor circuitry 3602 accesses the memory circuitry 3604 and/or the storage circuitry 3608 over the interconnect (IX) 3606. The instructions 3682 to direct the processor circuitry 3602 to perform a specific sequence or flow of actions, for example, as described with respect to flowchart(s) and block diagram(s) of operations and functionality depicted previously. The various elements may be implemented by assembler instructions supported by processor circuitry 3602 or high-level languages that may be compiled into instructions 3684, or data to create the instructions 3684, to be executed by the processor circuitry 3602. The permanent copy of the programming instructions may be placed into persistent storage devices of storage circuitry 3608 in the factory or in the field through, for example, a distribution medium (not shown), through a communication interface (e.g., from a distribution server (not shown)), or over-the-air (OTA).

The operating system (OS) of system 3600 may be a general purpose OS or an OS specifically written for and tailored to the computing system 3600. For example, when the system 3600 is a server system or a desktop or laptop system 3600, the OS may be Unix or a Unix-like OS such as Linux e.g., provided by Red Hat Enterprise, Windows 10™ provided by Microsoft Corp.®, macOS provided by Apple Inc.®, or the like. In another example where the system 3600 is a mobile device, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like.

The OS manages computer hardware and software resources, and provides common services for various applications (e.g., application 110). The OS may include one or more drivers or APIs that operate to control particular devices that are embedded in the system 3600, attached to the system 3600, or otherwise communicatively coupled with the system 3600. The drivers may include individual drivers allowing other components of the system 3600 to interact or control various I/O devices that may be present within, or connected to, the system 3600. For example, the drivers may include a display driver to control and allow access to a display device, a touchscreen driver to control and allow access to a touchscreen interface of the system 3600, sensor drivers to obtain sensor readings of sensor circuitry 3621 and control and allow access to sensor circuitry 3621, actuator drivers to obtain actuator positions of the actuators 3622 and/or control and allow access to the actuators 3622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 3600, such as the various subsystems of the CCM 100, IP2D resolution system 850, and/or some other system/device discussed previously.

The components of system 3600 communicate with one another over the interconnect (IX) 3606. The IX 3606 may include any number of IX technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 3606 may be a proprietary bus, for example, used in a SoC based system.

The communication circuitry 3609 is a hardware element, or collection of hardware elements, used to communicate over one or more networks (e.g., network 3650) and/or with other devices. The communication circuitry 3609 includes modem 3610 and transceiver circuitry ("TRx") 812. The modem 3610 includes one or more processing devices (e.g., baseband processors) to carry out various protocol and radio control functions. Modem 3610 may interface with application circuitry of system 3600 (e.g., a combination of processor circuitry 3602 and CRM 860) for generation and processing of baseband signals and for controlling operations of the TRx 3612. The modem 3610 may handle various radio control functions that enable communication with one or more radio networks via the TRx 3612 according to one or more wireless communication protocols. The modem 3610 may include circuitry such as, but not limited to, one or more single-core or multi-core processors (e.g., one or more baseband processors) or control logic to process baseband signals received from a receive signal path of the TRx 3612, and to generate baseband signals to be provided to the TRx 3612 via a transmit signal path. In various embodiments, the modem 3610 may implement a real-time OS (RTOS) to manage resources of the modem 3610, schedule tasks, etc.

The communication circuitry 3609 also includes TRx 3612 to enable communication with wireless networks using modulated electromagnetic radiation through a non-solid medium. TRx 3612 includes a receive signal path, which comprises circuitry to convert analog RF signals (e.g., an existing or received modulated waveform) into digital baseband signals to be provided to the modem 3610. The TRx 3612 also includes a transmit signal path, which comprises circuitry configurable or operable to convert digital baseband signals provided by the modem 3610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 3612 using metal transmission lines or the like.

The TRx 3612 may include one or more radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 1600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the TRx 3612 including, for example, radios compliant with standards issued by the ITU (International Telecommunication Union), or the ETSI (European Telecommunications Standards Institute), among others, both existing and not yet formulated.

Network interface circuitry/controller (NIC) 3616 may be included to provide wired communication to the network 3650 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 3600 via NIC 3616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 3616 may include one or more dedicated processors and/or FPGAs to communicate using one or more of the aforementioned network interface protocols. In some implementations, the NIC 3616 may include multiple controllers to provide connectivity to other networks using the same or different protocols. For example, the system 3600 may include a first NIC 3616 providing communications to the cloud over Ethernet and a second NIC 3616 providing communications to other devices over another type of network. In some implementations, the NIC 3616 may be a high-speed serial interface (HSSI) NIC to connect the system 3600 to a routing or switching device.

Network 3650 comprises computers, network connections among various computers (e.g., between the system 3600 and remote system 3655), and software routines to enable communication between the computers over respective network connections. In this regard, the network 3650 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 3650 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 3650 may require that the computers execute software routines which enable, for example, the seven layers of the OSI model of computer networking or equivalent in a wireless (or cellular) phone network.

The network 3650 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 3650 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The external interface 3618 (also referred to as "I/O interface circuitry" or the like) is configurable or operable to connect or coupled the system 3600 with external devices or subsystems. The external interface 3618 may include any suitable interface controllers and connectors to couple the system 3600 with the external components/devices. As an example, the external interface 3618 may be an external expansion bus (e.g., Universal Serial Bus (USB), FireWire, Thunderbolt, etc.) used to connect system 3600 with external (peripheral) components/devices. The external devices include, inter alia, sensor circuitry 3621, actuators 3622, and positioning circuitry 3645, but may also include other devices or subsystems not shown by FIG. 36.

The sensor circuitry 3621 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 3618 connects the system 3600 to actuators 3622, which allow system 3600 to change its state, position, and/or orientation, or move or control a mechanism or system. The actuators 3622 comprise electrical and/or mechanical devices for moving or controlling a mechanism or system, and/or converting energy (e.g., electric current or moving air and/or liquid) into some kind of motion. The actuators 3622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3622 may include one or more electro-mechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 3600 may be configurable or operable to operate one or more actuators 3622 based on one or more captured events and/or instructions or control signals received from a service provider and/or various client systems. In embodiments, the system 3600 may transmit instructions to various actuators 3622 (or controllers that control one or more actuators 3622) to reconfigure an electrical network as discussed herein.

The positioning circuitry 3645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 3645 may include a Micro-Technology for Positioning, Navigation, and Timing (Micro-PNT) IC that uses a master timing clock to perform position tracking/estimation without GNSS assistance. The positioning circuitry 3645 may also be part of, or interact with, the communication circuitry 3609 to communicate with the nodes and components of the positioning network. The positioning circuitry 3645 may also provide position data and/or time data to the application circuitry, which may use the data to synchronize operations with various infrastructure (e.g., radio base stations), for turn-by-turn navigation, or the like.

The input/output (I/O) devices 3656 may be present within, or connected to, the system 3600. The I/O devices 3656 include input device circuitry and output device circuitry including one or more user interfaces designed to enable user interaction with the system 3600 and/or peripheral component interfaces designed to enable peripheral component interaction with the system 3600. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the system 3600. The output device circuitry may also include speakers or other audio emitting devices, printer(s), and/or the like. In some embodiments, the sensor circuitry 3621 may be used as the input device circuitry (e.g., an image capture device, motion capture device, or the like) and one or more actuators 3622 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 3624 may be coupled to the system 3600 to power the system 3600, which may be used in embodiments where the system 3600 is not in a fixed location, such as when the system 3600 is a mobile or laptop client system. The battery 3624 may be a lithium ion battery, a lead-acid automotive battery, or a metal-air battery, such as a zinc-air battery, an aluminum-air battery, a lithium-air battery, a lithium polymer battery, and/or the like. In embodiments where the system 3600 is mounted in a fixed location, such as when the system is implemented as a server computer system, the system 3600 may have a power supply coupled to an electrical grid. In these embodiments, the system 3600 may include power tee circuitry to provide for electrical power drawn from a network cable to provide both power supply and data connectivity to the system 3600 using a single cable.

Power management integrated circuitry (PMIC) 3626 may be included in the system 3600 to track the state of charge (SoCh) of the battery 3624, and to control charging of the system 3600. The PMIC 3626 may be used to monitor other parameters of the battery 3624 to provide failure predictions, such as the state of health (SoH) and the state of function (SoF) of the battery 3624. The PMIC 3626 may include voltage regulators, surge protectors, power alarm detection circuitry. The power alarm detection circuitry may detect one or more of brown out (under-voltage) and surge (over-voltage) conditions. The PMIC 3626 may communicate the information on the battery 3624 to the processor circuitry 3602 over the IX 3606. The PMIC 3626 may also include an analog-to-digital (ADC) convertor that allows the processor circuitry 3602 to directly monitor the voltage of the battery 3624 or the current flow from the battery 3624. The battery parameters may be used to determine actions that the system 3600 may perform, such as transmission frequency, mesh network operation, sensing frequency, and the like.

A power block 3628, or other power supply coupled to an electrical grid, may be coupled with the PMIC 3626 to charge the battery 3624. In some examples, the power block 3628 may be replaced with a wireless power receiver to obtain the power wirelessly, for example, through a loop antenna in the system 3600. In these implementations, a wireless battery charging circuit may be included in the PMIC 3626. The specific charging circuits chosen depend on the size of the battery 3624 and the current required.

The system 3600 may include any combinations of the components shown by FIG. 36, however, some of the components shown may be omitted, additional components may be present, and different arrangement of the components shown may occur in other implementations. In one example where the system 3600 is or is part of a server computer system, the battery 3624, communication circuitry 3609, the sensors 3621, actuators 3622, and/or POS 3645, and possibly some or all of the I/O devices 3656 may be omitted.

Furthermore, the embodiments of the present disclosure may take the form of a computer program product or data to create the computer program, with the computer program or data embodied in any tangible or non-transitory medium of expression having the computer-usable program code (or data to create the computer program) embodied in the medium. For example, the memory circuitry 3604 and/or storage circuitry 3608 may be embodied as non-transitory computer-readable storage media (NTCRSM) that may be suitable for use to store instructions (or data that creates the instructions) that cause an apparatus (such as any of the devices/components/systems described with regard to FIGS. 1-35), in response to execution of the instructions by the apparatus, to practice selected aspects of the present disclosure. As shown, NTCRSM may include a number of programming instructions 3684, 3682 (or data to create the programming instructions). Programming instructions 3684, 3682 may be configurable or operable to enable a device (e.g., any of the devices/components/systems described with regard to FIGS. 1-35), in response to execution of the programming instructions 3684, 3682, to perform various programming operations associated with operating system functions, one or more applications, and/or aspects of the present disclosure (including various programming operations associated with FIGS. 1-35). In various embodiments, the programming instructions 3684, 3682 may correspond to any of the computational logic 3680, instructions 3682 and 3684 discussed previously with regard to FIG. 36.

In alternate embodiments, programming instructions 3684, 3682 (or data to create the instructions 3684, 3682) may be disposed on multiple NTCRSM. In alternate embodiments, programming instructions 3684, 3682 (or data to create the instructions 3684, 3682) may be disposed on computer-readable transitory storage media, such as, signals. The programming instructions 3684, 3682 embodied by a machine-readable medium may be transmitted or received over a communications network using a transmission medium via a network interface device (e.g., communication circuitry 3609 and/or NIC 3616 of FIG. 36) utilizing any one of a number of transfer protocols (e.g., HTTP, etc.).

Any combination of one or more computer usable or computer readable media may be utilized as or instead of the NTCRSM. The computer-usable or computer-readable medium may be, for example but not limited to, one or more electronic, magnetic, optical, electromagnetic, infrared, or semiconductor systems, apparatuses, devices, or propagation media. For instance, the NTCRSM may be embodied by devices described for the storage circuitry 3608 and/or memory circuitry 3604 described previously. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. In the context of the present disclosure, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (e.g., including programming instructions 3684, 3682) or data to create the program code embodied therewith, either in baseband or as part of a carrier wave. The computer usable program code or data to create the program may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (e.g., programming instructions 3684, 3682) or data to create the program code as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an application programming interface (API), etc. in order to execute the instructions on a particular computing device or other device. In another example, the program code or data to create the program code may need to be configured (e.g., settings stored, data input, network addresses recorded, etc.) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including for example, programming instructions 3684, 3682, computational logic 3680, instructions 3682, and/or instructions 3684, may be implemented as software code to be executed by one or more processors using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), ECMAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™ Rholang, Michelson, Counterfactual, Plasma, Plutus, Sophia, Salesforce® Apex®, Salesforce® Lightning®, and/or any other programming language, markup language, script, code, etc. In some implementations, a suitable integrated development environment (IDE) or software development kit (SDK) may be used to develop the program code or software elements discussed herein such as, for example, Android® Studio™ IDE, Apple® iOS® SDK, or development tools including proprietary programming languages and/or development tools. Furthermore, some or all of the software components or functions described herein can utilize a suitable querying language to query and store information in one or more databases or data structures, such as, for example, Structure Query Language (SQL), noSQL, and/or other query languages. The software code can be stored as a computer- or processor-executable instructions or commands on a physical non-transitory computer-readable medium. The computer program code for carrying out operations of the present disclosure may also be written in any combination of the programming languages discussed herein. The program code may execute entirely on the system 3600, partly on the system 3600 as a stand-alone software package, partly on the system 3600 and partly on a remote computer (e.g., remote system 3655), or entirely on the remote computer (e.g., remote system 3655). In the latter scenario, the remote computer may be connected to the system 3600 through any type of network (e.g., network 3650).

The NTCRSM may also store information objects. Data formats define the content/data and/or the arrangement of data items for storing and/or communicating the information objects. Each of the data formats may also define the language, syntax, vocabulary, and/or protocols that govern information storage and/or exchange. Examples of the data formats that may be used for any of the information objects, including the schemas, data knowledge 109 (see e.g., FIG. 1), etc., may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other language discussed elsewhere herein.

Additionally or alternatively, the data format for the information objects, schemas, data knowledge 109, etc., may be a Tactical Data Link (TDL) format including, for example, J-series message format for Link 16; JREAP messages; Multifunction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats.

Additionally or alternatively, the data format for the information objects, schemas, etc., may be document and/or plain text, spreadsheet, graphics, and/or presentation formats including, for example, American National Standards Institute (ANSI) text, a Computer-Aided Design (CAD) application file format (e.g., ".c3d", ".dwg", ".dft", ".iam", ".iaw", ".tct", and/or other like file extensions), Google® Drive® formats (including associated formats for Google Docs®, Google Forms®, Google Sheets®, Google Slides®, etc.), Microsoft® Office® formats (e.g., ".doc", ".ppt", ".xls", ".vsd", and/or other like file extension), OpenDocument Format (including associated document, graphics, presentation, and spreadsheet formats), Open Office XML (OOXML) format (including associated document, graphics, presentation, and spreadsheet formats), Apple® Pages®, Portable Document Format (PDF), Question Object File Format (QUOX), Rich Text File (RTF), TeX and/or LaTeX (".tex" file extension), text file (TXT), TurboTax® file (".tax" file extension), You Need a Budget (YNAB) file, and/or any other like document or plain text file format.

The data format for some or all of the information objects may be archive file formats that store metadata and concatenate files, and may or may not compress the files for storage. As used herein, the term "archive file" refers to a file having a file format or data format that combines or concatenates one or more files into a single file or information object. Archive files often store directory structures, error detection and correction information, arbitrary comments, and sometimes use built-in encryption. The term "archive format" refers to the data format or file format of an archive file, and may include, for example, archive-only formats that store metadata and concatenate files, for example, including directory or path information; compression-only formats that only compress a collection of files; software package formats that are used to create software packages (including self-installing files), disk image formats that are used to create disk images for mass storage, system recovery, and/or other like purposes; and multi-function archive formats that can store metadata, concatenate, compress, encrypt, create error detection and recovery information, and package the archive into self-extracting and self-expanding files. For the purposes of the present disclosure, the term "archive file" may refer to an archive file having any of the aforementioned archive format types. Examples of archive file formats may include Android® Package (APK); Microsoft® Application Package (APPX); Genie Timeline Backup Index File (GBP); Graphics Interchange Format (GIF); gzip (.gz) provided by the GNU Project™; Java® Archive (JAR); Mike O'Brien Pack (MPQ) archives; Open Packaging Conventions (OPC) packages including OOXML files, OpenXPS files, etc.; Rar Archive (RAR); Red Hat® package/installer (RPM); Google® SketchUp backup File (SKB); TAR archive (".tar"); XPInstall or XPI installer modules; ZIP (.zip or .zipx); and/or the like.

While only a single computing device 3600 is shown, the computing device 3600 may include any collection of devices or circuitry that individually or jointly execute a set (or multiple sets) of instructions to perform any one or more of the operations discussed above. Computing device 3600 may be part of an integrated control system or system manager, or may be provided as a portable electronic device configurable or operable to interface with a networked system either locally or remotely via wireless transmission.

Some of the operations described above may be implemented in software and other operations may be implemented in hardware. One or more of the operations, processes, or methods described herein may be performed by an apparatus, device, or system similar to those as described herein and with reference to the illustrated figures.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configurable or operable to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configurable or operable to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configurable or operable to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Although the various example embodiments and example implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. One or more non-transitory computer readable media (NTCRM) comprising instructions for predicting Internet Protocol (IP) to Domain (IP2D) mappings using machine learning techniques, wherein execution of the instructions by one or more processors is operable to cause a computing system to:
identify a set of source vote features from raw IP2D source data;
generate scaled IP2D features based on feature scaling and dimensional reduction operations performed on the set of source vote features; and
apply the scaled IP2D features to an IP-domain classification model to obtain a prediction dataset, the prediction dataset indicating a probability that at least one domain maps to at least one IP address.

2. The one or more NTCRM of claim 1, wherein execution of the instructions is further operable to cause the computing system to:
generate a training dataset;
perform binary classification on the training dataset; and
generate the IP-domain classification model based on the binary classification.

3. The one or more NTCRM of claim 2, wherein execution of the instructions is further operable to cause the computing system to:
perform feature scaling and dimensional reduction on the training dataset; and
perform binary classification on the feature scaled and dimension reduced training dataset.

4. The one or more NTCRM of claim 3, wherein, to generate the training dataset, execution of the instructions is operable to cause the computing system to:
generate labeled IP2D training data by labeling a training set of source vote features with known correct and incorrect IP2D labels.

5. The one or more NTCRM of claim 4, wherein, to perform the binary classification, execution of the instructions is operable to cause the computing system to:
generate a first version of the IP-domain classification model using a first set of the labeled IP2D training data;
input a second set of the labeled IP2D training data into the first version of the IP-domain classification model; and
compare predictions output by the first version of the IP-domain classification model based on the second set of the labeled IP2D training data with labeled IP2D relationships.

6. The one or more NTCRM of claim 5, wherein, to perform the binary classification, execution of the instructions is further operable to cause the computing system to:
generate a second version of the IP-domain classification model by refining feature weightings in the IP-domain classification model when the predictions output by the first version of the IP-domain classification model is less than a threshold value.

7. The one or more NTCRM of claim 1, wherein the raw IP2D source data includes IP address to domain (A-D) mappings generated by one or more sources, a timestamp of each A-D pair in the A-D mappings, and a profile associated with each A-D pair, the profiles of each A-D pair comprising a unique identifier associated with a user, organization, computing device, or network session event.

8. The one or more NTCRM of claim 7, wherein execution of the instructions is further operable to cause the computing system to:
generate a vote matrix to include the set of source vote features.

9. The one or more NTCRM of claim 8, wherein, to generate the vote matrix, execution of the instructions is operable to cause the computing system to:
group the raw IP2D source data into IP address-Domain-Source (A-D-S) keys; and
calculate a domain count, profile count, and a confusion value for each A-D-S key, the domain count is a total number of times a source of the one or more sources maps to an individual domain and to an individual IP address, the profile count is a number of unique profiles associated with each unique A-D mapping for a same source of the one or more sources, and the confusion value is an amount of source confusion or entropy associated with an A-D pair.

10. The one or more NTCRM of claim 7, wherein the one or more sources include email sniffers tags or script included in information objects or applications, and historical domain name registration records.

11. A computing system to be employed as an Internet Protocol (IP) to Domain (IP2D) resolution system, the computing system comprising:
processor circuitry coupled with memory circuitry, wherein the processor circuitry is configurable to:
generate an IP2D training dataset by labeling a set of source vote features with known correct and incorrect IP2D labels;
perform binary classification on the IP2D training dataset; and
generate an IP2D classifier model based on the binary classification.

12. The computing system of claim 11, wherein the processor circuitry is further configurable to:
perform feature scaling and dimensional reduction on the IP2D training dataset; and
perform the binary classification on the feature scaled and dimension reduced IP2D training dataset.

13. The computing system of claim 12, wherein, to generate the IP2D training dataset, the processor circuitry is configurable to:
identify organization characteristics for IP addresses; and
combine the identified organization characteristics with the source vote features.

14. The computing system of claim 11, wherein, to perform the binary classification, the processor circuitry is configurable to:
generate a first version of the IP2D classifier model using a first set of a labeled IP2D training data;
input a second set of the labeled IP2D training data into the first version of the IP2D classifier model; and
compare predictions output by the first version of the IP2D classifier model based on the second set of the labeled IP2D training data with labeled IP2D relationships.

15. The computing system of claim 14, wherein, to perform the binary classification, the processor circuitry is configurable to:
generate a second version of the IP2D classifier model by refining feature weightings in the IP2D classifier model when the predictions output by the first version of the IP2D classifier model is less than a threshold value.

16. The computing system of claim 11, further comprising:
   interface circuitry communicatively coupled with the processor circuitry, wherein the interface circuitry is configurable to obtain the set of source vote features from raw IP2D source data; and
   the processor circuitry is configurable to:
      generate scaled IP2D features based on feature scaling and dimensional reduction operations performed on the set of source vote features; and
      apply the scaled IP2D features to the IP2D classifier model to obtain a prediction dataset, wherein the prediction dataset indicates a probability that at least one domain maps to at least one IP address.

17. The computing system of claim 16, wherein the raw IP2D source data includes IP address to domain (A-D) mappings generated by one or more sources, a timestamp of each A-D pair in the A-D mappings, and a profile associated with each A-D pair, the profiles of each A-D pair comprising a unique identifier associated with a user, organization, computing device, or network session event.

18. The computing system of claim 17, wherein the processor circuitry is further configurable to:
   generate a vote matrix to include the set of source vote features.

19. The computing system of claim 18, wherein, to generate the vote matrix, the processor circuitry is configurable to:
   group the raw IP2D source data into IP address-Domain-Source (A-D-S) keys; and
   calculate a domain count, profile count, and a confusion value for each A-D-S key, the domain count is a total number of times a source of the one or more sources maps to an individual domain and to an individual IP address, the profile count is a number of unique profiles associated with each unique A-D mapping for a same source of the one or more sources, and the confusion value is an amount of source confusion or entropy associated with an A-D pair.

20. The computing system of claim 17, wherein the one or more sources include email sniffers tags or script included in information objects or applications, and historical domain name registration records.

* * * * *